US011580112B2

(12) United States Patent
Dua et al.

(10) Patent No.: US 11,580,112 B2
(45) Date of Patent: Feb. 14, 2023

(54) SYSTEMS AND METHODS FOR AUTOMATICALLY DETERMINING UTTERANCES, ENTITIES, AND INTENTS BASED ON NATURAL LANGUAGE INPUTS

(71) Applicant: PricewaterhouseCoopers LLP, New York, NY (US)

(72) Inventors: Suneet Dua, St. Petersburg, FL (US); Luis Beaumier, St. Petersburg, FL (US); Marc Nadeau, St. Petersburg, FL (US); Ryan Edley, Chicago, IL (US); Robert Coen, Tampa, FL (US); Jason Victor Randall, Dunedin, FL (US); Shannon M. Robinson, Memphis, TN (US)

(73) Assignee: PricewaterhouseCoopers LLP, New York, NY (US)

( * ) Notice: Subject to any disclaimer, the term of this patent is extended or adjusted under 35 U.S.C. 154(b) by 0 days.

(21) Appl. No.: 16/836,637

(22) Filed: Mar. 31, 2020

(65) Prior Publication Data
US 2021/0303578 A1     Sep. 30, 2021

(51) Int. Cl.
*G06F 16/2455* (2019.01)
*G06F 16/22* (2019.01)
*G06F 16/242* (2019.01)

(52) U.S. Cl.
CPC .... *G06F 16/24564* (2019.01); *G06F 16/2228* (2019.01); *G06F 16/243* (2019.01)

(58) Field of Classification Search
CPC ............. G06F 16/24564; G06F 16/243; G06F 16/2228
See application file for complete search history.

(56) References Cited

U.S. PATENT DOCUMENTS 6,789,231 B1   9/2004 Reynar et al.
7,685,252 B1   3/2010 Maes et al.
(Continued)

FOREIGN PATENT DOCUMENTS

EP   3407283 A1   11/2018
EP   3557505 A1   10/2019
WO   2018/208491 A1   11/2018

OTHER PUBLICATIONS

Dua et al., U.S. Office Action dated Aug. 30, 2021, directed to U.S. Appl. No. 16/836,634; 29 pages.
(Continued)

*Primary Examiner* — William B Partridge
*Assistant Examiner* — Aryan D Toughiry
(74) *Attorney, Agent, or Firm* — Morrison & Foerster LLP

(57) ABSTRACT

Systems and methods for processing natural language inputs to determine user intents using an insights repository are provided. An insights repository system is configured to build an insights repository as a data structure representing a plurality of entities and relationships among those various entities. The insights repository system may receive information from various sources via an event stream, and may process the information using event rules. Based on the application of the event rules, the system may configure an insights repository data structure representing various entities, relationships between various entities, and the strengths of relationships between various entities. After the insights repository is created, consumers may execute queries against the insights repository. Furthermore, the insights repository system may automatically query the insights repository to generate insight information to be published to an insight feed to which consumer systems may subscribe to receive automatic updates.

32 Claims, 24 Drawing Sheets

(56) References Cited

U.S. PATENT DOCUMENTS

| | | |
|---|---|---|
| 7,849,440 B1 | 12/2010 | Englehart |
| 9,672,827 B1 | 6/2017 | Jheeta |
| 10,395,641 B2 | 8/2019 | Dhoolia et al. |
| 10,776,725 B2 | 9/2020 | Ding et al. |
| 10,831,799 B2 | 11/2020 | Dhoolia et al. |
| 11,043,205 B1 | 6/2021 | Su et al. |
| 11,087,739 B1 | 8/2021 | Rastrow et al. |
| 11,170,776 B1 | 11/2021 | Whalin |
| 11,190,466 B2 | 11/2021 | Whitten et al. |
| 2003/0046316 A1 | 3/2003 | Gergic et al. |
| 2003/0212543 A1 | 11/2003 | Epstein et al. |
| 2005/0289124 A1 | 12/2005 | Kaiser et al. |
| 2010/0115048 A1* | 5/2010 | Scahill ............ H04L 67/322 709/228 |
| 2010/0138215 A1 | 6/2010 | Williams |
| 2012/0254143 A1 | 10/2012 | Varma et al. |
| 2013/0212042 A1* | 8/2013 | Rosenberg ............ G06Q 40/00 705/36 R |
| 2014/0136187 A1 | 5/2014 | Wolverton et al. |
| 2016/0110229 A1 | 4/2016 | Rector et al. |
| 2016/0364377 A1 | 12/2016 | Krishnamurthy |
| 2017/0116982 A1 | 4/2017 | Gelfenbeyn et al. |
| 2017/0206064 A1 | 7/2017 | Breazeal et al. |
| 2017/0308389 A1 | 10/2017 | Ducatelle et al. |
| 2018/0107461 A1 | 4/2018 | Balasubramanian et al. |
| 2018/0129484 A1 | 5/2018 | Kannan et al. |
| 2018/0198827 A1* | 7/2018 | Eifler ............ G06F 21/57 |
| 2018/0241764 A1* | 8/2018 | Nadolski ............ H04L 63/20 |
| 2018/0276261 A1 | 9/2018 | Smart |
| 2018/0302346 A1 | 10/2018 | Xie |
| 2018/0314689 A1 | 11/2018 | Wang et al. |
| 2019/0073197 A1 | 3/2019 | Collins |
| 2019/0121801 A1 | 4/2019 | Jethwa et al. |
| 2019/0163694 A1 | 5/2019 | Yao |
| 2019/0166069 A1 | 5/2019 | Yao et al. |
| 2019/0272323 A1 | 9/2019 | Galitsky |
| 2019/0377619 A1 | 12/2019 | Riva et al. |
| 2020/0004874 A1 | 1/2020 | Gupta et al. |
| 2020/0005117 A1 | 1/2020 | Yuan et al. |
| 2020/0057946 A1* | 2/2020 | Singaraju ............ G06N 20/00 |
| 2020/0104402 A1* | 4/2020 | Burnett ............ G06F 16/24568 |
| 2020/0218766 A1 | 7/2020 | Yaseen et al. |
| 2020/0310598 A1 | 10/2020 | Colevas et al. |
| 2020/0312324 A1 | 10/2020 | Tang |
| 2021/0090575 A1 | 3/2021 | Mahmood et al. |
| 2021/0136008 A1 | 5/2021 | Whitten et al. |
| 2021/0286950 A1* | 9/2021 | Quamar ............ G06N 20/00 |
| 2021/0303636 A1 | 9/2021 | Dua et al. |
| 2021/0303801 A1 | 9/2021 | Dua et al. |

OTHER PUBLICATIONS

International Search Report and Written Opinion dated Jun. 22, 2021, directed to International Application No. PCT/US2021/024360; 17 pages.

Dua et al., U.S. Office Action dated Mar. 4, 2021, directed to U.S. Appl. No. 16/836,634; 26 pages.

Camunda. "Modeler," located at <https://www.camunda.com/products/camunda-bpm/modeler/> visited on Aug. 13, 2020; 4 pages.

Dua et al., U.S. Office Action dated Mar. 22, 2022, directed to U.S. Appl. No. 16/836,634; 29 pages.

Dua et al., U.S. Office Action dated Mar. 4, 2022, directed to U.S. Appl. No. 16/836,681; 21 pages.

Dua et al., U.S. Office Action dated Nov. 25, 2022, directed to U.S. Appl. No. 16/836,634; 32 pages.

* cited by examiner

SYSTEMS AND METHODS FOR AUTOMATICALLY DETERMINING UTTERANCES, ENTITIES, AND INTENTS BASED ON NATURAL LANGUAGE INPUTS

FIELD

This disclosure related generally to language processing systems, and more specifically to improved systems and methods for processing spoken and typed natural language inputs, including by leveraging adaptive data structures representing relationships among a plurality of entities.

BACKGROUND

Natural language understanding (NLU) technology and intent-recognition technology endeavor to process spoken and/or typed user inputs (utterances) and to determine the intent of the user, in order to display desired content to the user and/or execute a conversation model in accordance with the user's inputs. In order to determine the user's desired intent, accurate recognition and parsing of the user's inputted utterances is required, and accurate recognition of any entities referenced by the user's inputted utterances is required.

SUMMARY

Known systems for NLU, intent-recognition, and/or entity recognition are not sufficiently accurate. Particularly in the business intelligence regime, there is a need for improved NLU, intent recognition, and entity recognition systems that can accurately respond to nomenclatures, terminology, and entity names used within various business and enterprise environments. Furthermore, there is a need for NLU improved NLU, intent recognition, and entity recognition systems that use machine learning to improve accuracy and reliability of results. Additionally, there is a need for improved NLU, intent recognition, and entity recognition systems that provide confidence-scored and/or ranked results in response to queries/inputs. Additionally, there is a need for improved NLU, intent recognition, and entity recognition systems that efficiently ingest information from a variety of sources including user interactions, conversation modeling inputs, internal and external system-of-record data points, user caches, NLU results, trends across a firm and/or industry, relationship graphs, indexed data, and other lists of intent/entity values.

Additionally, there is a need for improved repositories of information for use with NLU, intent recognition, and entity recognition systems. There is a need for improved repositories of information about entities and the manner in which those entities relate to one another, such that those improved repositories can be efficiently and insightfully generated and maintained based on data from various sources. Furthermore, there is a need for said improved repositories, such that those repositories may be queried by NLU, intent recognition, and entity recognition systems to generate accurate and insightful information and options for users of said systems.

The systems, methods, and user interfaces described herein may address one or more of the above needs. In some embodiments, a language understanding system is configured to process utterances to predict intents and entities conveyed by the utterances. In some embodiments, the system includes a central service configured to receive inputs/queries from a user, to communicate with a plurality of language processing microservices, and to return a response to the user. The central service may in some embodiments be referred to as a predictive intent and entity service (PIES). In some embodiments, one or more of the plurality of microservices may be configured to process the input from the user (provided by PIES to the microservice) to apply an algorithm comparing the input to a database, index, knowledge graph, or other data store storing a corpus of utterances and/or entities. One or more of the plurality of microservices may further be configured to rate utterances and/or entities in the index by generating a confidence score for each utterance and/or entity with respect to the input. The one or more microservices may then generate a ranked list and return the ranked list to PIES. PIES may then apply a secondary rating/ranking algorithm in order to select one or more predicted utterances and/or entities to return to the user based on the user's initial input. In accordance with the predicted utterances and/or entities (and, in some embodiments, in accordance with further user input), the system may in some embodiments execute one or more conversation models (and/or, in some embodiments, execute one or more business process models and/or one or more technical processes in a similar manner as described herein).

In some embodiments, an insights repository system is configured to build an insights repository as a data structure representing a plurality of entities and the relationships among those various entities. The insights repository system may receive information from various sources regarding entities via an event stream, and may process the information from the event stream in accordance with one or more event rules. Based on the application of the event rules, the system may generate and/or modify an insights repository data structure, which may in some embodiments be a graph data structure or a database data structure representing various entities, relationships between various entities, and the strengths of relationships between various entities. After the insights repository is created, consumers may execute queries against the insights repository to generate a plurality of responsive results based on the information content of the repository. Furthermore, the insights repository system may be configured to automatically (e.g., periodically) query the insights repository using one or more insight rules in order to generate insight information to be published to an insight feed. One or more consumers may subscribe to the insight feed to automatically receive up to date information regarding insights based on the information content of the insights repository.

In some embodiments, a first system is provided, the first system being for creating an adaptive data structure representing relationships among entities, the first system comprising one or more processors and memory storing instructions configured to be executed by the one or more processors to cause the first system to: receive, via an event feed, a data stream comprising data regarding a plurality of events; and generate, by an event processor system, the adaptive data structure depicting relationships among entities, wherein generating the adaptive data structure comprises: applying one or more rules to configure, based on the data stream, a relationship score between a pair of entities.

In some embodiments of the first system, configuring the relationship score between the pair of entities comprises generating and storing the score.

In some embodiments of the first system, configuring the relationship score comprises modifying the score by an amount determined by applying the one or more rules.

In some embodiments of the first system, configuring the relationship score comprises configuring the score such that it is a number that is not less than 0 and is not greater than 1.

In some embodiments of the first system, generating the adaptive data structure comprises generating and storing a representation in the adaptive data structure, based on the data stream, representing a new entity.

In some embodiments of the first system, generating the adaptive data structure comprises updating, based on the data stream, a characteristic of a representation in the adaptive data structure.

In some embodiments of the first system, generating the adaptive data structure comprises updating the adaptive data structure, following its initial creation, based on the data stream.

In some embodiments of the first system, the event processor system comprises: an event rule corpus storing a plurality of event rules; and a plurality of event processor instances, wherein one or more of the event processor instances is configured to select one or more of the event rules from the event rule corpus and apply the one or more selected rules to data from the data stream in order to configure the relationship score between the pair of entities.

In some embodiments of the first system, one or more of the event processor instances is configured to process events of a predetermined respective event type.

In some embodiments of the first system, one or more of the event processor instances is configured to select one or more of the event rules from the event rule corpus based on a respective event type of one of the plurality of events.

In some embodiments of the first system, the adaptive data structure is stored in an insights repository system comprising: one or more non-transitory computer-readable storage mediums storing the adaptive data structure; and a data structure controller configured to execute a search algorithm against the content of the adaptive data structure.

In some embodiments of the first system, the data structure controller comprises a plurality of connectors, each of the plurality of connectors configured to interface with a predetermined respective type of adaptive data structure.

In some embodiments of the first system, the data structure controller comprises a query builder configured to communicate, based on incoming query data from one or more consumer systems, with one or more of the plurality of connectors to cause the one or more of the plurality of connectors to cause execution of a search algorithm against the adaptive data structure.

In some embodiments of the first system, the incoming query data is received by the data structure controller via a query API.

In some embodiments of the first system, generating the adaptive data structure comprises storing an indication as to whether the pair of entities are linked by an aging relationship or a non-aging relationship.

In some embodiments of the first system, storing the indication as to whether the pair of entities are linked by an aging relationship or a non-aging relationship comprises storing an aging rate for the relationship.

In some embodiments of the first system, generating the adaptive data structure comprises, after storing the indication that the pair of entities are linked by an aging relationship, decreasing the relationship score in accordance with an aging process of the aging relationship.

In some embodiments of the first system, the data stream comprising the plurality of events is received from one or more data sources including one or more of a conversation history source, an internal trend source, an external trend source, an enterprise system, and an enterprise collaboration system.

In some embodiments of the first system, the adaptive data structure depicts relationships among: pairs of entities including two user entities; pairs of entities including two non-user entities; and pairs of entities including one user entity and one non-user entity.

In some embodiments of the first system, the adaptive data structure is a data structure type selected from: a database data structure, a graph data structure, and an index data structure.

In some embodiments, a first method is provided, the first method being for creating an adaptive data structure representing relationships among entities, the first method performed by a system comprising one or more processors, the first method comprising: receiving, via an event feed, a data stream comprising data regarding a plurality of events; and generating, by an event processor system, the adaptive data structure depicting relationships among entities, wherein generating the adaptive data structure comprises: applying one or more rules to configure, based on the data stream, a relationship score between a pair of entities.

In some embodiments, a first non-transitory computer-readable storage medium is provided, the first non-transitory computer-readable storage medium being for creating an adaptive data structure representing relationships among entities, the first non-transitory computer-readable storage medium storing instructions configured to be executed by a system comprising one or more processors to cause the system to: receive, via an event feed, a data stream comprising data regarding a plurality of events; and generate, by an event processor system, the adaptive data structure depicting relationships among entities, wherein generating the adaptive data structure comprises: applying one or more rules to configure, based on the data stream, a relationship score between a pair of entities.

In some embodiments, a second system is provided, the second system being for generating responses to incoming queries regarding one or more entities, the second system comprising: one or more non-transitory computer-readable storage mediums storing an adaptive data structure representing relationships among a plurality of entities; and one or more processors; and memory storing instructions configured to be executed by the one or more processors to cause the second system to: receive a query from a consumer system, the query including query data; in response to receiving the query data, generate a response to the query by applying one or more search algorithms, using the query data, to the adaptive data structure; and generate a response payload, based on the application of the one or more search algorithms to the adaptive data structure, for transmission to the consumer system.

In some embodiments of the second system, the query is received from the consumer system via a query API.

In some embodiments of the second system, receiving the instructions are further configured to cause the second system to: in response to retrieving the query, convert the query into an intermediate data structure; and convert the intermediate data structure to a native query data structure configured to be processed to apply the one or more search algorithms.

In some embodiments, a second method is provided, the second method being for generating responses to incoming queries regarding one or more entities, the second method performed by a system comprising one or more processors and a non-transitory computer-readable storage mediums storing an adaptive data structure representing relationships among a plurality of entities, the second method comprising: receiving a query from a consumer system, the query including query data; in response to receiving the query data, generating a response to the query by applying one or more search algorithms, using the query data, to the adaptive data structure; and generating a response payload, based on the application of the one or more search algorithms to the adaptive data structure, for transmission to the consumer system.

In some embodiments, a second non-transitory computer-readable storage medium is provided, the second non-transitory computer-readable storage medium being for generating responses to incoming queries regarding one or more entities, the second non-transitory computer-readable storage medium configured to be executed by a system comprising one or more processors to cause the system to: receive a query from a consumer system, the query including query data; in response to receiving the query data, generate a response to the query by applying one or more search algorithms, using the query data, to an adaptive data structure representing relationships among a plurality of entities; and generate a response payload, based on the application of the one or more search algorithms to the adaptive data structure, for transmission to the consumer system.

In some embodiments, a third system is provided, the third system being for generating an insights feed, the third system comprising: one or more non-transitory computer-readable storage mediums storing an adaptive data structure storing an adaptive data structure representing relationships among a plurality of entities; and one or more processors; and memory storing instructions configured to be executed by the one or more processors to cause the third system to: transmit a query from a relationship analyzer system to an insights repository system, the insights repository system comprising the adaptive data structure and the query comprising query data to be applied against the adaptive data structure; receive, from the insights repository system, a response to the query; generate, based on the response to the query, insights data; and transmit the insights data to an insights feed to which one or more consumers systems is subscribed.

In some embodiments of the third system: the relationship analyzer system comprises an insight scheduler, and transmitting the query to the insights repository system is performed in accordance with instructions stored in an insight scheduler.

In some embodiments of the third system, the insight scheduler is configured to query cause the system to transmit the query in accordance with one or more of a predefined schedule, a predefined cadence, or detection by the system of a predefined trigger condition.

In some embodiments of the third system, the relationship analyzer comprises: an insight rule corpus storing a plurality of insight rules; and a plurality of insight processor instances, each of the plurality of insight processor instances configured to apply a respective set of one or more of the plurality of insight rules respective insight rules to the response to the query data in order to generate the insights data.

In some embodiments of the third system, the query is transmitted from the relationship analyzer system to an insights repository system via a query API.

In some embodiments of the third system, the response to the query is transmitted from the insights repository system to the relationship analyzer system via the query API.

In some embodiments, a third method is provided, the third method being for generating an insights feed, the third method performed by a system comprising one or more non-transitory computer-readable storage mediums storing an adaptive data structure representing relationships among a plurality of entities and one or more processors, the third method comprising: transmitting a query from a relationship analyzer system to an insights repository system, the insights repository system comprising the adaptive data structure and the query comprising query data to be applied against the adaptive data structure; receiving, from the insights repository system, a response to the query; generating, based on the response to the query, insights data; and transmitting the insights data to an insights feed to which one or more consumers systems is subscribed.

In some embodiments, a third non-transitory computer-readable storage medium is provided, the third non-transitory computer-readable storage medium being for generating an insights feed, the third non-transitory computer-readable storage medium configured to be executed by a system comprising one or more processors to cause the system to: transmit a query from a relationship analyzer system to an insights repository system, the insights repository system comprising an adaptive data structure representing relationships among a plurality of entities and the query comprising query data to be applied against the adaptive data structure; receive, from the insights repository system, a response to the query; generate, based on the response to the query, insights data; and transmit the insights data to an insights feed to which one or more consumers systems is subscribed.

It will be appreciated that any of the embodiments, aspects, features and options described in view of the system(s) apply equally to the method(s) and computer-readable storage medium(s), and vice versa. It will also be clear that any one or more of the above embodiments, aspects, features and options can be combined. In some embodiments, any one or more of the characteristics of any one or more of the systems, methods, and/or computer-readable storage mediums recited above may be combined, in whole or in part, with one another and/or with any other features or characteristics described elsewhere herein.

DETAILED DESCRIPTION

Described herein are exemplary embodiments of systems, methods, and/or user interfaces for language processing, intent detection, and entity determination, which may address the problems and shortcomings of known NLU and intent detection systems and methods described above. Further described herein are exemplary embodiments of systems, methods, and/or user interfaces for generating, modifying, and/or configuring an adaptive data structure depicting relationships among a plurality of entities, which may address the problems and shortcomings of known NLU and intent detection systems and methods described above.

Exemplary System

Figure 1:
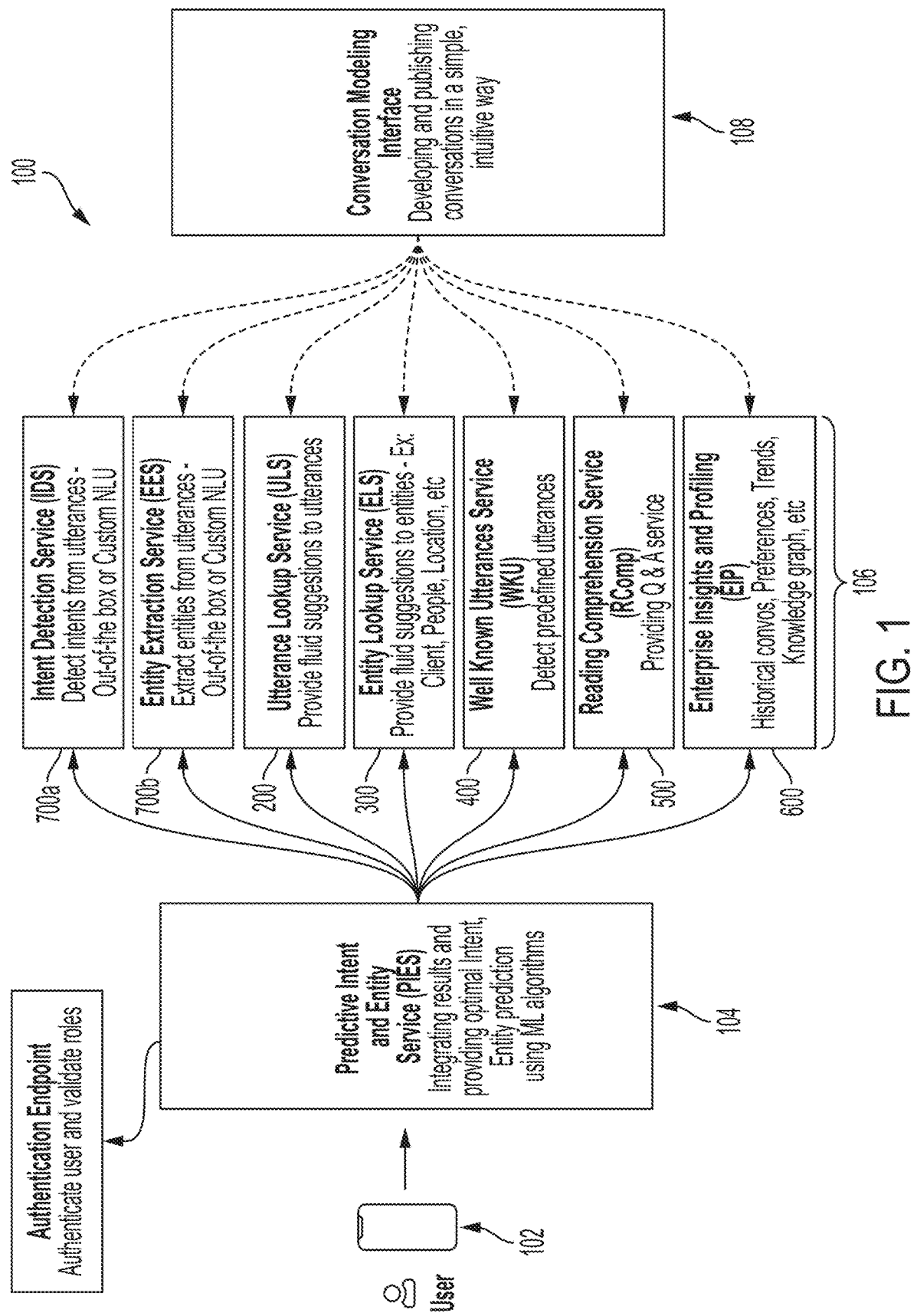
FIG. 1 depicts a system for language processing, in accordance with some embodiments.

FIG. 1 depicts a system 100 for language processing, in accordance with some embodiments. As described below, system 100 may be a computer system configured to detect or receive user input in the form of spoken and/or written language inputs and to call on one or more of a plurality of language processing microservices to interpret the input. The language processing microservices may be configured to determine one or more predicted/suggested intents and/or predicted/suggested entities based on the input, and to each return a ranked list of potential intents/entities. A central predictive intent system responsible for calling the one or more microservices may receive the ranked lists from the microservices and process those lists to evaluate and refine the results, thereby generating one or more predictive utterances, intents, and/or predictive entities. Information returned by the one or more microservices may further include information associated with predictive intents, utterances, and/or entities, including but not limited to entity type, key attributes, and/or keys associated with the matched intents, utterances, and/or entities.

On the basis of the one or more matched predictive intents, utterances, and/or predictive entities, a response may be displayed to the user, a responsive query may be posed to the user, and/or the system 100 may initiate execution of one or more conversation models (and/or one or more technical processes and/or or one or more business process models).

As shown, system 100 may include user device 102, predictive intent system 104, language processing microservices 106, and conversation modeling system 108. In some embodiments, any one or more of the components of system 100 may be implemented as computer hardware and/or software. For example, one or more of the different components of system 100 may be implemented via one or more computer processors, servers, computing instances, or the like. In some embodiments, system 100 may be implemented on a single computing device; in some embodiments, system 100 may be implemented as a distributed network system (e.g., with different devices, modules, or services implemented on separate network components); in some embodiments, system 100 may be implemented as a distributed computing system (e.g., utilizing distributed processors to execute a single task, module, or service). In some embodiments, one or more of the different components of system 100 may be implemented via a single computing device, may be implemented as a distributed network system, and/or may be implemented as a distributed computing system. In some embodiments, one or more of the different components of system 100 may be implemented via a Platform as a Service (PaaS) system.

User device 102 may be any computing device or system controlled by an end user and configured to accept input from an end user, and in some embodiments configured to display feedback to an end user. In some embodiments, user device 102 may be any suitable computing device, including but not limited to a desktop computer, a laptop, a mobile phone, a tablet, a workstation, or the like. In some embodiments, user device 102 may include one or more input devices configured to detect input from a user, including but not limited to a keyboard, mouse, touch-pad, touch-screen, and/or microphone. In some embodiments, user device 102 may include one or more output devices configured to output a signal to a user, including but not limited to a display, speaker, light-emitting device, and/or haptic device. In some embodiments, user device 102 may include one or more network communication devices configured to send and/or receive electronic communications, via wired and/or wireless electronic communication protocols, to one or more other components of system 100 (and in some embodiments to components and/or systems outside system 100).

As shown in FIG. 1, user device 102 may be communicatively coupled to predictive intent system 104 and may be configured to send and receive wired and/or wireless electronic transmissions to/from predictive intent system 104.

In some embodiments, user device 102 may be configured to receive an input from a user in the form of a spoken and/or written utterance, and to responsively transmit data (e.g., via wired and/or wireless network communication) to predictive intent system 104. User device 102 may be further configured to receive transmissions from predictive intent system 104, including but not limited to transmissions responsive to user inputs. In this way, user device 102 may send a query based on one or more user input utterances to predictive intent system 104, and may then receive a response to said query from predictive intent system 104. As explained herein, the response to the user's query may be based on a plurality of algorithms applied to various data structures by predictive intent system 104 and/or by one or more of microservices 106, and the response may include one or more predicted/suggested intents and/or entities based on the user's input utterance(s).

User device 102 may be configured to then display feedback to the user in accordance with the one or more predicted/suggested intents, such as by displaying a list of options for the user to select from. User device 102 may be alternately or additionally be configured to execute, in whole or in part, one or more conversation models or one and/or more technical processes in accordance with the one or more predicted/suggested intents (and/or in accordance with additional input detected from the user). Alternately or additionally, system 100 and/or any other component of system 100 may be configured to in whole or in part, one or more conversation models or one and/or more technical processes in accordance with the one or more predicted/suggested intents (and/or in accordance with additional input detected from the user).

Predictive intent system 104 may be any computing device or system configured to receive inputs/queries from user device 102, to query one or more microservices 106, to receive response payloads from the one or more microservices 106, and to transmit a response to the user input to user device 102. As shown in FIG. 1, predictive intent system 104 may be communicatively coupled to user device 102 and to microservices 106 and may be configured to send and receive wired and/or wireless electronic transmissions to/from any one or more of said components.

In some embodiments, predictive intent system 104 may be configured to receive data (e.g., via wired and/or wireless network communication) from user device 102 representing an input/query utterance (or utterances) from a user, and to responsively transmit data to one or more microservices 106. By transmitting data to one or more of the microservices 106, predictive intent system 104 may call the one or more microservices 106 to execute one or more algorithms or other analyses to parse, interpret, or otherwise process the input data in order to understand the user's utterances and to predict one or more intents and/or entities in accordance with the input utterances. Predictive intent system 104 may further be configured to receive a responsive transmission from the one or more microservices 106, wherein the responsive transmissions may include a payload including a ranked list of entities and/or intents potentially matching or otherwise corresponding to the inputted utterance(s).

As discussed further below, predictive intent system 104 may in some embodiments, further be configured to make a determination (e.g., based on the inputted utterance(s) or on other contextual information) as to which microservices 106 should or should not be called.

As discussed further below, predictive intent system 104 may in some embodiments, further be configured to apply one or more algorithms or other decision-making processes, including machine-learning algorithms, to the payload data received from the one or more microservices 106. For example, as discussed further below, predictive intent system 104 may be configured to apply a holistic ranking analysis to the collective set of suggested intents/entities returned from various different microservices 106, in order to generate a refined set of one or more suggested intents/entities to transmit to user device 102 and/or to use as the basis for causing system 100 to execute one or more conversation models or technical processes.

Language processing microservices 106 may be a set of one or more language processing microservices configured to be called by predictive intent system 104, to execute one or more language processing algorithms, and to return payloads to predictive intent system 104 in accordance with the outcomes of the executed language processing algorithms. Each of microservices 106 may be implemented as any suitable computing device or system. In the example of FIG. 1, seven microservices 106 are shown; however, in some embodiments, system 100 may include more than seven microservices 106 or fewer than seven microservices 106. In some embodiments, system 100 may be configurable to dynamically add and/or remove microservices 106 from system 100.

As shown in FIG. 1, microservices 106 may be communicatively coupled to predictive intent system 104 and to conversation modeling system 108 and may be configured to send and receive wired and/or wireless electronic transmissions to/from any one or more of said components.

As explained further herein, each one of language processing microservices 106 may be configured to receive query data from predictive intent system 104 based on the user's input utterances, and to responsively execute one or more algorithms to analyze the query data. In particular, as explained further herein with respect to the exemplary microservices discussed below with respect to FIGS. 2-7, each of the microservices 106 may be configured to compare the query data using, one or more algorithms, to a database or other corpus of data regarding potential entities and/or intents that may be intended by the user's input utterances. Each of the microservices 106 may then be configured to generate a confidence score for one or more of the entities and/or intents in the respective database/corpus, and to generate a respective rated and ranked list of suggested entities and/or intents based on the application of the respective algorithm to the query data. The generated list may then be transmitted, as part of a respective response payload, back to predictive intent system 104 for further analysis, presentation to the user, and/or responsive execution of one or more processes.

In some embodiments, one or more of the microservices of system 100 may be managed by Azure Kubernetes Service (AKS) on Microsoft's Azure in the Platform as a Service (PaaS) model. The microservices may be coded using node.js frameworks (typescript). The request and response payloads may be formatted in JSON.

In some embodiments, microservices 106 may in some embodiments include an utterance lookup microservice 200, an entity lookup microservice 300, a well-known utterance microservice 400, a reading comprehension microservice 500, an enterprise insights and profiling microservice 600, an intent detection microservice 700a, and/or an entity extraction microservice 700b. These seven microservices are discussed below in more detail with respect to FIGS. 2-7. In some embodiments, microservices 106 may include multiple instances of a single microservice and/or may include additional microservices not listed above.

Returning to FIG. 1, conversation modeling system 108 may be any computing device or system configured to receive inputs from user defining conversation models and to transmit information (e.g., via wired or wireless network communication) to the one or more microservices 106 regarding the defined conversation models. As shown in FIG. 1, conversation modeling system 108 may be communicatively coupled to microservices 106 and may be configured to send and receive wired and/or wireless electronic transmissions to/from any one or more of said microservices 106.

In some embodiments, conversation modeling system 108 may be configured to receive user input (whether from the same user associated with device 102 and/or from one or more different users) defining a conversation model. In some embodiments, a conversation may refer to an interaction (e.g., the entirety of an interaction) between an end user and a core platform/system. A conversation may begin when an end user speaks or types an utterance, and may progress through the conversation as defined by a conversation model such that the platform/system may provide the user with one or more responses and/or may undertake one or more actions (e.g., technical processes) in accordance with the conversation. Conversations are finite and may be short-lived, lasting in some embodiments only long enough to gather the information from the end-user that is needed to complete the request and/or intent of the end-user. In some embodiments, a conversation may last less than a few seconds with an engaged end user. A conversation may be considered complete when the conversation execution has completed (e.g., reached a termination point of a corresponding conversation model) and/or a conversation history is written to storage. A conversation may in some embodiments be identified by an identifier (e.g., a UUID) that is represented in a conversation history and can be tracked in one or more logs.

In some embodiments, conversation modeling system 108 may comprise one or more input devices configured to receive user input for defining a conversation model, and/or may include one or more communication devices configured to receive transmissions of data for defining a conversation model. In some embodiments, conversation modeling system 108 may be configured to generate, render, and/or display one or more user interfaces (e.g., graphical user interfaces) through which a user may define a conversation model, and may further be configured to transmit information regarding conversation models defined in the graphical user interface to the one or more microservices 106.

In some embodiments, conversation models defined by conversation modeling system 108 may be used by system 100 to create, store, and/or configure information/data associated with one or more of the microservices 106. For example, a conversation model may be used to define one or more entities, intents, and/or relationships stored in or associated with a database or other data structure that is searched/queried/analyzed by one of the microservices 106 in response to receipt of data representing a user utterance (s).

Exemplary Microservices and Microservice Methods

FIGS. 2-7 depict various exemplary language processing microservices 106 configured to operate as part of a system for language processing 100. As shown in FIGS. 2-7, each of the microservices may have a similar overall system architecture, in that each one of the microservices may be configured to receive query input data from the predictive intent system 104, use an algorithm to compare the query input data against an index/database/corpus (or multiple such indexes/databases/corpuses), apply a rating and ranking analysis to generate a ranked and rated list of suggested entities/intents from the index/database/corpus, and prepare a payload including the ranked list (including associated confidence scores for each included entity/intent in the list) for transmission back to the predictive intent system 104. Furthermore, for each microservice, the respective index/database/corpus may be created, populated, generated, updated, or otherwise configured by one or more reference information source components including but not limited to a conversation modeling system (e.g., conversation modeling system 108), source systems, and/or an events feed. Different aspects of the various algorithms and reference information source components are discussed below with respect to the various exemplary microservices 106 shown in FIGS. 2-7.

Figure 2:
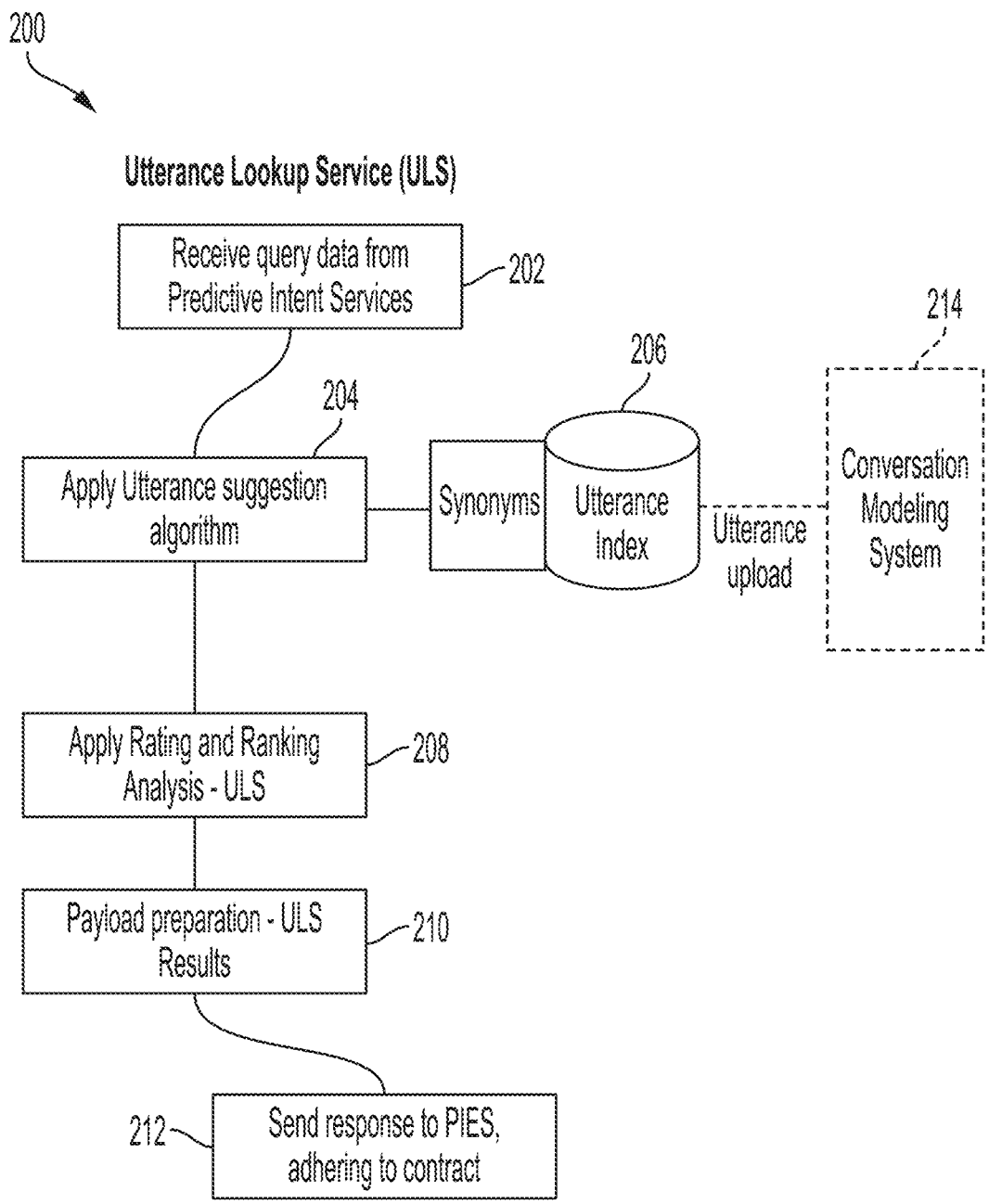
FIG. 2 depicts an utterance lookup microservice configured to operate as part of a system for language processing, in accordance with some embodiments.

FIG. 2 depicts components and operations of utterance lookup microservice 200, in accordance with some embodiments. As shown herein and explained below, utterance lookup microservice 200 may be configured to apply an utterance suggestion algorithm to compare input data from predictive intent service 102 against a plurality of utterances stored in an utterance index, to apply a rating and ranking analysis to selected utterances from the utterance index, and to generate a payload comprising a ranked list of suggested utterances to be transmitted back to predictive intent service 102.

As shown at block 202, utterance lookup service 200 may receive query data from predictive intent service 102. The query data may be received from predictive intent service 102 via any suitable wired or wireless electronic communication protocol, and the query data may comprise information about one or more utterances included in a user input received by predictive intent service 102.

As shown at block 204, utterance lookup service 200 may, responsive to receiving the query data from predictive intent service 102, apply an utterance suggestion algorithm to compare the query data regarding the user's utterance(s) against utterance index 206. The utterance suggestion algorithm may be configured to ascertain a user's intent by evaluating words and/or phrases entered by the user and comparing those words and/or phrases to an index of intents and associated training content. The utterance suggestion algorithm may be configured to search, rank, and score relevant results matching the input query, such that the score and/or rank may be leveraged by one or more downstream systems or processes to further enrich one or more other aggregated data sets. The algorithm may also be configured for speed and efficiency to ensure that information is relayed in an expedient manner.

In some embodiments, utterance index 206 may be any suitable corpus of data comprising a plurality of utterances. In some embodiments, utterance index 206 may be provided as a database or as any other suitable data structure. In some embodiments, utterance index 206 may be configured such that it is easily and efficiently searchable by the utterance suggestion algorithm. In some embodiments, utterance index 206 may store one or more utterances in association with one or more synonyms, such that searching for an utterance via synonyms may be enabled.

As shown at block 208, utterance lookup service 200 may apply a rating and ranking analysis to one or more of the utterances stored in utterance index 206. This rating and ranking analysis may be applied in conjunction with, or as a part of, applying the utterance suggestion algorithm discussed above with respect to block 204, such that the rating and ranking analysis is applied with respect to the query data received at block 202. In some embodiments, the rating and ranking analysis may be applied to all utterances stored in utterance index 206, while in some embodiments the rating and ranking analysis may be applied to only a subset of the utterances stored in utterance index 206. In some embodiments, the rating and ranking analysis may be applied to a subset of results extracted from index 206 by the application of the utterance suggestion algorithm discussed with respect to block 204; for example, the rating and ranking analysis may in some embodiments be applied to a subset of results identified by the algorithm and may further narrow that subset of results into a refined subset to be returned from the microservice.

Application of the rating and ranking analysis may generate confidence scores associated with respective utterances stored in utterance index 206, wherein a confidence score may represent a strength of association (e.g., strength of matching) between a given utterance in the utterance index and the query input data applied by the utterance suggestion algorithm. Application of the rating and ranking analysis may further involve ranking utterances from the utterance index in an order representing which utterances are most preferred as suggested matches or responses for the query data. For example, ranking the utterances may comprise ranking the confidence-scored utterances in order of confidence score from highest (strongest confidence, most preferred) to lowest (weakest confidence, least preferred).

As shown at block 210, utterance lookup service 200 may generate a payload configured to be transmitted to predictive intent service 102. The payload may comprise a ranked list of selected utterances from the utterance index, along with associated respective confidence scores for each entry on the list and any associated metadata for each entry on the list. In some embodiments, metadata included in the list may indicate (a) a confidence score of a list item and (b) a rank position in the list of the list item. In some embodiments, the payload may be formatted in JSON.

In some embodiments, the list may comprise all utterances in the utterance index, while in some embodiments the list may comprise fewer than all utterances in the utterance index. In some embodiments, the list may comprise all utterances returned by the utterance suggestion algorithm, while in some embodiments the list may comprise fewer than all utterances returned by the utterance suggestion algorithm. In some embodiments, the list may comprise all utterances assigned a confidence score by the rating and ranking analysis, while in some embodiments the list may comprise fewer than all utterances assigned a confidence score by the rating and ranking analysis. In some embodiments, the list may comprise a predetermined number of utterances. In some embodiments, the list may comprise a dynamically determined number of utterances, for example a number of utterances determined by application of the utterance suggestion algorithm and/or application of the rating and ranking analysis. In some embodiments, only utterances having confidence scores over a predefined or dynamically determined threshold cutoff may be included in the list.

As shown at block 212, utterance lookup service 200 may transmit the payload to predictive intent service 102. Transmission of the payload to predictive intent service 102 may be performed responsively to receipt of the query data from predictive intent service 102 and generation of the payload.

In some embodiments, transmission of the payload to predictive intent service 102 may be via any suitable wired or wireless electronic communication protocol.

Utterance index 206 may be communicatively coupled to conversation modeling system 214, and may be configured to receive transmissions (e.g., via wired or wireless network communication) from conversation modeling system 214. The transmitted data received from conversation modeling system 214 may comprise information usable by utterance lookup service 200 (e.g., usable by one or more processors associated with utterance lookup service 200) to create, populate, generate, update, or otherwise configure utterance index 206. For example, in some embodiments, a user of conversation modeling system 214 may execute input defining one or more utterances which may be transmitted to utterance index 206 such that they may thereafter be searchable by the utterance suggestion algorithm. In some embodiments, a user of conversation modeling system 214 may define one or more utterances as part of a conversation model that is uploaded to utterance lookup service 200. In some embodiments, conversation modeling system 214 may be the same conversation modeling system used by one or more other microservices of system 100 (including those other microservices discussed herein) or may be a separate conversation modeling system. In some embodiments, information regarding utterances to be stored in utterance index 206 may be uploaded from one or more reference information sources aside from conversation modeling system 214.

Figure 3:
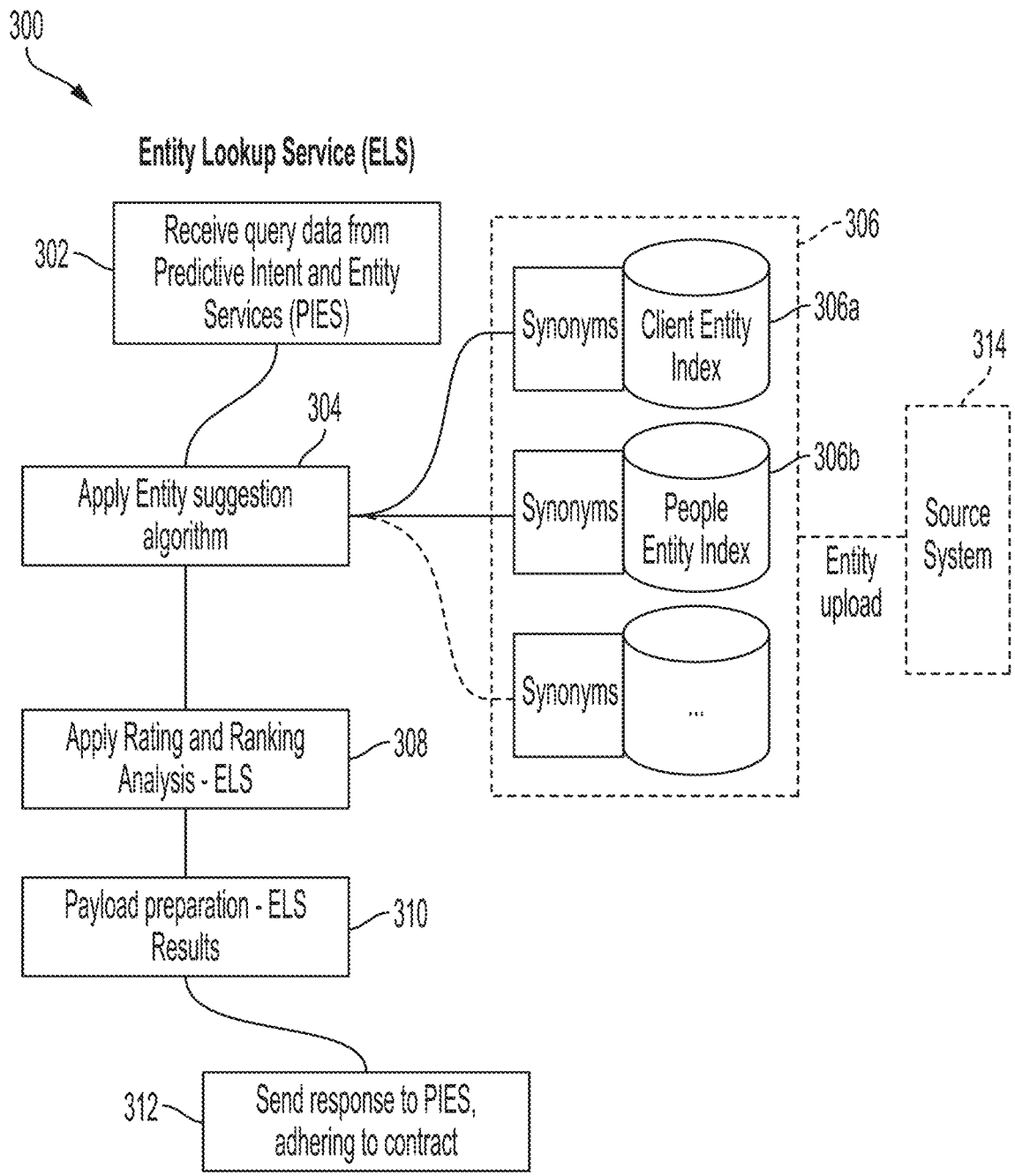
FIG. 3 depicts an entity lookup microservice configured to operate as part of a system for language processing, in accordance with some embodiments.

FIG. 3 depicts components and operations of entity lookup service 300, in accordance with some embodiments. As shown herein and explained below, entity lookup service 300 may be configured to apply an entity suggestion algorithm to compare input data from predictive intent service 102 against a plurality of entities stored in one of one or more entity indexes, to apply a rating and ranking analysis to selected entities from one of the one or more entity indexes, and to generate a payload comprising a ranked list of suggested entities to be transmitted back to predictive intent service 102.

As shown at block 302, entity lookup service 300 may receive query data from predictive intent service 102. The query data may be received from predictive intent service 102 via any suitable wired or wireless electronic communication protocol, and the query data may comprise information about one or more utterances included in a user input received by predictive intent service 102.

As shown at block 304, entity lookup service 300 may, responsive to receiving the query data from predictive intent service 102, apply an entity suggestion algorithm to compare the query data regarding the user's utterance(s) against one or more entity indexes 306. The entity suggestion algorithm may be configured to search across one or more entity indexes in order to ascertain the most appropriate entity value(s) and/or entity type(s) based on words or phrases entered by the user. The entity suggestion algorithm may be configured to aggregate results and groups according to entity type. In some embodiments, the entity suggestion algorithm may be configured to recognize one or more synonyms for an entity and to provide additional corresponding entity data such as an entity identifier (e.g., UUID) that may be used downstream by one or more processes or systems to query, categorize, or identify the entity. In some embodiments, results provided by the entity suggestion algorithm may be ranked and scored based on the query's relevance to the content stored in the one or more indexes searched by the entity suggestion algorithm. In some embodiments, the entity suggestion algorithm may be optimized for speed and/or efficiency to ensure that its results may be used by one or more downstream systems and/or processes with minimal impact to overall application response time.

In some embodiments, any one or more of entity indexes 306 may be any suitable corpus of data comprising a plurality of entities. In some embodiments, any one or more of entity indexes 306 may be provided as a database or as any other suitable data structure. In some embodiments, any one or more of entity indexes 306 may be configured such that they are easily and efficiently searchable by the entity suggestion algorithm. In some embodiments, any one or more of entity indexes 306 may store one or more entities in association with one or more synonyms, such that searching for an entity via synonyms may be enabled.

In some embodiments, the one or more entity indexes 306 may include a client entity index 306a that includes entries representing various clients of a person or organization; in some embodiments, the one or more entity indexes 306 may include a people entity index 306b that includes entries representing various people; in some embodiments, the one or more entity indexes 306 may include one or more entity indexes that include entries representing any category of entities, such as organizations, companies, corporations, firms, non-profit organizations, practice groups, teams, people, government organizations, and the like. In some embodiments, entity lookup service 300 may be configured to call all of entity indexes 306, to selectively call only a subset of entity indexes 306 (e.g., in accordance with user instruction or in accordance with an automatic determination as to which indexes to call), and/or to call different ones of entity indexes 306 in a different manner (e.g., by applying the entity suggestion algorithm differently or by applying different parts of the query data to different indexes).

As shown at block 308, entity lookup service 300 may apply a rating and ranking analysis to one or more of the entities stored in any one or more of entity indexes 306. This rating and ranking analysis may be applied in conjunction with, or as a part of, applying the entity suggestion algorithm discussed above with respect to block 304, such that the rating and ranking analysis is applied with respect to the query data received at block 302. In some embodiments, the rating and ranking analysis may be applied to all utterances stored in any one or more of entity indexes 306, while in some embodiments the rating and ranking analysis may be applied to only a subset of the entities stored in any one or more of entity indexes 306. In some embodiments, the rating and ranking analysis may be applied to a subset of results extracted from indexes 306 by the application of the entity suggestion algorithm discussed with respect to block 304; for example, the rating and ranking analysis may in some embodiments be applied to a subset of results identified by the algorithm and may further narrow that subset of results into a refined subset to be returned from the microservice.

Application of the rating and ranking analysis may generate confidence scores associated with respective entities stored in any one or more of entity indexes 306, wherein a confidence score may represent a strength of association (e.g., strength of matching) between a given entity and the query input data applied by the entity suggestion algorithm. Application of the rating and ranking analysis may further involve ranking entities from any one or more of the entity indexes in an order representing which entities are most preferred as suggested matches or responses for the query data. For example, ranking the entities may comprise ranking the confidence-scored entities in order of confidence score from highest (strongest confidence, most preferred) to lowest (weakest confidence, least preferred).

As shown at block 310, entity lookup service 300 may generate a payload configured to be transmitted to predictive intent service 102. The payload may comprise a ranked list of selected entities from one or more of the entity indexes, along with associated respective confidence scores for each entry on the list. In some embodiments, metadata included in the list may indicate (a) a confidence score of a list item and (b) a rank position in the list of the list item. In some embodiments, metadata included in the list may further indicate a unique entity identifier, such as a client identifier from an enterprise software system such as Salesforce. In some embodiments, the payload may be formatted in JSON.

In some embodiments, the list may comprise all entities in one or more of the entity indexes, while in some embodiments the list may comprise fewer than all entities in one or more of the entity indexes. In some embodiments, the list may comprise all entities returned by the entity suggestion algorithm, while in some embodiments the list may comprise fewer than all entities returned by the entity suggestion algorithm. In some embodiments, the list may comprise all entities assigned a confidence score by the rating and ranking analysis, while in some embodiments the list may comprise fewer than all entities assigned a confidence score by the rating and ranking analysis. In some embodiments, the list may comprise a predetermined number of entities. In some embodiments, the list may comprise a dynamically determined number of entities, for example a number of entities determined by application of the entity suggestion algorithm and/or application of the rating and ranking analysis. In some embodiments, only entities having confidence scores over a predefined or dynamically determined threshold cutoff may be included in the list.

As shown at block 312, entity lookup service 300 may transmit the payload to predictive intent service 102. Transmission of the payload to predictive intent service 102 may be performed responsively to receipt of the query data from predictive intent service 102 and generation of the payload. In some embodiments, transmission of the payload to predictive intent service 102 may be via any suitable wired or wireless electronic communication protocol.

One or more of entity indexes 306 may be communicatively coupled to source systems 314, and may be configured to receive transmissions (e.g., via wired or wireless network communication) from source systems 314. The transmitted data received from conversation modeling system 314 may comprise information usable by entity lookup service 300 (e.g., usable by one or more processors associated with entity lookup service 300) to create, populate, generate, update, or otherwise configure one or more of entity indexes 306. In some embodiments, a custom built source systems entity upload system manages the transfer of user-agnostic data elements from source systems to populate the entity indexes 306. The source systems entity upload system may receive source system data from API push/pull requests, including real-time API push/pull requests and/or scheduled batch API push/pull requests, or by subscribing to appropriate entity event streaming service topics. In some embodiments, information regarding entities to be stored in one or more of entity indexes 306 may be uploaded from one or more reference information sources aside from source systems 314.

Figure 4:
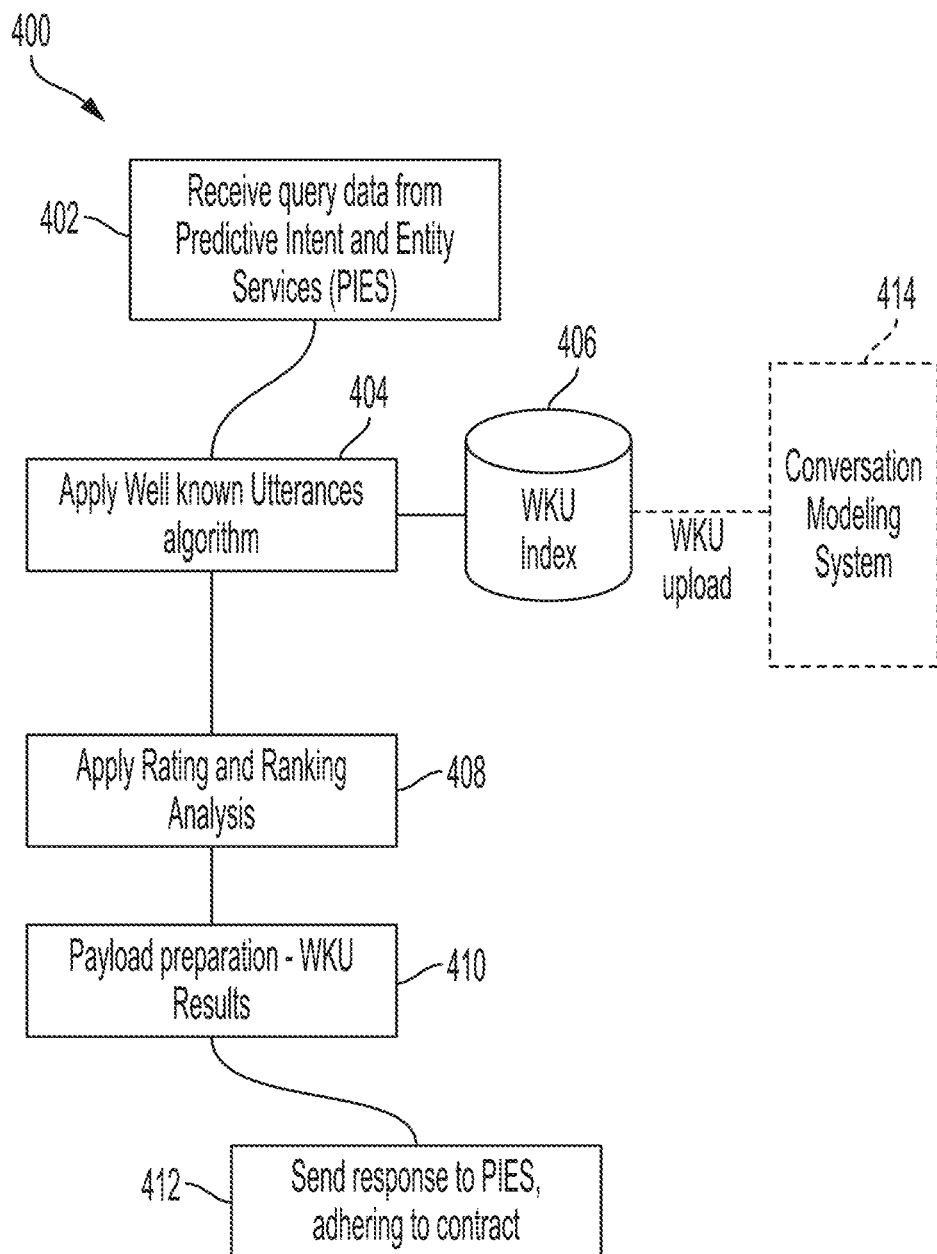
FIG. 4 depicts a well-known utterance microservice configured to operate as part of a system for language processing, in accordance with some embodiments.

FIG. 4 depicts components and operations of well-known utterance service 400, in accordance with some embodiments. As shown herein and explained below, well-known utterance service 400 may be configured to apply a well-known utterance algorithm to compare input data from predictive intent service 102 against a plurality of well-known utterances stored in a well-known utterance index, to apply a rating and ranking analysis to selected well-known utterances from the well-known utterance index, and to generate a payload comprising a ranked list of suggested well-known utterances to be transmitted back to predictive intent service 102.

As shown at block 402, well-known utterance service 400 may receive query data from predictive intent service 102. The query data may be received from predictive intent service 102 via any suitable wired or wireless electronic communication protocol, and the query data may comprise information about one or more utterances included in a user input received by predictive intent service 102.

As shown at block 404, well-known utterance service 400 may, responsive to receiving the query data from predictive intent service 102, apply a well-known utterance algorithm to compare the query data regarding the user's utterance(s) against well-known utterance index 406. The well-known utterance algorithm may be configured to evaluate a query entered by a user to ascertain whether or not a trigger phrase or trigger word from a predefined set of trigger phrases and trigger words has been provided and, if so, to return an associated intent and/or one or more associated entities associated with the well-known utterance. The well-known utterance algorithm may in some embodiments be configured to identify short words/phrases and/or abbreviated words/phrases that are in a corpus of well-known utterances. In some embodiments, a well-known utterance algorithm may thus "shortcut" one or more intent-identification processes (including other processes described herein) by executing quick and efficient matching that performs comparisons (e.g., text-to-text comparisons) between an input query and an index of predefined phrases and corresponding intents/entities. In some embodiments, a well-known utterance algorithm may also (additionally or alternatively) perform entity analysis and extract one or more identifiable entities from the input query to return the one or more identified entities (optionally along with one or more identified intents).

In some embodiments, a well-known utterance service such as service 400 may differ from an utterance lookup service such as system 200 in the utterance lookup service may use a more traditional full-text search, whereas a well-known utterance service may utilize a string comparison to evaluate input. Furthermore, corpuses/indexes for the two kinds of services may be loaded differently, and the two services may have separate and independent sources. In some embodiments, an utterance lookup service may receive content from an originating intent definition and training content, whereas a well-known utterance service may receive content from a business analyst and/or conversation modeler who is familiar with the vernacular and common terms of an enterprise.

In some embodiments, well-known utterance index 406 may be any suitable corpus of data comprising a plurality of well-known utterances. In some embodiments, a well-known utterance may be any utterance designated (e.g., by metadata and/or by storage location within an index or database) by a system as "well-known." In some embodiments, maintaining a dedicated corpus of well-known utterances separate from one or more other corpuses of all utterances (including those that are not well-known) may facilitate faster and more efficient lookup and searching based on user's input, such that common and well-known utterances may be found quickly and efficiently in the dedicated corpus without the need to search a much larger and/or exhaustive index of all utterances known to the system.

In some embodiments, well-known utterance index 406 may be provided as a database or as any other suitable data structure. In some embodiments, well-known utterance index 406 may be configured such that it is easily and efficiently searchable by the well-known utterance algorithm. In some embodiments, unlike utterance index 206, well-known utterance index 406 may not be configured to store information regarding synonyms for well-known utterances, as foregoing synonym indexing and searching may maintain high efficiency and reliability for a dedicated well-known utterance index. However, in some embodiments, well-known utterance index 406 may include synonym information in a similar manner as discussed above with respect to utterance index 206.

As shown at block 408, well-known utterance service 400 may apply a rating and ranking analysis to one or more of the well-known utterances stored in well-known utterance index 406. This rating and ranking analysis may be applied in conjunction with, or as a part of, applying the well-known utterance algorithm discussed above with respect to block 404, such that the rating and ranking analysis is applied with respect to the query data received at block 402. In some embodiments, the rating and ranking analysis may be applied to all well-known utterances stored in well-known utterance index 406, while in some embodiments the rating and ranking analysis may be applied to only a subset of the well-known utterances stored in well-known utterance index 406. In some embodiments, the rating and ranking analysis may be applied to a subset of results extracted from index 406 by the application of the well-known utterance algorithm discussed with respect to block 404; for example, the rating and ranking analysis may in some embodiments be applied to a subset of results identified by the algorithm and may further narrow that subset of results into a refined subset to be returned from the microservice.

Application of the rating and ranking analysis may generate confidence scores associated with respective well-known utterances stored in well-known utterance index 406, wherein a confidence score may represent a strength of association (e.g., strength of matching) between a given well-known utterance in the well-known utterance index and the query input data applied by the well-known utterance algorithm. Application of the rating and ranking analysis may further involve ranking well-known utterances from the well-known utterance index in an order representing which well-known utterances are most preferred as suggested matches or responses for the query data. For example, ranking the well-known utterances may comprise ranking the confidence-scored well-known utterances in order of confidence score from highest (strongest confidence, most preferred) to lowest (weakest confidence, least preferred).

As shown at block 410, well-known utterance service 400 may generate a payload configured to be transmitted to predictive intent service 102. The payload may comprise a ranked list of selected well-known utterances from the well-known utterance index, along with associated respective confidence scores for each entry on the list and any associated metadata for each entry on the list. In some embodiments, metadata included in the list may indicate (a) a confidence score of a list item and (b) a rank position in the list of the list item. In some embodiments, the payload may be formatted in JSON.

In some embodiments, the list may comprise all well-known utterances in the well-known utterance index, while in some embodiments the list may comprise fewer than all well-known utterances in the well-known utterance index. In some embodiments, the list may comprise all well-known utterances returned by the well-known utterance algorithm, while in some embodiments the list may comprise fewer than all well-known utterances returned by the well-known utterance algorithm. In some embodiments, the list may comprise all well-known utterances assigned a confidence score by the rating and ranking analysis, while in some embodiments the list may comprise fewer than all well-known utterances assigned a confidence score by the rating and ranking analysis. In some embodiments, the list may comprise a predetermined number of well-known utterances. In some embodiments, the list may comprise a dynamically determined number of well-known utterances, for example a number of well-known utterances determined by application of the well-known utterance suggestion algorithm and/or application of the rating and ranking analysis. In some embodiments, only well-known utterances having confidence scores over a predefined or dynamically determined threshold cutoff may be included in the list.

As shown at block 412, well-known utterance service 400 may transmit the payload to predictive intent service 102. Transmission of the payload to predictive intent service 102 may be performed responsively to receipt of the query data from predictive intent service 102 and generation of the payload. In some embodiments, transmission of the payload to predictive intent service 102 may be via any suitable wired or wireless electronic communication protocol.

Well-known utterance index 406 may be communicatively coupled to conversation modeling system 414, and may be configured to receive transmissions (e.g., via wired or wireless network communication) from conversation modeling system 414. The transmitted data received from conversation modeling system 414 may comprise information usable by well-known utterance service 400 (e.g., usable by one or more processors associated with well-known utterance service 400) to create, populate, generate, update, or otherwise configure well-known utterance index 406. For example, in some embodiments, a user of conversation modeling system 414 may execute input defining one or more well-known utterances which may be transmitted to well-known utterance index 406 such that they may thereafter be searchable by the well-known utterance suggestion algorithm. In some embodiments, a user of conversation modeling system 414 may define one or more well-known utterances as part of a conversation model that is uploaded to well-known utterance service 400. In some embodiments, conversation modeling system 414 may be the same conversation modeling system used by one or more other microservices of system 100 (including those other microservices discussed herein) or may be a separate conversation modeling system. In some embodiments, information regarding well-known utterances to be stored in well-known utterance index 406 may be uploaded from one or more reference information sources aside from conversation modeling system 414.

Figure 5:
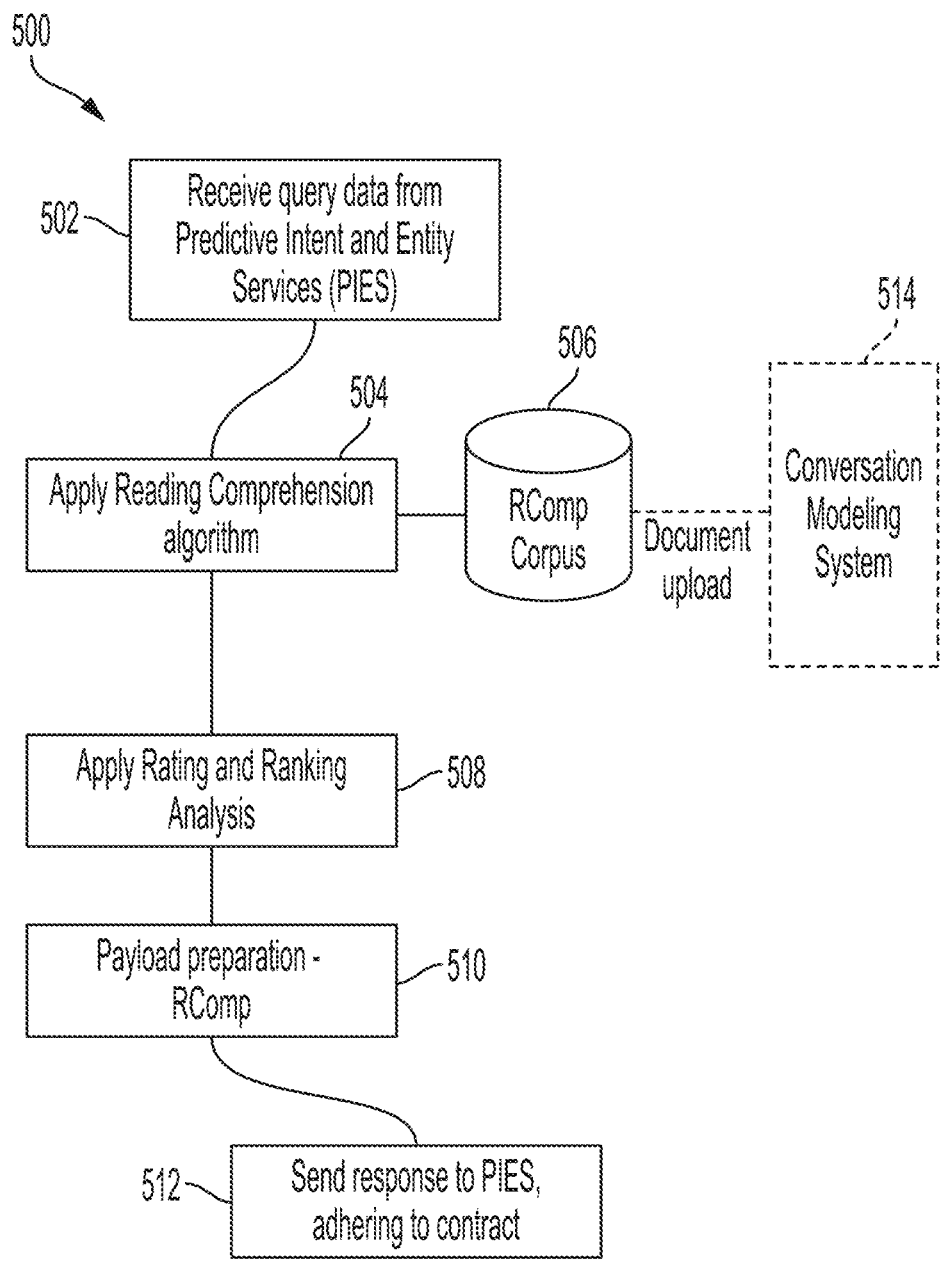
FIG. 5 depicts a reading comprehension microservice configured to operate as part of a system for language processing, in accordance with some embodiments.

FIG. 5 depicts components and operations of reading comprehension service 500, in accordance with some embodiments. As shown herein and explained below, reading comprehension service 500 may be configured to apply a reading comprehension algorithm to compare input data from predictive intent service 102 against a reading comprehension corpus containing information extracted from one or more documents, to apply a rating and ranking analysis to selected information from the reading comprehension corpus, and to generate a payload comprising a ranked list of suggested information from the one or more documents (such as, e.g., snippets of text from the one or more documents) to be transmitted back to predictive intent service 102.

In some embodiments, a reading comprehension microservice may be configured to analyze input query data by comparing it to information gleaned from one or more documents, such as indexed or mapped information that is generated from one or more document formats that may include .PDF, .DOCX, .TXT, .XLSX, or other document formats. In some embodiments, the information gleaned from one or more documents may be used to process user input including but not limited to questions and answers regarding logistics, policies, events, directions, FAQ's, and the like. In some embodiments, a reading comprehension microservice may enable the uploading of structured and/or semi-structured documents containing information to be extracted and leveraged by the system. In some embodiments, document structure may include one or more tags or metadata identifying and structuring information in the document. In some embodiments, data extraction by the reading comprehension service may be performed in accordance with one or more machine-learning algorithms. Documents may include, for example, audit journals, tax journals, human capital processes, or the like. In some embodiments, a reading comprehension service may use one or more algorithms and/or models to train a system implementing the service based on the content of the uploaded documents.

In some embodiments, the information contained in a reading comprehension corpus may be configured to be responsive to questions, such that the service may be geared toward answering users' questions. In some embodiments, a reading comprehension microservice may be configured to return one or more matching results from a corpus using terms and/or a question that is inputted into the service. In some embodiments, a reading comprehension microservice may return results that include a snippet of text that answers an inputted question. In some embodiments, a reading comprehension microservice may return a link to a document from which returned content (e.g., from which a snippet of text) was extracted.

In one example, a Human Capital Employee Handbook document may contain details of Working hours, Sabbatical eligibility, Maternity holidays, Paternity holidays, Maternity pay, etc. A reading comprehension service may extract information from the handbook document. When a user then sends a query asking "What is my paternity holiday allowance", the reading comprehension service may provide a response related to "paternity holidays" in isolation to the rest of the handbook document, rather than simply providing the entire handbook document.

As shown at block 502, reading comprehension service 500 may receive query data from predictive intent service 102. The query data may be received from predictive intent service 102 via any suitable wired or wireless electronic communication protocol, and the query data may comprise information about one or more utterances included in a user input received by predictive intent service 102.

As shown at block 504, reading service 500 may, responsive to receiving the query data from predictive intent service 102, apply a reading comprehension algorithm to compare the query data regarding the user's utterance(s) against reading comprehension corpus 506. The well reading comprehension algorithm may be configured to evaluate a query entered by a user to return all or part of information extracted from one or more documents and stored in reading comprehension corpus 506.

In some embodiments, reading comprehension corpus 506 may be any suitable corpus of data comprising information extracted from one or more structured and/or semi-structured documents, as discussed above. In some embodiments, reading comprehension corpus 506 may be provided as a database or as any other suitable data structure. In some embodiments, reading comprehension corpus 506 may be configured such that it is easily and efficiently searchable by the reading comprehension algorithm.

As shown at block 508, reading comprehension service 500 may apply a rating and ranking analysis to one or more of the results (e.g., information extracted from documents) stored in reading comprehension corpus 506. This rating and ranking analysis may be applied in conjunction with, or as a part of, applying the reading comprehension algorithm discussed above with respect to block 504, such that the rating and ranking analysis is applied with respect to the query data received at block 502. In some embodiments, the rating and ranking analysis may be applied to all information stored in reading comprehension corpus 506, while in some embodiments the rating and ranking analysis may be applied to only a subset of the information stored in reading comprehension corpus 506. In some embodiments, the rating and ranking analysis may be applied to a subset of results extracted from corpus 506 by the application of the reading comprehension algorithm discussed with respect to block 504; for example, the rating and ranking analysis may in some embodiments be applied to a subset of results identified by the algorithm and may further narrow that subset of results into a refined subset to be returned from the microservice.

Application of the rating and ranking analysis may generate confidence scores associated with respective information stored in reading comprehension corpus 506, wherein a confidence score may represent a strength of association (e.g., strength of matching) between a given piece of information stored in the reading comprehension corpus and the query input data applied by the reading comprehension algorithm. Application of the rating and ranking analysis may further involve ranking information from the reading comprehension corpus in an order representing which results are most preferred as suggested matches or responses for the query data. For example, ranking the information/results may comprise ranking the confidence-scored results in order of confidence score from highest (strongest confidence, most preferred) to lowest (weakest confidence, least preferred).

As shown at block 510, reading comprehension service 500 may generate a payload configured to be transmitted to predictive intent service 102. The payload may comprise a ranked list of selected information from the reading comprehension corpus, along with associated respective confidence scores for each entry on the list and any associated metadata for each entry on the list. In some embodiments, metadata included in the list may indicate (a) a confidence score of a list item and (b) a rank position in the list of the list item. In some embodiments, the payload may be formatted in JSON.

In some embodiments, the list may comprise all information in the reading comprehension corpus, while in some embodiments the list may comprise less than all information in the reading comprehension corpus. In some embodiments, the list may comprise all results (e.g., all pieces of information) returned by the reading comprehension algorithm, while in some embodiments the list may comprise fewer than all results returned by the reading comprehension algorithm. In some embodiments, the list may comprise all results assigned a confidence score by the rating and ranking analysis, while in some embodiments the list may comprise fewer than all results assigned a confidence score by the rating and ranking analysis. In some embodiments, the list may comprise a predetermined number of results. In some embodiments, the list may comprise a dynamically determined number of results, for example a number of results determined by application of the reading comprehension algorithm and/or application of the rating and ranking analysis. In some embodiments, only results having confidence scores over a predefined or dynamically determined threshold cutoff may be included in the list.

As shown at block 512, well-known utterance service 500 may transmit the payload to predictive intent service 102. Transmission of the payload to predictive intent service 102 may be performed responsively to receipt of the query data from predictive intent service 102 and generation of the payload. In some embodiments, transmission of the payload to predictive intent service 102 may be via any suitable wired or wireless electronic communication protocol.

Reading comprehension 606 may be communicatively coupled to conversation modeling system 514, and may be configured to receive transmissions (e.g., via wired or wireless network communication) from conversation modeling system 514. The transmitted data received from conversation modeling system 514 may comprise information usable by reading comprehension service 500 (e.g., usable by one or more processors associated with reading comprehension service 500) to create, populate, generate, update, or otherwise configure reading comprehension corpus 506. For example, in some embodiments, a user of conversation modeling system 514 may execute input defining one or more pieces of information (and/or processed for extracting information) that may be transmitted to reading comprehension corpus 506 such that those pieces of information (and/or information extracted in accordance with said processes) may thereafter be searchable by the reading comprehension algorithm. In some embodiments, a user of conversation modeling system 514 may define one or more pieces of information for storage in reading comprehension corpus (or may define one or more processes for extracting said information) as part of a conversation model that is uploaded to reading comprehension service 500. In some embodiments, conversation modeling system 514 may be the same conversation modeling system used by one or more other microservices of system 100 (including those other microservices discussed herein) or may be a separate conversation modeling system. In some embodiments, information to be stored in reading comprehension corpus 606 may be uploaded from one or more reference information sources (e.g., document sources) aside from conversation modeling system 514.

Figure 6:
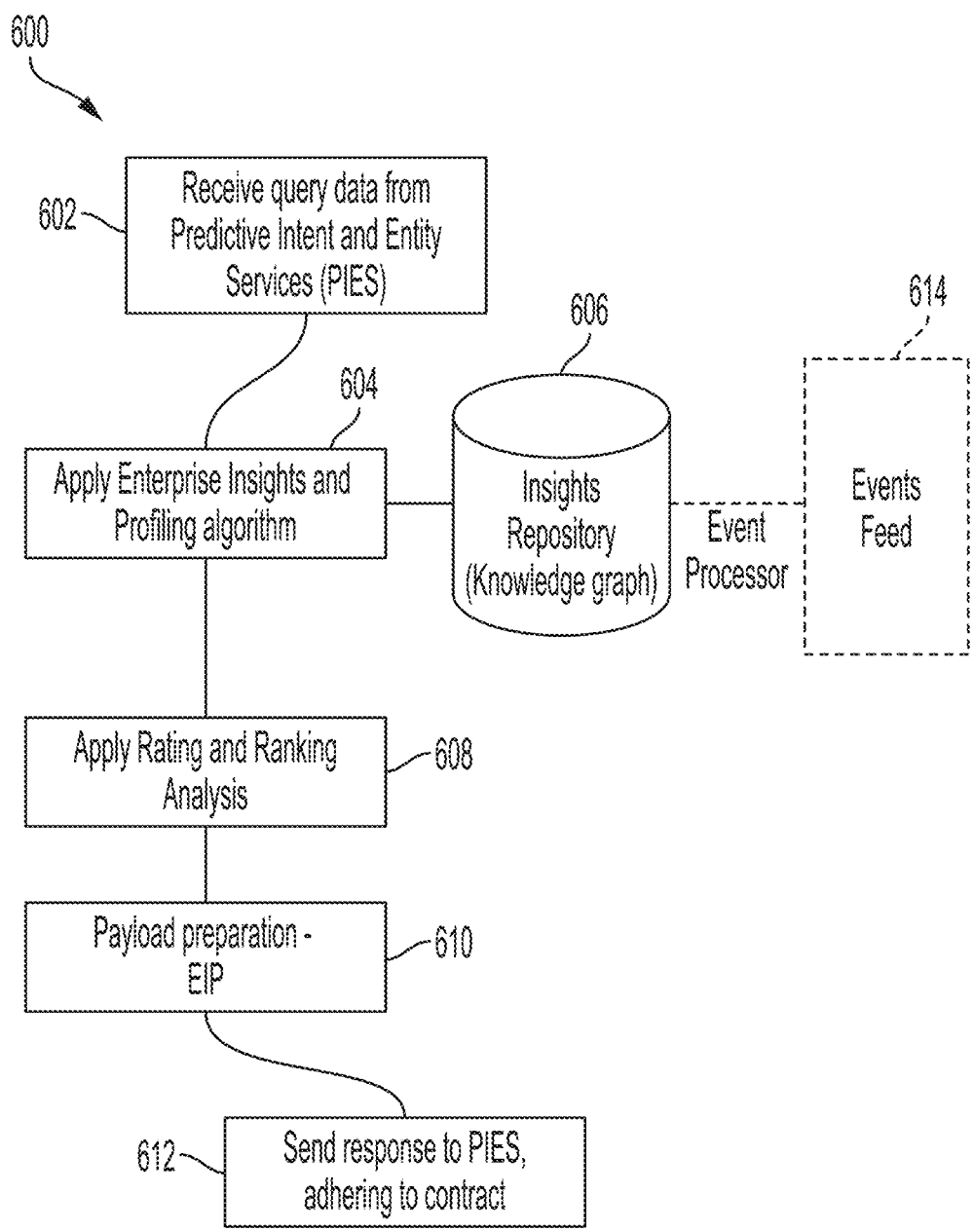
FIG. 6 depicts an enterprise insights and profiling microservice configured to operate as part of a system for language processing, in accordance with some embodiments.

FIG. 6 depicts components and operations of enterprise insights and profiling (EIP) service 600, in accordance with some embodiments. As shown herein and explained below, enterprise insights and profiling microservice 600 may be configured to apply an EIP algorithm to compare input data from predictive intent service 102 against a plurality of utterances and/or entities stored in an insights repository, to apply a rating and ranking analysis to selected utterances and/or entities from the insights repository, and to generate a payload comprising a ranked list of suggested utterances and/or entities to be transmitted back to predictive intent service 102.

In some embodiments, an EIP microservice may be configured to perform ad-hoc queries relating to personalized/related information, such as by returning data such as: utterance history, entity usage history, relationships to entities (person, clients, etc.). In some embodiments, providing personalized/related information in response to queries may aid in allowing the system to provide personal predictive results.

As explained herein, EIP service 600 may be configured to process query data from predictive intent service 102 and to responsively return a payload of suggested utterances and/or entities in a similar manner as other microservices discussed herein; however, EIP service 600 may differ from other microservices discussed herein at least due to the manner in which the insights repository is created, configured, and maintained. As discussed in further detail below, insights repository 606 may in some embodiments be a more complex data structure than other indexes or corpuses searched by other microservices discussed herein; for example, insights repository 606 may in some embodiments comprise a knowledge graph, relationship graph, or other data structure representing one or more relationships between various entities and/or utterances, including by representing the strengths of those relationships. In some embodiments, insights repository 606 may represent information gleaned from historical conversations of users; current trends of conversations within enterprise systems; current trends in a firm, industry, sector; global and political trends; and/or information about a user such as the user's skillset, location, compliance details, interests, preferences, etc.

In some embodiments, a relationship graph of insights repository 606 may store user-specific data (e.g., utterances and entities used historically by the user) and/or user attributes (e.g., employee information, location, email, department, line of service, engagements, projects, etc.). In some embodiments, a relationship graph of insights repository 606 may store data in one or more data structures comprising nodes, edges, and properties. Graph structures of such a graph may be populated from system usage (e.g., in real time), system of record (SOR) feeds (in batch and/or in real time), and/or system trends (e.g., in batch).

In some embodiments, cached data may be accessible via EIP service 600 (and/or via one or more other system components of any system described herein). Cached data may comprise user-specified data that resides in a cache structure and may comprise data that does not change often, including for example email data for a person, ID data for a person or organization, profile information for a person or organization, recent activity information for a person or organization, etc. In some embodiments, cached data may be stored in JSON format and may be populated and/or updated in real-time and/or as part of one or more batch processes from platform events. In some embodiments, cached data may be stored separately from predictive intent system 104. In some embodiments, cached data may be accessed in real time during user sessions, and/or may be accessed in conjunction with one or more service calls. In some embodiments, cached data may be used as keys or data points to pass to other microservices within the system and/or outside of the system.

In some embodiments, indexed data may be accessible via EIP service 600 (and/or via one or more other system components of any system described herein). Indexed data may comprise one or more collections of indexed data that may be stored in JSON format. Indexed data may be user-agnostic and may comprise one or more lists of entities represented as the same type of value that may be of interest to multiple users, such as utterance data, client data, people data, or the like. In some embodiments, indexed data may be stored as part of insights repository 606. Indexed data may be configured to be searched directly upon, and/or to be searched in combination with the one or more other data sources within insights repository 606. Indexed data may be configured to be evaluated and/or scored against other matches from one or more other data sources, such as graphs, databases, other indexes, or the like.

In some embodiments, system of record (SOR) data may be accessible via EIP service 600 (and/or via one or more other system components of any system described herein). SOR data may in some embodiments be used to populate, configure, and/or update one or more graph structures or other data structures of insights repository 606.

In some embodiments, one or more APIs may return SOR data, for example in real-time, such as an entity value from a user. SOR data may be retrieved in JSON format populated by any suitable system of SOR API process from an API call passing proper security and data elements (e.g., tokens, API secret/keys, query values, etc.).

The EIP algorithm configured to query the insights repository may thus return insightful information, such as information gleaned from the data sources and data structures discussed above, which may not be available from other microservices discussed herein.

As shown at block 602, EIP service 600 may receive query data from predictive intent service 102. The query data may be received from predictive intent service 102 via any suitable wired or wireless electronic communication protocol, and the query data may comprise information about one or more utterances included in a user input received by predictive intent service 102.

As shown at block 604, EIP service 600 may, responsive to receiving the query data from predictive intent service 102, apply an EIP algorithm to compare the query data regarding the user's utterance(s) against insights repository 606.

In some embodiments, insights repository 606 may be provided as a database or as any other suitable data structure. As stated above, insights repository 606 may be a corpus of data (e.g., an index, database, data store, etc.) storing information regarding a plurality of utterances and/or entities. Furthermore, insights repository may store information regarding relationships amongst the various utterances and/or entities represented in the repository. Information about relationships may be stored regarding entity-entity pairs, entity-utterance pairs, and utterance-utterance pairs. In some embodiments, information in the insights repository may be stored as a knowledge graph and/or relationship graph.

In some embodiments, information about relationships between entities and/or utterances may be represented by a relationship score indicating a strength of the relationship. For example, a relationship score may in some embodiments be a number between 0 and 1, where 0 represents the weakest possible relationship (e.g., no relation) and 1 represents the strongest possible relationship. In some embodiments, relationship scores may be determined by information received at the insights repository from an events feed (e.g., events feed 614), as discussed in further detail below. Information received by the insights repository regarding entities and/or utterances (e.g., information received from an events feed) may be used to create new relationships, delete existing relationships, and/or update/modify existing relationships (such as by adjusting a relationship score).

In some embodiments, insights repository 606 may be configured such that relationships represented therein age over time. For example, relationship scores may be configured to decay (e.g., weaken) over time, for example in accordance with a predefined decay algorithm (e.g., linear decay, logarithmic decay, decay according to a predefined schedule, decay in accordance with one or more triggering events, etc.). In some embodiments, certain relationships may be designated in insights repository 606 as aging relationships such that their relationship score decays over time, while other relationships may be designated in insights repository 606 as non-aging relationships such that their relationship score does not decay over time.

In some embodiments, insights repository 606 may be configured such that it is easily and efficiently searchable by the EIP algorithm. In some embodiments, insights repository 606 may store one or more utterances and/or entities in association with one or more synonyms, such that searching for an utterance via synonyms may be enabled. In some embodiments, an EIP microservice may be configured to receive internal and/or external events from various channels such as enterprise systems, collaboration tools, and/or other enterprise knowledge bases. The EIP service may then utilize a relationship analyzer and/or an event processor to process the received events into insights repository 606. In some embodiments, an EIP service may also provide the ability to query insights repository 606 via real time queries and/or by scheduled processes (e.g., business-rule processes). In some embodiments, an EIP service may provide the ability to establish insightful relationships, as represented in insights repository 606, among enterprise entities and intents, for the purpose of proactively and reactively providing the most efficient and relevant content for enterprise users.

In some embodiments, an EIP service may use a number of data sources to enrich the experience for users, and may detect relevant intents and/or entities based on, for example: historical conversations of users; current trends of conversations within enterprise systems; current trends in a firm; industry, sector, world and/or political trends; and/or information from an insights repository and/or knowledge graph pertaining to a user, such as skillset, location, compliance details, interests, preferences, etc.

As shown at block 608, EIP service 600 may apply a rating and ranking analysis to one or more of the utterances and/or entities stored in insights repository 606. This rating and ranking analysis may be applied in conjunction with, or as a part of, applying the EIP algorithm discussed above with respect to block 604, such that the rating and ranking analysis is applied with respect to the query data received at block 602. In some embodiments, the rating and ranking analysis may be applied to all utterances and/or entities stored in insights repository 606, while in some embodiments the rating and ranking analysis may be applied to only a subset of the utterances and/or entities stored in insights repository 606. In some embodiments, the rating and ranking analysis may be applied to a subset of results extracted from repository 606 by the application of the EIP algorithm discussed with respect to block 604; for example, the rating and ranking analysis may in some embodiments be applied to a subset of results identified by the algorithm and may further narrow that subset of results into a refined subset to be returned from the microservice.

Application of the rating and ranking analysis may generate confidence scores associated with respective utterances and/or entities stored in insights repository 606, wherein a confidence score may represent a strength of association (e.g., strength of matching) between a given utterance and/or entity in the insights repository 606 and the query input data applied by the EIP algorithm. Application of the rating and ranking analysis may further involve ranking utterances and/or entities from the insights repository 606 in an order representing which utterances and/or are most preferred as suggested matches or responses for the query data. For example, ranking the utterances and/or entities may comprise ranking the confidence-scored utterances and/or entities in order of confidence score from highest (strongest confidence, most preferred) to lowest (weakest confidence, least preferred).

As shown at block 610, EIP service 600 may generate a payload configured to be transmitted to predictive intent service 102. The payload may comprise a ranked list of selected utterances and/or entities from the insights repository, along with associated respective confidence scores for each entry on the list and any associated metadata for each entry on the list. In some embodiments, metadata included in the list may indicate (a) a confidence score of a list item and (b) a rank position in the list of the list item. In some embodiments, the payload may be formatted in JSON.

In some embodiments, the list may comprise all utterances and/or entities in the insights repository, while in some embodiments the list may comprise fewer than all utterances and/or entities in the insights repository. In some embodiments, the list may comprise all utterances and/or entities returned by the EIP algorithm, while in some embodiments the list may comprise fewer than all utterances and/or entities returned by the EIP algorithm. In some embodiments, the list may comprise all utterances and/or entities assigned a confidence score by the rating and ranking analysis, while in some embodiments the list may comprise fewer than all utterances and/or entities assigned a confidence score by the rating and ranking analysis. In some embodiments, the list may comprise a predetermined number of utterances and/or entities. In some embodiments, the list may comprise a dynamically determined number of utterances and/or entities, for example a number of utterances and/or entities determined by application of the EIP algorithm and/or application of the rating and ranking analysis. In some embodiments, only utterances and/or entities having confidence scores over a predefined or dynamically determined threshold cutoff may be included in the list.

As shown at block 612, EIP service 600 may transmit the payload to predictive intent service 102. Transmission of the payload to predictive intent service 102 may be performed responsively to receipt of the query data from predictive intent service 102 and generation of the payload. In some embodiments, transmission of the payload to predictive intent service 102 may be via any suitable wired or wireless electronic communication protocol.

Insights repository 606 may be communicatively coupled to conversation modeling system 614, and may be configured to receive transmissions (e.g., via wired or wireless network communication) from events feed 614. Events feed 614 may include any one or more systems configured to monitor (e.g., subscribe to) a plurality of sources of information to ingest new information about events as they occur. As explained herein, the ingested information about events may be processed to generate information regarding entities, utterances, and/or relationships related to those events for storage in insights repository 606.

The transmitted data received from events feed 614 may comprise information usable by EIP service 600 (e.g., usable by one or more processors associated with EIP service 600) to create, populate, generate, update, or otherwise configure insights repository 606. For example, in some embodiments, information regarding entities, utterances, and/or relationships may be uploaded to insights repository 606 from events feed 614; in some embodiments, as discussed further herein, an events processor system may process information from events feed 614 in order to generate data to be uploaded to insights repository 606. In some embodiments, information regarding utterances, entities, and/or relationships to be stored in insights repository 606 may be uploaded from one or more reference information sources aside from events feed 614.

Figure 7:
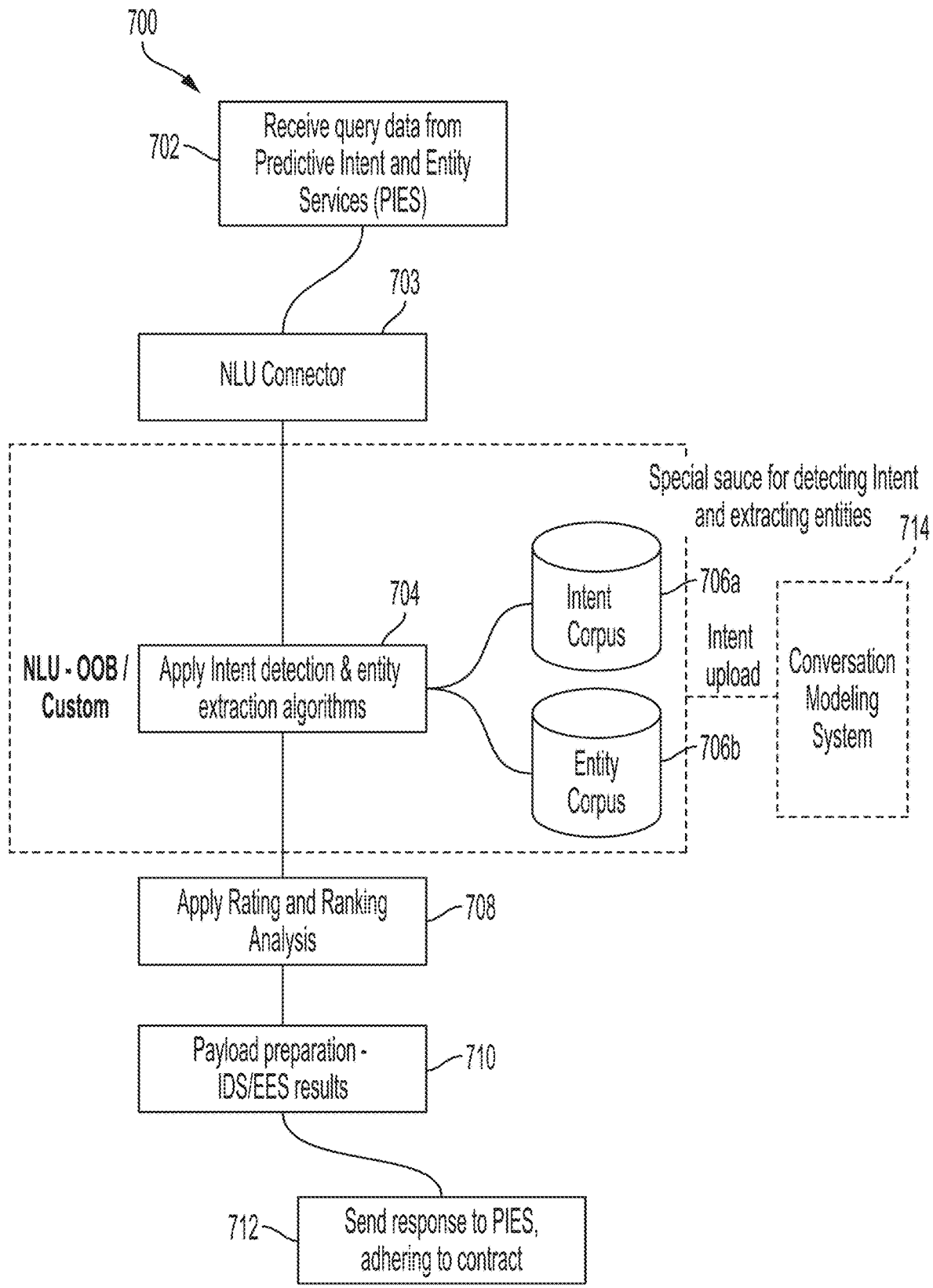
FIG. 7 depicts an intent detection microservice and an entity extraction microservice, each configured to operate as part of a system for language processing, in accordance with some embodiments.

FIG. 7 depicts components and operations of intent detection service 700a (as shown in FIG. 1) and entity extraction service 700b (as shown in FIG. 1), collectively referred to herein as IDS/EES 700, in accordance with some embodiments. As shown herein and explained below, IDS/EES 700 may be configured to apply an intent detection algorithm and an entity extraction suggestion algorithm to compare input data from predictive intent service 102 against a plurality of intents and/or entities stored in one of one or more of an intent understanding corpus and an entity corpus, to apply a rating and ranking analysis to selected entities and/or intents from one of the one or more entity indexes, and to generate a payload comprising a ranked list of suggested entities and/or intents to be transmitted back to predictive intent service 102. In some embodiments, IDS/EES 700 may be utilized by system 100 in situations in which one or more of the other microservices have not been successful in identifying an utterance, intent, and/or entity. By using an NLU connector as discussed below, IDS/EES 700 may allow for system 100 to leverage one or more internal and/or external NLU/NLP services that may be connected to the system without being manually integrated into the system other than through the NLU connector. In some embodiments, IDS/EES 700 may be utilized by system 100 to analyze user input to detect which part of the user input is valuable to extract and pass values to call the utterance lookup service 200 and/or well-known utterance service 400.

As shown at block 702, IDS/EES 700 may receive query data from predictive intent service 102. The query data may be received from predictive intent service 102 via any suitable wired or wireless electronic communication protocol, and the query data may comprise information about one or more utterances included in a user input received by predictive intent service 102. In some embodiments, predictive intent service 102 may be connected to one or more components (e.g., processing components) of IDS/EES 700 by natural language understanding (NLU) connector 703, which may be configured to facilitate network communication (e.g., wired or wireless network communication) between predictive intent service 102 and one or more computing and/or data storage components of IDS/EES 700, such as processors and/or databases.

As shown at block 704, IDS/EES 700 may, responsive to receiving the query data from predictive intent service 102, apply an intent detection algorithm and/or an entity extraction algorithm to compare the query data regarding the user's utterance(s) against one or more of an intent understanding corpus 706a and an entity corpus 706b.

In some embodiments, IDS and EES algorithms may be separate and distinct from one another, but their results may be aggregated as a single output for use by the overall system and/or by other system components. In some embodiments, an IDS algorithm may include a machine learning algorithm or other algorithm for ascertaining a user's intent, and may evaluate an input query for natural language patterns and compare and evaluate incoming query data with reference to the data set within an intent understanding corpus and/or entity corpus to determine a user intent. In some embodiments, an EES algorithm may evaluate an input query to ascertain if there are any identifiable entities based on comparison with an entity corpus. In some embodiments, both an IDS and EES algorithm may rank and score results based on relevant hits/matches within the corpus queried.

In some embodiments, intent understanding corpus 706a may be any suitable corpus of data comprising a plurality of intents, and entity corpus 706b may be any suitable corpus of data comprising a plurality of entities. In some embodiments, one or both of intent understanding corpus 706a and entity corpus 706b may be provided as a database or as any other suitable data structure. In some embodiments, one or both of intent understanding corpus 706a and entity corpus 706b may be configured such that they are easily and efficiently searchable by the intent detection algorithm and/or entity extraction algorithm. In some embodiments, one or both of intent understanding corpus 706a and entity corpus 706b may store one or more information objects in association with one or more synonyms, such that searching for an entity or intent via synonyms may be enabled.

In some embodiments, intent understanding corpus 706a may comprise data including intents themselves as well as training content corresponding to one or more respective intents (e.g., training content that may trigger the intent). In some embodiments, one or more conversation models may be contributors to intent understanding corpus 706a. In some embodiments, intent understanding corpus 706a may be generated and maintained separately from one or more conversation models and/or other components of the systems described herein. Even though segregation between intent understanding corpus 706a and conversation models may exist, intent understanding corpus 706a may and conversation models may be correlated via unique identifiers (e.g., UUIDs) identifying an intent. In some embodiments, once an intent is determined by the system, the system may use a corresponding intent identifier to look up one or more conversation models that may define how to retrieve results in accordance with the determined intent.

In some embodiments, natural language understanding (NLU) connector 703 may provide capability for connecting to multiple NLU solutions and/or natural language processing (NLP) solutions. In some embodiments, various different NLU/NLP solutions (e.g., Google Dialogflow, IBM Watson, Microsoft LUIS, etc.) may be configured to process requests that are in a specified format comprising, e.g.: authentication/identifier, request type, request data, etc. Each request format may be specific to a single NLU/NLP solution. NLU connector 703 may be configured to enable the systems described herein to communicate with a plurality of different NLU/NLP solutions using the proper respective formats, thus enabling simultaneous and/or parallelized communication with multiple different NLU/NLP solutions without requiring code-level changes.

In some embodiments, IDS/EES 700 may be configured to search both intent understanding corpus 706a and entity corpus 706b, to selectively search only one or the other (e.g., in accordance with user instruction or in accordance with an automatic determination as to which corpus to search), and/or to the different corpuses in a different manner (e.g., by applying the detection/extraction algorithm(s) of IDS/EES 700 differently or separately, or by applying different parts of the query data to different corpuses).

As shown at block 708, IDS/EES 700 may apply a rating and ranking analysis to one or more of the intents and/or entities stored in any one or more of indexes 706a and 706b. This rating and ranking analysis may be applied in conjunction with, or as a part of, applying the algorithm discussed above with respect to block 704, such that the rating and ranking analysis is applied with respect to the query data received at block 702. In some embodiments, the rating and ranking analysis may be applied to all intents and/or entities stored in any one or more of corpuses 706a and 706b, while in some embodiments the rating and ranking analysis may be applied to only a subset of the intents and/or entities stored in any one or more of indexes 706a and 706b. In some embodiments, the rating and ranking analysis may be applied to a subset of results extracted from indexes 706a and/or 706b by the application of the IDS and EES algorithm(s) discussed with respect to block 704; for example, the rating and ranking analysis may in some embodiments be applied to a subset of results identified by the algorithm(s) and may further narrow that subset of results into a refined subset to be returned from the microservice.

In some embodiments, IDS and EES results may be returned, aggregated, refined, rated, and/or ranked collectively (e.g., with IDS results and EES results in a common results set). In some embodiments, IDS and EES results may be returned, aggregated, refined, rated, and/or ranked separately from one another (e.g., with IDS results and EDS results in segregated results sets from one another).

Application of the rating and ranking analysis may generate confidence scores associated with respective intents and/or entities stored in one or both of the corpuses 706a and 706b, wherein a confidence score may represent a strength of association (e.g., strength of matching) between a given intent or entity and the query input data applied by the algorithm. Application of the rating and ranking analysis may further involve ranking intents and/or entities from one or both of the corpuses in an order representing which intents and/or entities are most preferred as suggested matches or responses for the query data. For example, ranking the intents and/or entities may comprise ranking the confidence-scored entities in order of confidence score from highest (strongest confidence, most preferred) to lowest (weakest confidence, least preferred). In some embodiments, intents from intent understanding corpus 706a may be rated and ranked (e.g., formed into a list) separately from entities from entity corpus 706b; in some embodiments, they may be rated and ranked together (e.g., formed into a single list).

As shown at block 710, IDS/EES 700 may generate a payload configured to be transmitted to predictive intent service 102. The payload may comprise one or more ranked lists of selected entities and/or intents from one or both of the corpuses 706a and 706b, along with associated respective confidence scores for each entry on the list(s) and any associated metadata for each entry on the list(s). In some embodiments, metadata included in the list(s) may indicate (a) a confidence score of a list item and (b) a rank position in the list of the list item. In some embodiments, the payload may be formatted in JSON.

In some embodiments, the list(s) may comprise all entities/intents in one or both of the corpuses, while in some embodiments the list(s) may comprise fewer than all entities/intents in one or both of the corpuses. In some embodiments, the list(s) may comprise all entities/intents returned by the algorithm(s), while in some embodiments the list(s) may comprise fewer than all entities/intents returned by the algorithm(s). In some embodiments, the list(s) may comprise all entities/intents assigned a confidence score by the rating and ranking analysis, while in some embodiments the list(s) may comprise fewer than all entities/intents assigned a confidence score by the rating and ranking analysis. In some embodiments, the list(s) may comprise a predetermined number of entities/intents. In some embodiments, the list(s) may comprise a dynamically determined number of entities/intents, for example a number of entities/intents determined by application of the algorithm(s) and/or application of the rating and ranking analysis. In some embodiments, only entities/intents having confidence scores over a predefined or dynamically determined threshold cutoff may be included in the list(s).

As shown at block 712, IDS/EES 700 may transmit the payload to predictive intent service 102. Transmission of the payload to predictive intent service 102 may be performed responsively to receipt of the query data from predictive intent service 102 and generation of the payload. In some embodiments, transmission of the payload to predictive intent service 102 may be via any suitable wired or wireless electronic communication protocol.

One or both of intent understanding corpus 706a and entity corpus 706b may be communicatively coupled to conversation modeling system 714, and may be configured to receive transmissions (e.g., via wired or wireless network communication) from conversation modeling system 714. The transmitted data received from conversation modeling system 714 may comprise information usable by IDS/EES 700 (e.g., usable by one or more processors associated with IDS/EES 700) to create, populate, generate, update, or otherwise configure one or both of intent understanding corpus 706a and entity corpus 706b. For example, in some embodiments, a user of conversation modeling system 714 may execute input defining one or more intents and/or entities which may be transmitted to one or both of intent understanding corpus 706a and entity corpus 706b such that they may thereafter be searchable by the intent detection algorithm and/or entity extraction algorithm. In some embodiments, a user of conversation modeling system 714 may define one or more entities and/or intents as part of a conversation model that is uploaded to IDS/EES 700. (In some embodiments, conversation models and intents may have a 1:1 relationship, such that a single intent corresponds only to one conversation model.) In some embodiments, conversation modeling system 714 may be the same conversation modeling system used by one or more other microservices of system 100 (including those other microservices discussed herein) or may be a separate conversation modeling system. In some embodiments, information regarding intents and/or entities to be stored in one or both of intent understanding corpus 706a and entity corpus 706b may be uploaded from one or more reference information sources aside from conversation modeling system 714.

Exemplary Methods

Figure 8:
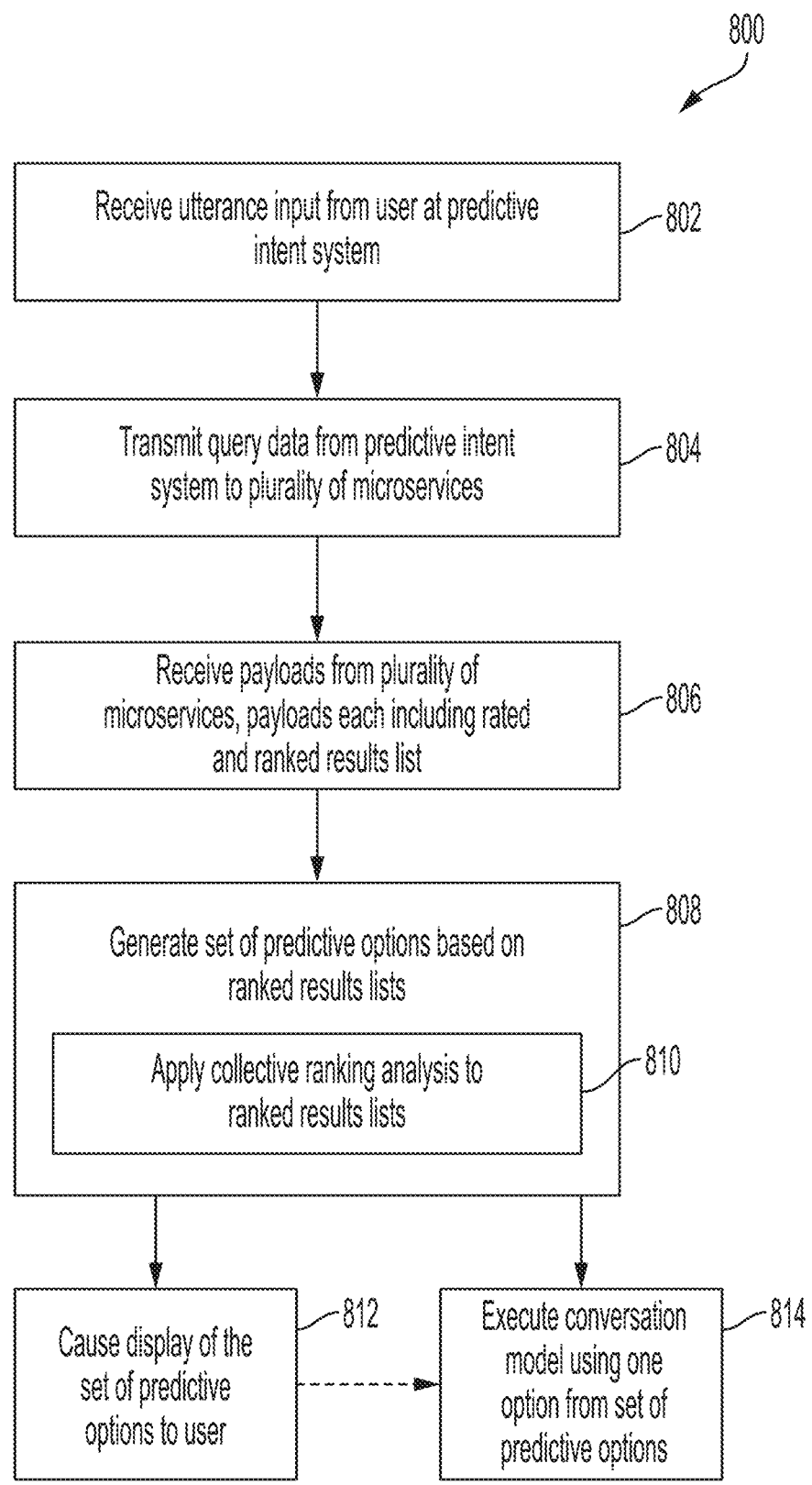
FIG. 8 depicts a flow chart showing an exemplary method 800 for processing an utterance input, in accordance with some embodiments.

FIG. 8 depicts a flow chart showing an exemplary method 800 for processing an utterance input using a plurality of language processing microservices, in accordance with some embodiments. In some embodiments, method 800 may be performed by a system for language processing such as system 100 described above with reference to FIG. 1. In particular, the method steps of method 800 may be performed by a predictive intent system of a language processing system, such as predictive intent system 104 of language processing system 100. Exemplary steps of method 800 are described below.

At block 802, in some embodiments, predictive intent system 104 may receive an utterance input from a user. In some embodiments, the utterance input may be received from a user device such as user device 102 and may be forwarded (e.g., via wired or wireless network communication) to predictive intent system 104. In some embodiments, user device 102 may be configured to receive an input from a user in the form of a spoken and/or written utterance, and to responsively transmit data (e.g., via wired and/or wireless network communication) derived from the user input to predictive intent system 104. In some embodiments, user device 102 may send a query based on one or more user input utterances to predictive intent system 104. In some embodiments, user device 102 may send raw data regarding user input to predictive intent system 104, and predictive intent system 104 may process the data received from user device 102 in order to generate query data to be forwarded to a plurality of microservices.

In the case of written utterances, the system 100 may in some embodiments be configured to analyze the typed utterance after a user explicitly directs the system to (e.g., when the user is done typing); in some embodiments, the system 100 may be configured to analyze the typed utterance (s) in real-time following each keystroke by a user.

At block 804, in some embodiments, predictive intent system 104 may transmit query data to a plurality of microservices. Based on the input data (e.g., raw or processed data representing all or part of a user's utterance) received from user device 102, predictive intent system 104 may generate and transmit query data to a plurality of language processing microservices. The query data may be configured to be supplied, by the plurality of microservices, to searching and rating/ranking algorithms to generate payloads including ranked lists of predicted intents, entities, and/or utterances based on the user's input utterance. In this way, predictive intent system 104 may receive an input user utterance and leverage the plurality of microservices to predict an intent, entity, and/or utterance signified by the user's input utterance.

In some embodiments, the query data to be transmitted to the plurality of microservices may be generated by predictive intent system 104. In some embodiments, the same query data may be transmitted to each of the plurality of microservices; in some embodiments, different query data may be transmitted to different ones of the plurality of microservices.

In some embodiments, predictive intent system 104 may transmit query data to all available microservices; in some embodiments, predictive intent system 104 may transmit query data to a subset of available microservices, based on explicit user input, system settings, and/or the content of the input utterance and query data itself.

After predictive intent system 104 sends query data to the plurality of microservices, each of the recipient microservices may process the query data in order to analyze the user's utterance and generate a ranked list of predictive intents, entities, and/or utterances. In some embodiments, one or more of the microservices may process the query data by (1) applying a respective mapping algorithm to the query data and to a respective index or corpus of the like, wherein the respective index or corpus comprises representations of entities, utterances, and/or intents; (2) applying a respective rating algorithm to generate a ranked list of potential entities, utterances, and/or intents based on the content represented by the respective index or corpus; and (3) generating a respective query response payload, wherein generating the payload comprises selecting, based on the ranked list, a respective subset of the entities, utterances, and/or intents.

In some embodiments, one or more of the microservices may process the query data and generate a payload in accordance with one or more of the characteristics of any one of the embodiments explained above with respect to microservices 200, 300, 400, 500, 600, and 700 explained above with respect to FIGS. 2-7.

At block 806, in some embodiments, predictive intent system 104 may receive respective payloads from the plurality of microservices, each of the payloads including a respective rated and ranked list of results responsive to the query data. In some embodiments, the payloads received from each of the plurality of microservices may each share any one or more of the characteristics of any one of the embodiments explained above with respect to microservices 200, 300, 400, 500, 600, and 700 explained above with respect to FIGS. 2-7.

At block 808, in some embodiments, predictive intent system 104 may generate a set of predictive options based on the rated and ranked lists received in the payloads. That is, predictive intent system 104 may process the aggregated results from each of the microservices in order to generate a set of refined results, wherein the set of refined results is a subset of the aggregated results received collectively from the queried microservices.

In some embodiments, generating the set of refined results may comprise evaluating the results (e.g., utterances, entities, and/or intent) included in the various ranked lists received from the microservices in order to evaluate results returned by one or more microservices, including for example connectivity results, user preference results, and/or autosuggestion search results.

In some embodiments, connectivity results may be a result from a relationship graph, such as data that is returned in response to inputting data that is compared against the relationship graph. In some embodiments, a connectivity result may be associated with a connectivity strength, which may indicate how strong a relationship within the relationship graph is between the input and the result. In some embodiments, a connectivity strength may be based on a relationship score represented in the relationship graph. In some embodiments, a connectivity strength may be based on a number of degrees of separation between the input and the result in the relationship graph. In some embodiments, a connectivity strength may be a numerical value.

In some embodiments, user preference results may comprise historical usage of utterances and entity values for a user. In some embodiments, user preference results may be in the form of matches between a user's entry and the user's previous entries and/or selections.

In some embodiments, auto-suggest results may comprise matches to data that contains one or more utterances and/or entities that are the same for all users (e.g., are not specifically tailored to any particular user In some embodiments, connectivity results, user preference results, and/or auto-suggestion results may be collectively analyzed. For example, connectivity results may include a numerical value, user preference results may comprise a weight value indicating how much weight is to be given to user preference, and auto-suggestion results may comprise a derived score based on ranked matching. A respective weight may be assigned to each source (e.g., to each of the connectivity results, user preference results, and/or auto-suggestion results) and multiplied by the corresponding value/score, providing a respective weighted score for each source. The weighted scores may then be aggregated collectively. In some embodiments, once the weighted scores are presented for aggregation, logic may be applied to identify which results are similar and which are different. In some embodiments, based on similarities and differences, weights may be updated for one or more of the sources. Finally, weighted results may be sorted and prepared to be returned to a querying system. In some embodiments, scoring techniques such as this may be used recursively for scoring aggregated results generated by the scoring analysis, with other aggregated scoring analysis done on similar relevancy types.

In some embodiments, relevancy types may comprise entity types such as person, client, place, date, etc. In some embodiments, relevancy types may comprise intent and utterance. In some embodiments, relevancy types may be used to classify and/or categorize one or more results returned by the system responsive to a query, such that a user may see which results correspond to what relevancy types. In some embodiments, similar relevancy types may be compared to the same type of data patterns or types (e.g., utterance scores may be compared to other utterance scores, entity scores may be compared to other entity scores, etc.). In some embodiments, results including relevancy types including two or more different relevancy types may be collectively analyzed and/or compared against one another.

At block 810, in some embodiments, generating the set of predictive options comprises applying a collective ranking analysis to the rated and ranked lists received in the payloads. In some embodiments, applying a collective ranking analysis to the results received in the ranked lists from the microservices may comprise evaluating results on the basis of confidence scores included in the received payloads (optionally following normalizing the confidence scores included in the received payloads). In some embodiments, applying a collective ranking analysis to the results received in the ranked lists from the microservices may comprise evaluating the results on the basis of criteria not considered in calculating the confidence scores included in the received payloads.

At block 812, in some embodiments, predictive intent system 104 may cause display of the set of predictive options to the user. In some embodiments, predictive intent system may transmit data to user device 102 to cause user device 102 to display the set of predictive options to the user, for example such that the user may select a preferred and/or intended one of the predictive options.

At block 814, in some embodiments, predictive intent system 104 may cause execution of one or more conversation models in accordance with one or more predictive options in the set of predictive options. In some embodiments, predictive intent system 104 may itself execute (or may cause another system component inside or outside system 100 to execute) one or more conversation models associated with or identified by one of the options in the set of predictive options, or may itself execute (or may cause another system component inside or outside system 100 to execute) one or more conversation models using an entity or an utterance identified by one of the options in the set of predictive options. In some embodiments, a user may select one of the predictive options displayed at block 812, and the system may then cause execution of a conversation model at block 814 using the option selected by the user at block 812.

Exemplary Graphical User Interfaces

Figure 9:
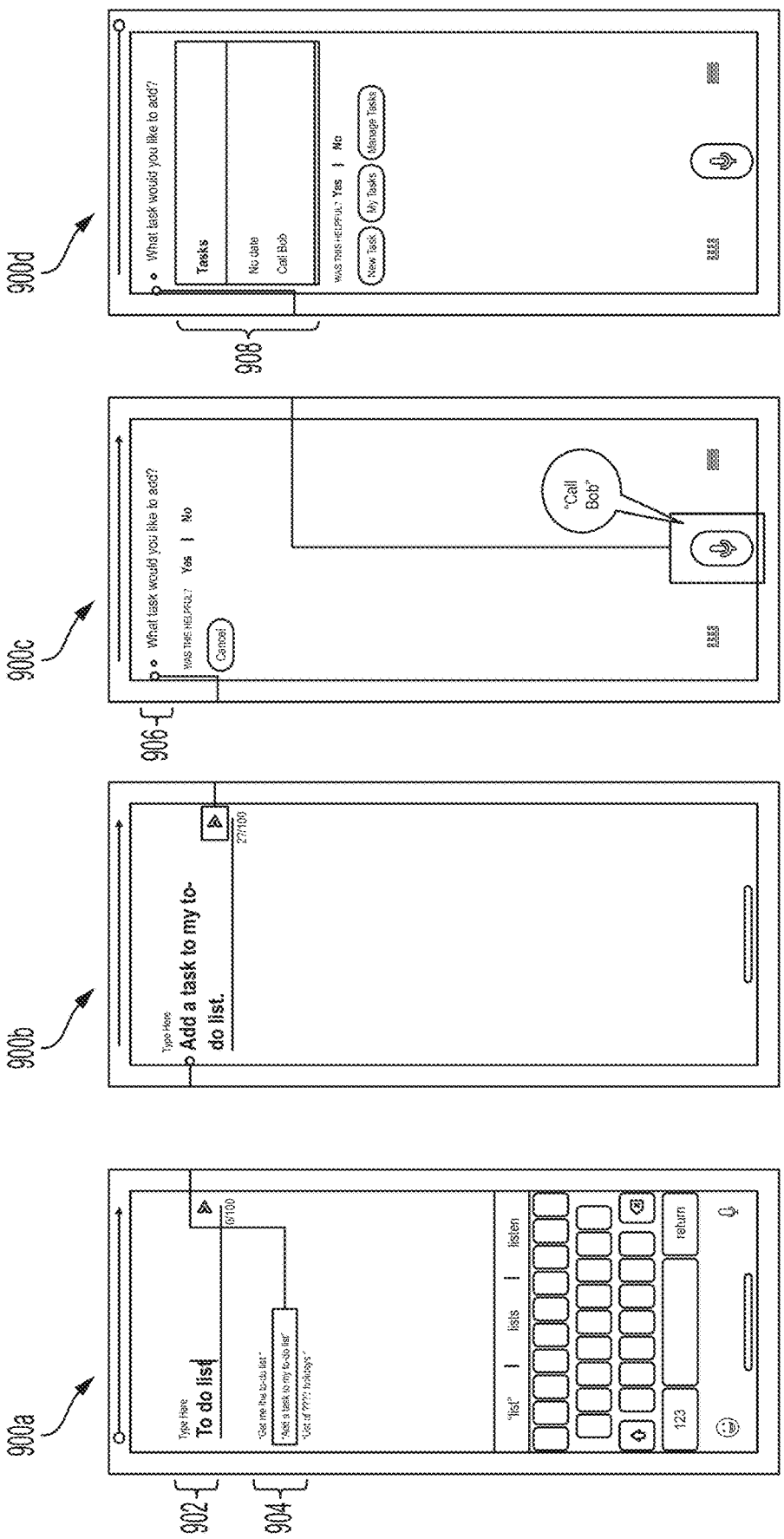
FIGS. 9A-9D depict exemplary graphical user interfaces of a system for language processing and execution of conversation models, in accordance with some embodiments.
Figure 10:
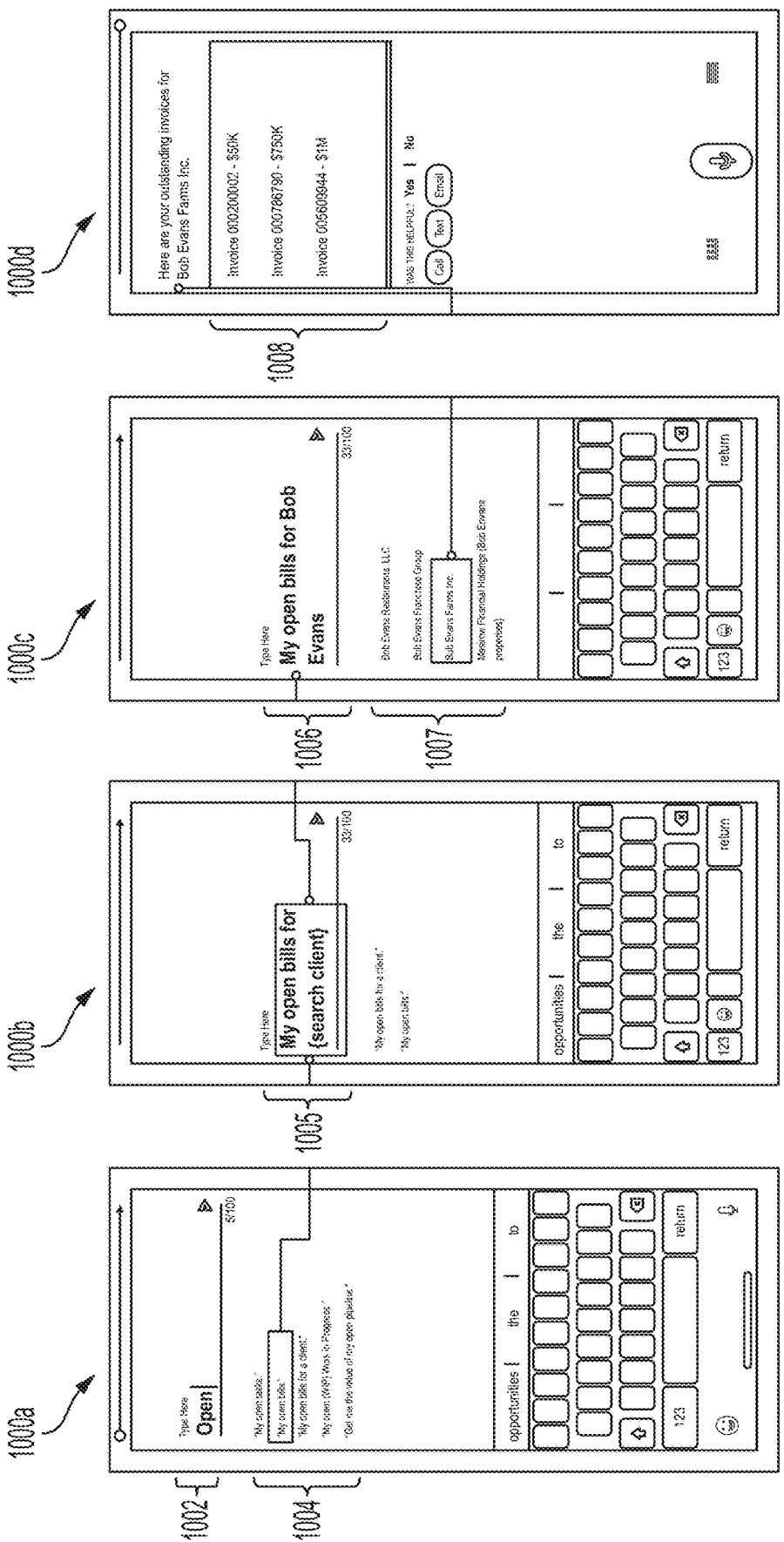
FIGS. 10A-10D depict exemplary graphical user interfaces of a system for language processing and execution of conversation models, in accordance with some embodiments.
Figure 11:
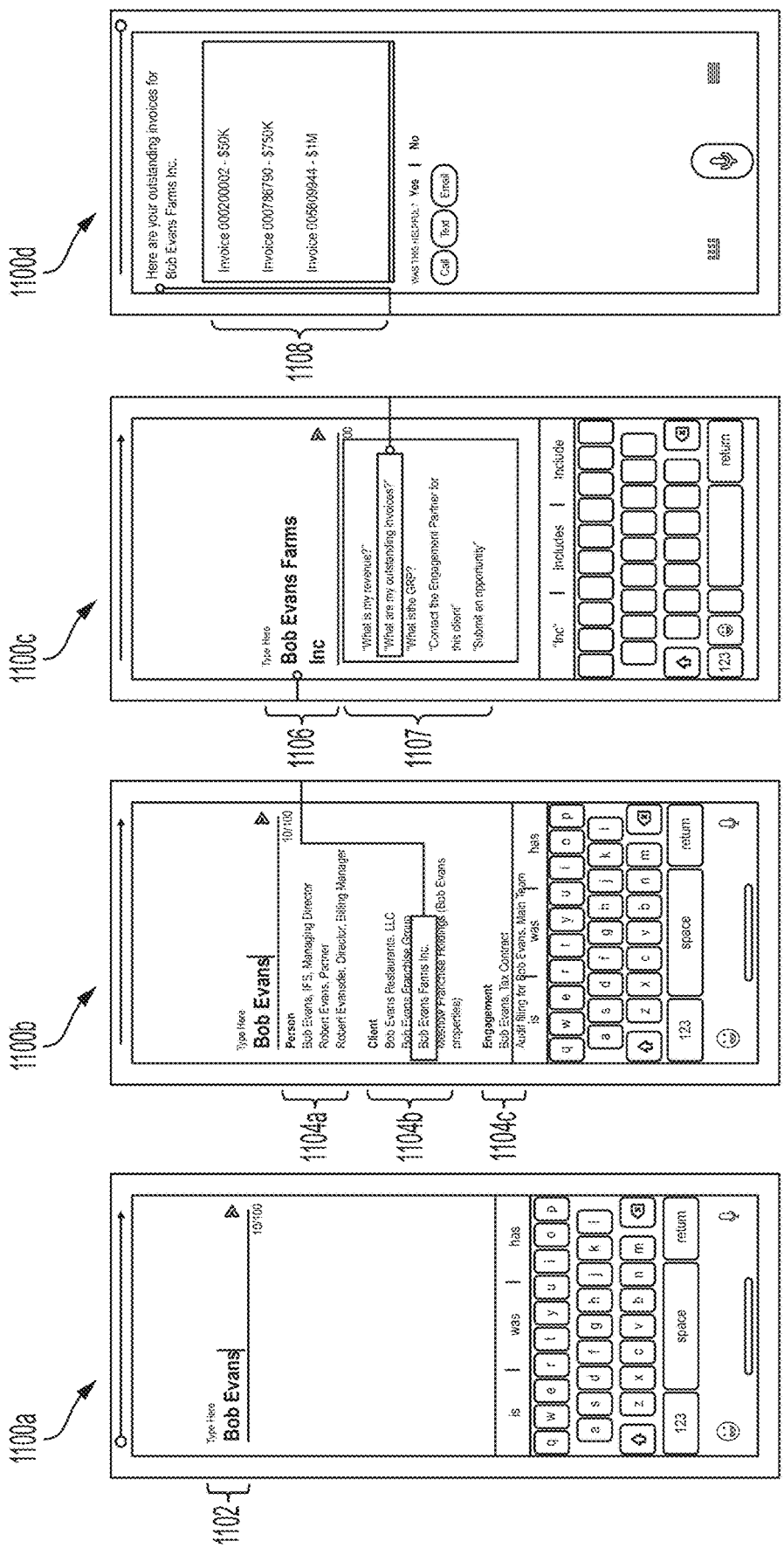
FIGS. 11A-11D depict exemplary graphical user interfaces of a system for language processing and execution of conversation models, in accordance with some embodiments.

FIGS. 9-11 show exemplary user interfaces for interacting with a natural language understanding system such as the systems described herein. In some embodiments, the graphical user interfaces shown in FIGS. 9-11 may be implemented by a user device such as user device 102 in system 100 as discussed above with respect to FIG. 1.

FIGS. 9A-9D depict graphical user interface 900, which includes screens 900*a*-*d*, in accordance with some embodiments. FIGS. 9A-9D show an example of a user querying a natural language understanding system via a typed utterance and then selecting a predictive utterance displayed by the system, after which the system executes a conversation model in accordance with the user's selected utterance.

At FIG. 9A, screen 900*a* includes field 902 into which a user may type an utterance. In the example shown, the user types "To do list." Based on this inputted utterance, the system executes one or more natural language understanding methods such as those disclosed herein, to query a plurality of microservices to analyze the utterance and to generate a set of predictive options. As shown in screen 900*a*, predictive options 904, generated by the system, are displayed to the user. In this example, the user selects the second one of the predictive options, which is a predictive utterance reading "Add a task to my to-do list."

In accordance with the user's selection of the predictive utterance displayed at screen 900*a* and the user's confirmation of his or her intent at screen 900*b* in FIG. 9B, the system may execute a conversation model associated with the selected utterance "Add a task to my to-do list." As shown in FIG. 9C at screen 900*c*, the system may execute a conversation model causing the system to prompt the user via prompt 906 to specify information about a task to be added to a to-do list. As shown at screen 900*c*, the user in this example may indicate (e.g., via spoken text) that the task to be added is to "Call Bob."

Finally, as shown at FIG. 9D, screen 900*d* may display confirmation 908 showing that the conversation model has successfully been executed to add the task "Call Bob" to the user's to-do list.

FIGS. 10A-10D depict graphical user interface 1000, which includes screens 1000*a*-*d*, in accordance with some embodiments. FIGS. 10A-10D shows an example of a user querying a natural language understanding system via a typed utterance and then selecting a predictive utterance displayed by the system, after which the system prompts the user to specify an entity value associated with an intent indicated by the selected predictive utterance. The system then displays predictive entities based on the user's second input, and the user selects one of the predictive entities. Based on the selected utterance and the selected entity, the system may then execute an associated conversation model.

At FIG. 10A, screen 1000*a* includes field 1002 into which a user may type an utterance. In the example shown, the user types "Open." Based on this inputted utterance, the system executes one or more natural language understanding methods such as those disclosed herein, to query a plurality of microservices to analyze the utterance and to generate a set of predictive options. As shown in screen 1000*a*, predictive options 1004, generated by the system, are displayed to the user. In this example, the user selects the second one of the predictive options, which is a predictive utterance reading "My open bills."

In accordance with the user's selection of the predictive utterance displayed at screen 1000*a*, the system displays a representation 1005 of the selected predictive utterance and an entity field, indicated in curly brackets, at screen 1000*b*. As shown by representation 1005, the selected utterance has an entity field for a client to whom the open bills correspond: "My open bills for {search client}."

After the user confirms his or her intent at screen 1000*b* in FIG. 10B, the system may display prompt 1006 at screen 1000*c*, shown in FIG. 10C, to prompt the user to type an utterance to be used to search for a client to be associated with the "My open bills" utterance. In this example, the user types the client search utterance "Bob Evans," and the system responsively executes one or more natural language understanding methods such as those disclosed herein, to query a plurality of microservices to analyze the client search utterance and to generate a set of predictive entities. As shown in screen 1000*c*, predictive entities 1007, generated by the system, are displayed to the user. In this example, the user selects the third one of the predictive options, which is a predictive entity reading "Bob Evans Farms Inc."

As shown in FIG. 10D at screen 1000d, the system may responsively execute a conversation model causing the system to display open bills for the selected client. As shown at screen 1000d, the system may display information object 1008 showing the information associated with the selected "My open bills" utterance and the selected "Bob Evans Farms Inc." entity.

FIGS. 11A-11D depict graphical user interface 1100, which includes screens 1100a-d, in accordance with some embodiments. FIGS. 11A-11D shown an example of a user querying a natural language understanding system via a typed entity, then selecting a predictive entity displayed by the system, then selecting a predictive conversation model associated with the entity, after which the system executes the selected conversation model based on the selection of the conversation model and on the selected predictive entity.

At FIG. 11A, screen 1100a includes field 1102 into which a user may type an utterance. In the example shown, the user types "Bob Evans." Based on this inputted utterance, the system executes one or more natural language understanding methods such as those disclosed herein, to query a plurality of microservices to analyze the utterance and to generate a set of predictive options. As shown in screen 1100b, predictive options are shown in three sets 1104a-c of predictive entities: set 1104a shows predictive entities that are persons, set 1104b shows predictive entities that are clients, and set 1104c shows predictive entities that are engagements. In this example, the user selects the third predictive option in set 1104b, which is a predictive entity called "Bob Evans Farm Inc."

In accordance with the user's selection of the predictive entity, the system displays updated field 1106 at screen 1100c in FIG. 11C. In the updated field, the user may type input in the form of an additional utterance, but the field is automatically populated with an utterance corresponding to the name of the selected predictive entity: "Bob Evans Farms, Inc." In accordance with the automatically populated utterance, the system may automatically execute one or more natural language understanding methods such as those disclosed herein, to query a plurality of microservices to analyze the utterance and to generate a set of predictive conversation models (e.g., predictive intents) that are associated with the previously-selected predictive entity. As shown in screen 1100c, predictive conversation models 1107, generated by the system, are displayed to the user. In this example, the user selects the second one of the predictive conversation models, which is a conversation model called "What are my outstanding invoices?"

As shown in FIG. 11D at screen 1100d, the system may responsively execute the selected conversation model using the selected predictive entity, causing the system to display outstanding invoices for the selected client. As shown at screen 1100d, the system may display information object 1108 showing the information associated with the selected "What are my outstanding invoices'?" utterance and the selected "Bob Evans Farms, Inc." client.

Exemplary Insights System

Figure 12:
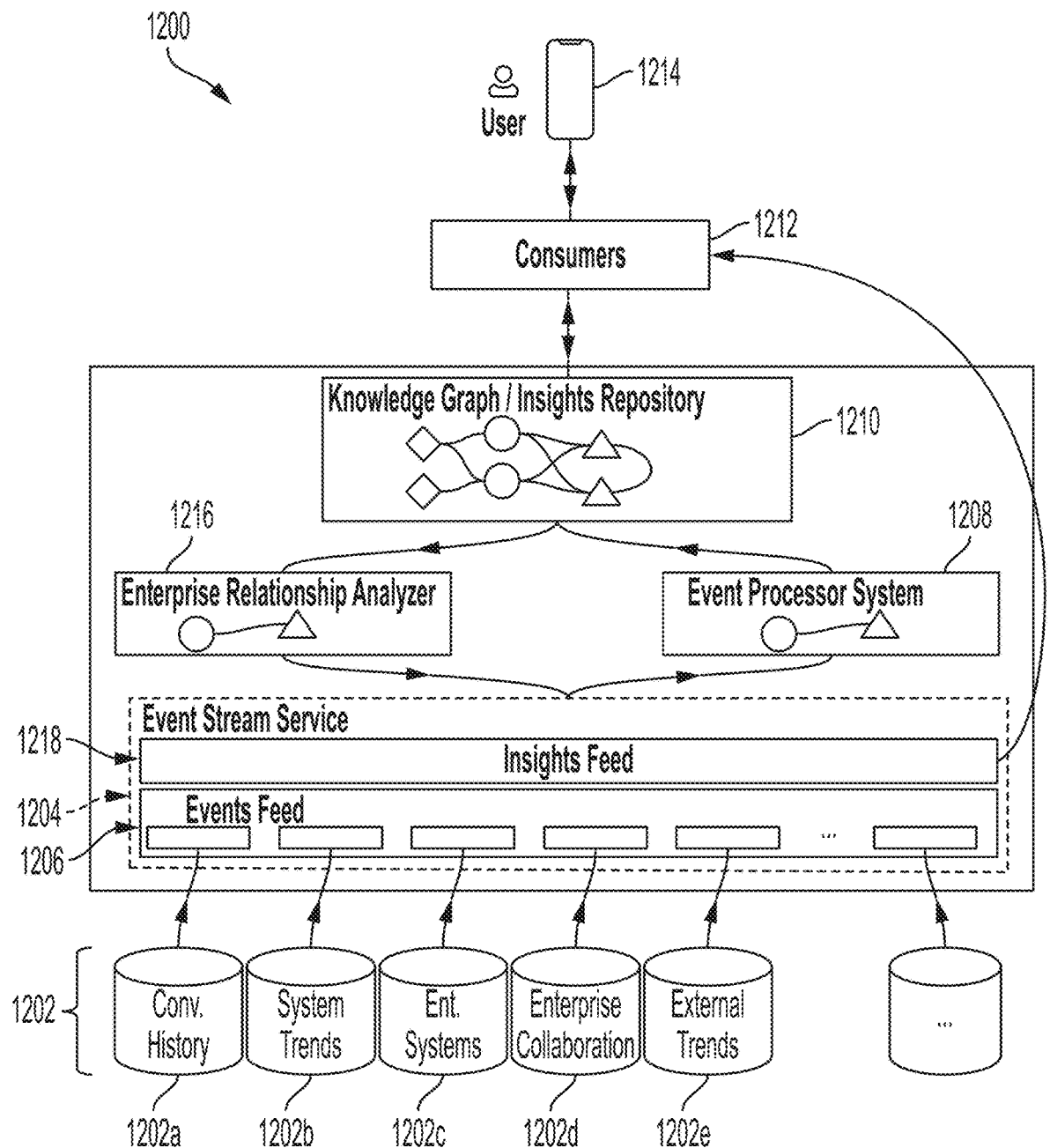
FIG. 12 depicts a system for generating and utilizing an insights repository, in accordance with some embodiments.

FIG. 12 depicts a system 1200 for generating and utilizing an adaptive data structure depicting relationships among a plurality of entities, in accordance with some embodiments. In some embodiments, the adaptive data structure may be referred to as an insights repository. As described below, system 1200 may be a computer system configured to receive events information from a plurality of events sources, generate an events feed based on the events information, and utilize an event processor to process information from the events feed to create, configure, and/or maintain an insights repository. In some embodiments, the insights repository may be a data structure representing one or more information objects (e.g., entities, intents, and/or utterances), and the data structure may represent the nature of relationships amongst various pairs and/or sets of the information objects represented in the insights repository.

In some embodiments, system 1200 may be queried by one or more consumers (or may otherwise generate information to be transmitted to or published to one or more consumers), and the query may be answered in accordance with information stored in the insights repository. For example, system 1200 may receive a discrete query based on a natural language input from a user, and system 1200 may interrogate the insights repository using one or more search/matching algorithms based on the discrete query in order to return relevant matching results or suggestions to the user. Alternatively or additionally, system 1200 may be configured to generate and publish information to subscribed users via an insights feed, where data in the insights feed may be generated by a relationship analyzer based on the information stored in the insights repository.

As shown in FIG. 12, system 1200 may comprise events feed data sources 1202, event stream service 1204, events feed 1206, event processor system 1208, insights repository system 1210, consumer system(s) 1212, user device 1214, relationship analyzer system 1216, and insights feed 1218. Each of these components is discussed in additional detail below.

Events feed data sources 1202 may include any one or more data sources configured to provide events data usable by system 1200 to create, configure, and/or maintain an adaptive data structure stored in insights repository system 1210. In some embodiments, events feed data sources 1202 may include any one or more computer systems (e.g., servers, databases, repositories) inside or outside system 1200 and configured to transmit one or more electronic messages (e.g., via wired or wireless network communication) to event stream service 1204. Events feed data sources 1202 may provide events data pertinent to any one or more entities, utterances, and/or intents about which information may be stored in insights repository system 1210.

In the example shown, events feed data sources 1202 include conversation history source 1202a, system trends source 1202b, enterprise systems source 1202c, enterprise collaboration source 1202d, and external trends source 1202e.

In some embodiments, conversation history source 1202a may provide events data regarding one or more previous interactions between a user and the system. In some embodiments, said interactions may be used to determine topics of interest for future predictions of the intent of the user (and/or of other users).

In some embodiments, system trends source 1202b may provide events data regarding one or more trends within a system. A trend may be a temporary activity (e.g., topic of discussion, subject of events, information regarding persons or groups associated with the system) that may influence the system's understanding of intent and insights at a certain time associated with the trend. In some embodiments, system trend data may be used for predicting intent.

In some embodiments, enterprise systems source 1202c may provide events data from one or more enterprise systems such as one or more enterprise software systems provided by Salesforce, Workday, ServiceNow, Atlassian, Oracle, Intuit, or the like.

In some embodiments, enterprise collaboration source 1202*d* may provide events data from one or more enterprise collaboration systems such as Gmail, Google Calendar, Google Hangouts, Google Chat, Workzone, Trello, Asana, Wunderlist, TickTick, Skype, Slack, Dropbox, Microsoft Office Online, iCloud systems, or the like.

In some embodiments, external trends source 1202*e* may provide events data regarding one or more trends outside a system. In some embodiments, an external trend may be associated with one or more users and/or organization (e.g., same corporate network, same locality as a user) despite being located outside the system itself and being considered an external trend. In some embodiments, external trend data may be used for predicting intent.

In some embodiments, exemplary events may include one or more of user actions (e.g. user requesting information about a client), changes to relationships in internal or external systems (e.g., new person managing a client, new person added to team, person removed from client/team, etc.), incoming events from external systems (e.g., a new appointment, meeting, or flight added for a user), relationship data added from one or more systems, and/or aging of relationships (e.g., natural aging occurring due to time passing, aging occurring due to inactivity in one or more systems, etc.).

Event stream service 1204 may be any software and/or hardware configured to provide one or more activity feeds, events feeds, or the like. In some embodiments, event stream service 1204 may be configured to be able to define one or more topics to which consumers may subscribe, such that events categorized into relevant topics may be automatically published to consumers who are subscribed to the topic. Events stream service 1204 may be configured, in some embodiments, to generate and maintain events feed 1206, as discussed herein.

Events feed 1206 may be may be a collection of information about various events pertaining to one or more entities, utterances, and/or intents, wherein that information is gleaned from events information transmitted from one or more of events feed data sources 1202 to events stream service 1204. In some embodiments, the collection of information may be formatted such that the information defines discrete "events" based on the events information received. In some embodiments, the collection of information may be formatted as a "feed," in that new events may be defined in real-time as information to define the event is received from one or more of the events feed data sources 1202. In some embodiments, events defined by events feed 1206 may be associated with data defining the substance of the event (e.g., what entity or entities the event pertains to, what information content was received, etc.) as well as metadata associated with the event (e.g., from what source information associated with the event was received, at what time information associated with the event was received, etc.).

In some embodiments, events feed 1206 may enable system 1200 to replay events in the case of duplication or failure recovery. In some embodiments, the system may be configured such that events feed 1206 can reprocess events chronologically in order to rebuild one or more data sets such as a relationship graph. This functionality may be used in the event of catastrophic data loss or data corruption. In some embodiments, reprocessing events may be based on a log of events that is persisted by events feed 1206, such that the events feed may be replayed for re-ingestion by the system in order to rebuild one or more data structures based on the persisted events feed.

In some embodiments, events defined by events feed 1206 may be associated (e.g., via metadata) with one or more topics of events feed 1206, such that consumers subscribed to relevant topics may receive a transmission including information about the event (as discussed below in additional detail).

In some embodiments, events defined by events feed 1206 may be used by event processor system 1208 to create (e.g., populate), configure, and/or maintain an adaptive data structure stored in insights repository system 1210 (as discussed below in additional detail).

In some embodiments, events feed 1206 may share any one or more characteristics in common with (and/or may be) events feed 614 discussed above with respect to FIG. 6.

Event processor system 1208 may include any one or more processors (e.g., a single processor, one or more server-based processors, one or more distributed and/or cloud-based computing systems, etc.) configured to receive data from events feed 1206 and to process the data to transmit data to insights repository system 1210 to create (e.g., populate), configure, and/or maintain an adaptive data structure stored in insights repository system 1210.

In some embodiments, event processor system 1208 may be configured to process one or more events using an associated event rule (or ruleset), which may be selected based on one or more properties of the event(s) received by event processor system 1208. In some embodiments, event processor system 1208 may retrieve an appropriate event rule from one or more rule corpuses or rule databases, and may use the retrieved rule to process the event(s) to generate data to be stored in insights repository system 1210. In some embodiments, it may be the responsibility of one or more of the events feed data sources 1202 (or of parties or systems associated therewith) to create and/or provide a rule or ruleset for events based on data from that source 1202, to ensure that the system manages the contributed events feed data in the appropriate manner. In some embodiments, one or more rules/rulesets may be shared between multiple ones of the events feed data sources 1202; in some embodiments, one or more of the events feed data sources 1202 may have a dedicated rule/ruleset.

In some embodiments, creating and maintaining useful insights in insights repository 1210 may be aided by allowing rules/rulesets to organically drive the shape and evolution of the insights and relationships represented by the repository; in some embodiments, restricting growth of the insights/relationships may artificially skew the natural formation of useful insights, and may make the information represented by the repository less accurate and less useful. For example, in some embodiments, applying an artificial limitation on the number of entities and/or relationships that may be represented in an adaptive data structure stored in insights repository system 1210 may make the repository less useful; thus, in some embodiments, there may be no set minimum or maximum number of entities and/or relationships. Similarly, in some embodiments, it may be advantageous that there is no external or secondary validation of entities and/or relationships beyond the initial application of the rules/rulesets, as enforcing secondary validation may skew the insights and make the system less accurate and less useful.

In some embodiments, system 1200 may comprise a plurality of event processors such as event processor system 1208. In some embodiments, one or more event processors may be instantiated and/or spun down in accordance with processing needs. In some embodiments, one or more event processors may be configured to handle one or more types of events (e.g., specialized event processors configured to process certain kinds of events may be provided). In some embodiments, one or more event processors may be configured to process one event, multiple events, one kind of event, multiple kinds of events, standard kinds of events, and/or custom events.

Creating, configuring, and/or maintaining an adaptive data structure stored in insights repository system 1210 may comprise creating one or more information objects to be represented in insights repository system 1210, deleting one or more information objects represented in insights repository system 1210, modifying one or more information objects represented in insights repository system 1210, augmenting one or more information objects represented in insights repository system 1210, defining a relationship between a set (e.g., pair) of any two or more information objects represented in insights repository system 1210. Defining a relationship between a set (e.g., pair) of information objects may include creating a relationship score, deleting a relationship score, adjusting a relationship score, defining whether the relationship is an aging relationship or a non-aging relationship, and/or defining a manner and/or rate of aging of the relationship. In some embodiments, relationships between information objects may be created, deleted, and/or adjusted in accordance with one or more business rules (e.g., rules defined by a user or automatically/dynamically determined by the system) applied by event processor system 1208.

In some embodiments, event processor system 1208 may be configured to process one event at a time; in some embodiments, event processor system 1208 may be configured to process multiple events simultaneously. In some embodiments, system 1200 may include multiple event processors configured to work in parallel (and/or in series).

In some embodiments, processing of event feed data by event processor system 1208 allows for the asynchronous update of insights repository 1210 based on events feed data.

Insights repository system 1210 may be a centralized store in which information regarding entities, intents, utterances, and/or relationships are housed, managed, and/or aged according to one or more configurable rules. Insights repository system 1210 may include any one or more computer storage mediums configured to store information about entities, utterances, and/or intents (including information about relationships between said entities, utterances, and/or intents). In some embodiments, insights repository system 1210 may include one or more databases, hard drives, RAM storage devices, ROM storage devices, cloud-based computer storage, distributed computer storage, server-hosted computer storage, or the like. In some embodiments, insights repository system 1210 may comprise one or more databases (e.g., NoSQL databases, relational databases, graph databases, document databases), graphs (e.g., knowledge graphs, relation graphs), index data structures, event streams, or the like.

In addition to one or more computer storage mediums, insights repository system 1210 may include one or more processors configured to execute instructions to create, modify, augment, configure, maintain, and/or interrogate the computer storage mediums of insights repository system 1210.

As shown in FIG. 12, insights repository system 1210 may be configured to receive, from event processor system 1208 (e.g., by wired or wireless network transmission), data that may be sued to create, modify, augment, configure, and/or maintain one or more data structures (e.g., databases, knowledge graphs, etc.) stored by insights repository system 1210. Insights repository system 1210 may also be configured to send and receive data to/from (e.g., by wired or wireless network transmission) one or more insights consumer system(s) 1212, discussed in further detail below. Insights repository system 1210 may further be configured to send and/or receive data to relationship analyzer system 1216, which may in some embodiments receive data from insights repository system 1210 and use said data to generate data for an insights feed, as discussed in additional detail below. System 1200 may be configured such that consumers (e.g., consumers 1212) may be able to subscribe to insights feed 1218 and or query insights repository 1210 itself; in some embodiments, a predictive intent system such as predictive intent system 104 (discussed above with reference to FIG. 1) may be a consumer of system 1200 (e.g., may be one of consumers 1212).

In some embodiments, system 1200 may use information received originally from events feed data sources 1202 to create one or more data structures in insights repository system 1210 that may represent relationship data for users, clients, entities, utterances, and/or intents. As explained herein, relationships may be represented as connections between information objects (e.g., entities, utterances, and/or intents) represented in a data structure such as a knowledge graph stored by insights repository system 1210. For example, in a given enterprise, Salesforce systems may contain information about which users have connections to which clients, and what the nature (e.g., age, activity over time, frequency of communication, content of communication, etc.) of those connections are; Google systems may contain information about activity that has taken place between a pair of users through GMail, Google Calendar, and/or Google Drive; and Workday systems may contain human capital information that may be used to populate additional information (e.g., additional fields) about one or more entities and/or relationships (e.g., the relationship between Coach and Coachee in a Workday system). In some embodiments, any or all of this exemplary data may be used to build a data structure such as a knowledge graph representing relationships in insights repository system 1210.

In some embodiments, as discussed herein (e.g., see FIG. 6), a relationship between a pair of information objects in a knowledge graph may be represented by a relationship score, which may in some embodiments be a number between 0.0 and 1.0, with 0.0 representing the weakest possible relationship (e.g., no relationship) and 1.0 representing the strongest possible relationship.

In some embodiments, a relationship between information objects may be designated as an aging relationship or as a non-aging relationship. In some embodiments, relationship scores may be configured to decay (e.g., weaken) over time, for example in accordance with a predefined decay algorithm (e.g., linear decay, logarithmic decay, decay according to a predefined schedule, decay in accordance with one or more triggering events, etc.). In some embodiments, decaying of a relationship over time may only occur if one or more of the entities/objects of the relationship is inactive (e.g., if two entities do not experience any events relating to one another for a predetermined amount of time). In some embodiments, certain relationships may be designated in insights repository system 1210 as aging relationships such that their relationship score decays over time, while other relationships may be designated in insights repository system 1210 as non-aging relationships such that their relationship score does not decay over time.

In some embodiments, relationships represented in a data structure in insights repository system 1210 may be between pairs of entities and/or between pairs comprising user-entities and non-user-entities. For example, there may be a workgroup (one entity) represented in insights repository system 1210 that is part of a line of service (another entity); as another example, a company (one entity) may be a sub-entity under another company (another entity).

In some embodiments, insights repository system 1210 may share any one or more characteristics in common with (and/or may be) insights repository 606 discussed above with respect to FIG. 6.

Insights consumer system(s) 1212 may be any one or more computer systems configured to send and/or receive data via network communication (e.g., wired or wireless network communication) to/from insights repository system 1210 and/or an associated component of system 1200, such as enterprise relationship analyzer system 1216. In some embodiments, insights consumer system(s) 1212 may use a Query API to interrogate data stored in insights repository 1210 for useful content; in some embodiments, any process, application, or system that is able to call ReSTful Query APIs may be considered a consumer.

In some embodiments, consumers may utilize results received from the system in multiple ways, such as to enrich user experience within an enterprise. Some examples include insightful communications that monitor a user's primary metrics (e.g. utilization, required CPEs, etc.) and notify the user upon reaching certain thresholds for the monitored metrics. In addition, users may be able to inject insightfully intelligent suggestions within an enterprise mobile application to assist the user in finding critical information in a timely manner. Additional examples are provided below.

Insights consumer system(s) 1212 may be configured to send one or more transmissions to insights repository system 1210 and/or enterprise relationship analyzer system 1216, the transmissions representing a query or input to be addressed based on the information stored in insights repository system 1210. As discussed in additional detail below, system 1200 may generate response data to the input received from consumer system(s) 1212, wherein the response data is generated based at least in part on interrogating the information stored in insights repository system 1210. The response data may then be sent back to consumer system(s) 1212.

In some embodiments, consumer system(s) 1212 may be associated with one or more users, and in some embodiments consumer system(s) 1212 may receive an input or query from a user device such as user device 1214. In some embodiments, a query or data generated by consumer system(s) 1212 to be used to interrogate insights repository system 1210 may be based on input received from a user device such as user device 1212.

In some embodiments, consumer system(s) 1212 may be a predictive intent system and/or may share any one or more characteristics in common with (or may be) predictive intent system 104 discussed above with reference to FIG. 1. In some embodiments, user device 1214 may share any one or more characteristics in common with (or may be) user device 102 discussed above with reference to FIG. 1.

Enterprise relationship analyzer system 1216 may be include any one or more processors (e.g., a single processor, one or more server-based processors, one or more distributed and/or cloud-based computing systems, etc.) configured to receive data from insights repository system 1210 and to process the data to transmit data to insights feed 1218 to publish one or more insights events to an insights feed/stream.

As shown in FIG. 12 and as discussed above, insights feed 1218 may be provided by (e.g., as a part of) event stream service 1204. As discussed above, event stream service 1204 may be configured to be able to define one or more topics to which consumers may subscribe, such that events categorized into relevant topics may be automatically published to consumers who are subscribed to the topic. Events stream service 1204 may be configured, in some embodiments, to generate and maintain insights feed 1218, as discussed herein. Data for publishing to insights feed 1218 (e.g., data defining different "insights" updates to be published to the stream) may be generated by relationship analyzer system 1216 based on data stored in insights feed. In some embodiments, insights feed 1218 may thus be (or include) one or more topics to which a consumer (e.g., consumer system(s) 1212) may subscribe, such that the consumer may automatically receive updates published by event stream service 1204 relating to that topic.

Figure 13:
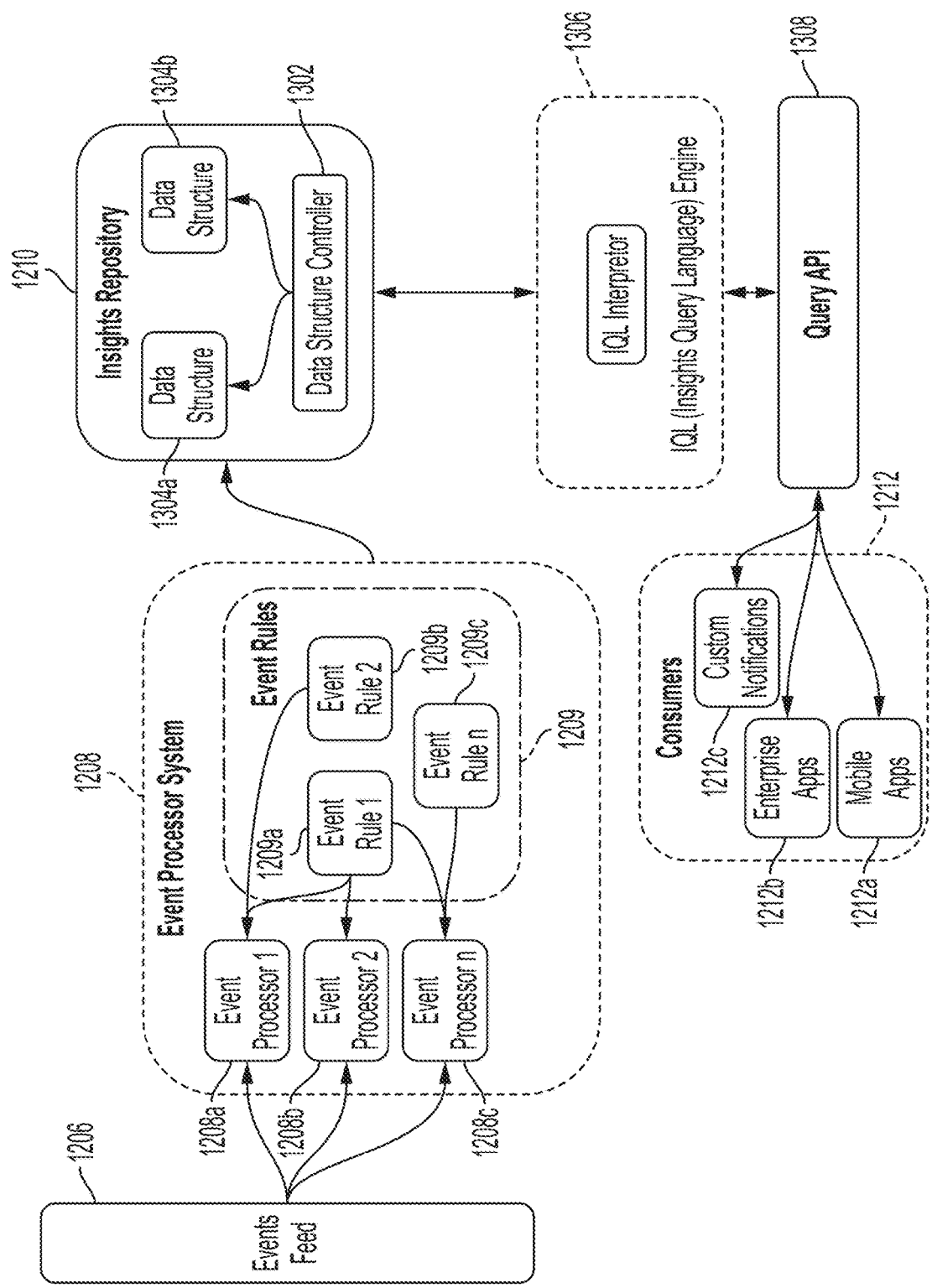
FIG. 13 depicts information flow for events processing in a system for generating and utilizing an insights repository, in accordance with some embodiments.

FIG. 13 depicts information flow for events processing in system 1200 for generating and utilizing an insights repository, in accordance with some embodiments.

As shown by the depicted embodiment, system 1200 may include events feed 1206, event processor system 1208, insights repository system 1210, Insights Query Language (IQL) engine 1306, Query API 1308, and consumer system(s) 1212. Information for generating and using insights repository system 1210 may flow through system 1200 in accordance with the arrows shown in the diagram in FIG. 13, and as discussed further herein.

As discussed above, event processor system 1208 may receive data from events feed 1206 and may use that data to populate/configure a data structure stored in insights repository system 1210. As shown in FIG. 13, event processor system 1208 may comprise event processor instances 1208a-1208c, each of which may be a processing instance configured to process event feed data by applying one or more rules/rulesets against the event feed data in order to generate data to be used for populating/configuring a data structure stored in insights repository system 1210. As discussed above with respect to FIG. 12, event processors such as event processors 1208a-1208c may be general-purpose event processors or may be specialized event processors. In some embodiments, different ones of event processors 1208a-1208c may be configured to process different kinds of events by calling different rules/rulesets.

In the embodiment shown, event processors 1208a-1208c process event data using rules/rulesets retrieved from event rules corpus 1209, which may be any data store or computer memory provided as part of (or otherwise accessible by) event processor system 1208 and configured to store one or more event rules 1209a-1209c. Event processor rules 1209a-1209c may comprise code/instructions/algorithms for processing events feed data in order to generate data for populating/configuring a data structure stored in insights repository system 1210, and may further comprise metadata indicating the kinds of events to which the rules should be applied and/or the situations or contexts in which the rules should be applied.

Once data is generated by event processor system 1208 for populating/configuring a data structure stored in insights repository system 1210, that data may be transmitted (e.g., via wired or wireless network communication) from event processor system 1208 to insights repository system 1210 for storage in one or more of data structures 1304a and 1304b, which may be any suitable data structure for representing information objects (e.g., entities) and relationships between said information objects; in some embodiments data structures 1304a and/or 1304b may include one or more databases (e.g., NoSQL databases, relational databases, graph databases, document databases), graphs (e.g., knowledge graphs, relation graphs), index data structures, event streams, or the like.

Thus, data for building/populating/configuring a data structure stored in insights repository system 1210 may flow from events feed 1206 through event processor system 1208 and to insights repository system 1210. On the other hand, data for utilizing a data structure stored in insights repository system 1210 (e.g., querying insights repository system 1210) once it has been built and configured may flow from consumer system(s) 1212 to insights repository system 1210 (and then back to consumer system(s) 1212).

As shown in FIG. 13, system 1200 includes consumer system(s) 1212, which is shown in this embodiment as a collective group of three different consumer systems 1212a-c. In the embodiment shown, consumer system 1212a is a mobile application, consumer system 1212b is an enterprise application, and consumer system 1212c is a custom notification service.

As shown in FIG. 13, any one or more of consumer systems(s) 1212 may be configured to send and receive data to/from (e.g., via wired or wireless network communication) insights repository system 1210 in order to retrieve data responsive to queries based on the information content of insights repository system 1210. Insights repository system 1210 may comprise data structure controller 1302, which may be configured to receive query data (e.g., as explained above with reference to block 602 of FIG. 6) representing incoming an incoming query from consumer systems(s) 1212. Data structure controller 1302 may be configured to process the query data and to interrogate/query one or more of data structures 1304a and/or 1304b based on the query data received (e.g., in a same or similar manner as the application of the EIP algorithm at block 604 of FIG. 6). Results from said interrogation of one or more of data structures 1304a and/or 1304b may then be transmitted from data structure controller 1302 (e.g., in the form of the payload described above with reference to blocks 610 and 612 of FIG. 6) back to consumer systems(s) 1212.

In some embodiments, system 1200 may be configured such that communication between consumer system(s) 1212 and insights repository system 1210 is facilitated by Query API 1308 and insights query language (IQL) engine 1306.

In some embodiments, system 1200 is configured such that consumers such as consumer system(s) 1212 (and/or predictive intent service 104 of FIG. 1) are able to query insights repository system 1210 through a query API that utilizes an insights query language (IQL). IQL is a custom language used to retrieve insights out of the insights repository system 1210. In some embodiments, IQL may enable consumers to interact natively with one or more data structures of insights repository system 1210.

IQL may be structured in statement form such that it may be easily read and understood by humans (e.g., developers, etc.) in order to find insights based on known entities and relationships. In some embodiments, a search API may be used to assist in constructing IQL queries into insights repository system 1210, such that users of a system implementing IQL (e.g., system 1200) may not be required to learn a new language. In some embodiments, the system may enable an external element (e.g., search results created by a component such as a conversation modeling interface) to be used to construct one or more IQL queries by a user who does not explicitly know IQL syntax; this functionality may be provided, in some embodiments, by one or more API's. In some embodiments, IQL may provide an abstraction layer between a consumer (e.g., consumer system(s) 1212) and insights repository system 1210 to facilitate changes within insights repository system 1210 that will not impact the consumer (e.g., a user or system administrator may use IQL to make changes to insights repository 1210, such that the functionality of IQL is not limited to merely performing queries). In some embodiments, IQL may provide a common gateway by which various consumers (e.g., consumer system(s) 1212), whether internal or external, can retrieve insightful content.

In some embodiments, IQL enables consumers (e.g., consumer system(s) 1212) to query for entities or other information objects represented in insights repository system 1210 by providing a relation name and/or by providing specific entity attributes, such as name or Global User ID (GUID) or any properties defined for an entity or other information object. For example, in one example, if a consumer wished to retrieve a list of all clients related to a person, the user may use the following query:

SELECT client RELATED TO person WHERE person.name IS 'Jack Reacher' ORDERED BY relevance DESC In another example, if a consumer wished to retrieve the latest office events related to a particular office location, the user may use the following query:

SELECT relations BETWEEN officeEvent AND place WHERE place.name IS 'Tampa' ORDERED BY age ASC In some embodiments, an IQL interpreter may be implemented by IQL engine 1306, wherein IQL engine comprises one or more processors configured to execute instructions for converting IQL into a common structure. In some embodiments, IQL engine may be provided as a part of insights repository 1210, or alternatively in association with and communicatively coupled to insights repository 1210. In some embodiments, the IQL interpreter may be configured to convert IQL into a common structure, and the common structure may then be converted into different native queries for different kinds of data structures stored in insights repository system 1210 (e.g., see FIG. 14A below for different kinds of data structures configured to communicate with a data structure controller via different controllers included in the data structure controller). In some embodiments, conversion from the common structure to a native query may be performed by one or more processing components included in insights repository system 1210 itself. In some embodiments, the common structure may comprise one or more predefined fields, including for example an entity type field, an entity ID field, a relative score field, and a relationship node distance field.

In some embodiments, after query API 1308, IQL engine 1306, and data structure controller 1302 generate results based on an incoming query, the results may aggregated and returned to consumer system (2) 1212, for example in JSON format, in one or more specified ranked orders, and/or in a payload format as discussed above with respect to FIG. 6.

Figure 14A:
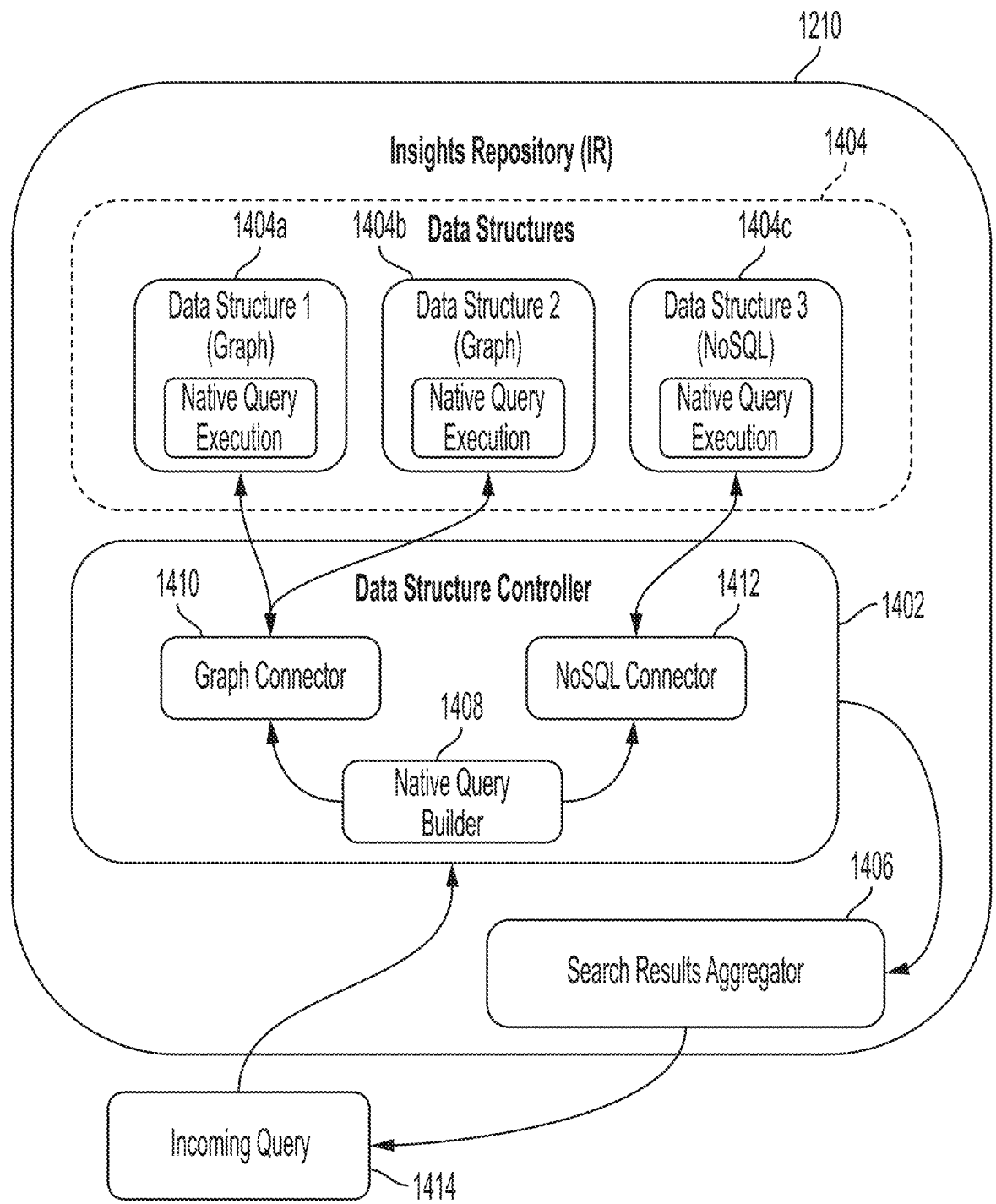
FIGS. 14A and 14B depict an insights repository, in accordance with some embodiments.
Figure 14B:
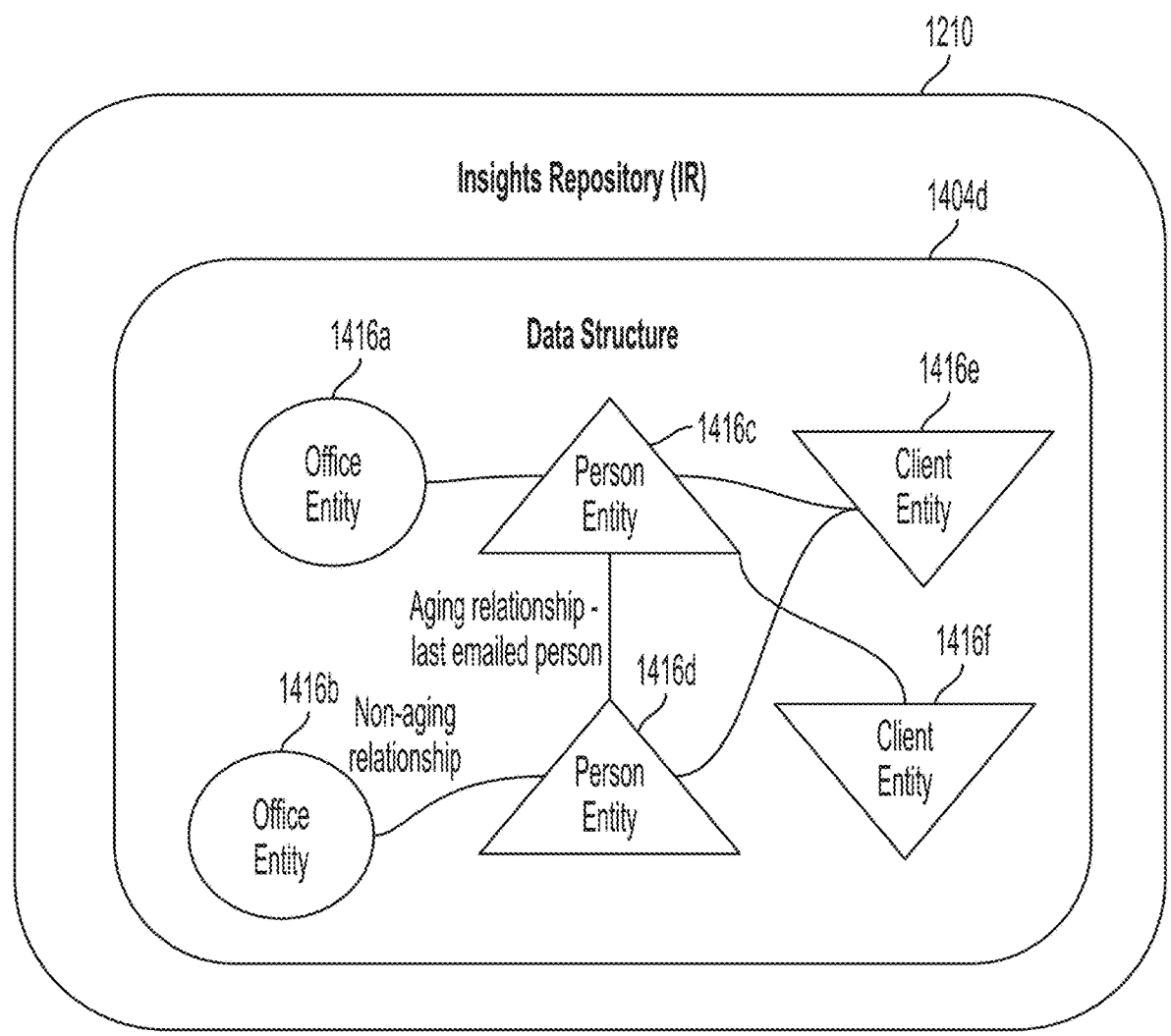

FIGS. 14A & 14B depict detailed views of insights repository system 1210, in accordance with some embodiments. (As explained above, insights repository system 1210 may in some embodiments be the same, or may be deployed/used in a same or similar manner) as insights repository 606 discussed above with respect to FIG. 6).

FIG. 14A depicts a detailed view of insights repository system 1210 in an embodiment in which it receives an incoming query 1414. In some embodiments, incoming query 1414 may be a query received from one or more consumer systems such as consumer system(s) 1212 and or predictive intent service 104.

As shown in FIG. 14A, insights repository system 1210 comprises data structure controller 1402, data structures 1404, and search results aggregator 1406, each of which may be communicatively coupled with one or more of each other, with one or more other components of insights repository system 1210, and/or with one or more components outside of insights repository system 1210. In some embodiments, the recited components may be communicatively coupled to one another in the manner indicated by the arrows in FIG. 14A.

In some embodiments, data structure controller 1402 and data structure controller 1302 may each share any one or more characteristics in common, and the same may be true of data structures 1404a-c with respect to data structures 1304a and 1304b.

As shown, by the arrows in FIG. 14A, data structure controller 1402 may be configured to receive query data (e.g., as explained above with reference to block 602 of FIG. 6) representing incoming query 1414. Data structure controller 1402 may be configured to process the query data and to interrogate/query one or more of data structures 1404 based on the query data received (e.g., in a same or similar manner as the application of the EIP algorithm at block 604 of FIG. 6). Results from said interrogation of one or more of data structures 1404 may then be transmitted from data structure controller 1402 to search results aggregator 1406, which may in turn transmit aggregated search results (e.g., in the form of the payload described above with reference to blocks 610 and 612 of FIG. 6) back to the source of incoming query 1414.

In some embodiments, data structure controller 1402 may include native query builder 1408, graph connector 1410, and NoSQL connector 1412. As shown by the arrows in FIG. 14A, native query builder 1408 may be configured to send data to one or both of graph connector 1410 and NoSQL connector 1412, each of which may in turn be configured to send data to one or more associated data sources 1404. In the example shown, graph connector 1410 is configured to interface with data structures 1404a and 1404b, which are graph type data structures whereas NoSQL connector 1412 is configured to interface with data structure 1404c, which is a NoSQL database type data structure. In some embodiments, one or more other connectors may be included in data structure controller 1402 for interfacing with other types of data structures such as databases (e.g., NoSQL databases, relational databases, graph databases, document databases), graphs (e.g., knowledge graphs, relation graphs), index data structures, event streams, or the like.

FIG. 14B depicts a detailed view of insights repository system 1210 including a data structure 1404d. In some embodiments, data structure 1404d may share any one or more characteristics in common with one or more of data structures 1404a-c and/or data structures 1304a-b.

As shown in FIG. 14B, data structure 1404d may store information about a plurality of entities and relationships among those entities. (In some embodiments, a data structure may store information about information objects other than entities, such as utterances and/or intents.) In the example shown, data structure 1404d stores information about office entities 1416a and 1416b, person entities 1416c and 1416d, and client entities 1416e and 1416f. In some embodiments, data structure 1404d may store data associated with one or more of the entities indicating a type of class for the entity (e.g., office, person, client, etc.).

As shown by the connecting lines between the entities 14016a-f, data structure 1404d may store information indicating the existence and nature of relationships between entities, including the strength of a relationship, nature of a relationship, and/or whether/how a relationship ages, as described elsewhere herein. In the example shown, office entity 1416b and person entity 1416d have a non-aging relationship, while person entity 1416c and person entity 1416d have an aging relationship.

Figure 15:
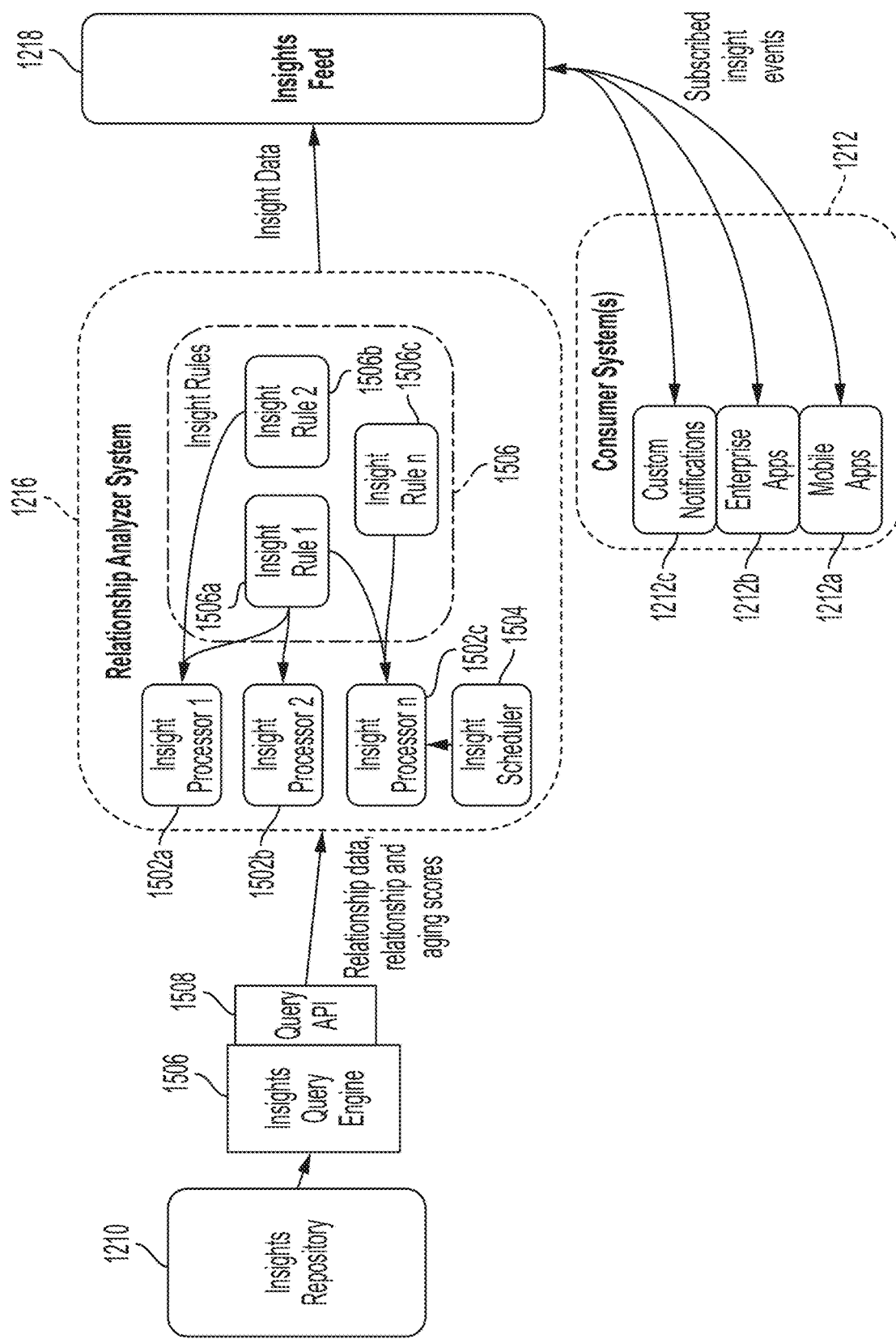
FIG. 15 depicts information flow for relationship analysis in a system for generating and utilizing an insights repository, in accordance with some embodiments.

FIG. 15 depicts information flow for relationship analysis in system 1200 for generating and utilizing an insights repository, in accordance with some embodiments.

As shown by the depicted embodiment, system 1200 may include insights repository system 1210, insights query engine 1506, query API 1508, relationship analyzer system 1216, insights feed 1218, and consumer system(s) 1212. Information for developing and publishing insights based on the information content of insights repository system 1210 may flow through system 1200 in accordance with the arrows shown in the diagram in FIG. 15, and as discussed further herein.

As discussed above, relationship analyzer system 1216 may receive data from insights repository system 1210 and may use that data to generate insight data to be published to insights feed 1218.

In some embodiments, data transmitted between insights repository system 1210 and relationship analyzer system 1216 may be transmitted via wired or wireless network communication. In some embodiments, system 1200 may be configured such that said communication between insights repository system 1210 and relationship analyzer system 1216 is facilitated by insights query engine 1506 and query API 1508. In some embodiments, insights query engine 1506 and query API 1508 may share any one or more characteristics in common with insights query engine 1306 and query API 1308 discussed above with respect to FIG. 13.

In some embodiments, relationship analyzer system 1216 may query insights repository 1506 in accordance with one or more predetermined or dynamically determined schedules, one or more predetermined or dynamically determined cadences, and/or one or more predetermined or dynamically determined trigger events. In some embodiments, relationship analyzer system 1216 may query insights repository 1506 via query API 1508, exposed by insights query engine 1506. In some embodiments, one or more different insight rules 1506a-c (see below) may have separate schedules, cadences, and/or trigger conditions. In some embodiments, an insight scheduler such as insight scheduler 1504 may be responsible for managing schedules, cadences, and/or trigger conditions for the application of one or more insight rules.

In some embodiments, requests and responses between insights repository system 1210 and relationship analyzer system 1216 may be stored in JSON format. Criteria in one or more of the queries may be based on one or more of the insight rules. The responses comprising repository data may be consumed by the relationship analyzer system 1216 and analyzed by one or more insight processors, as explained below.

As shown in FIG. 15, relationship analyzer system 1216 may comprise insight processor instances 1502a-1502c, each of which may be a processing instance configured to process data from insights repository system 1210 (e.g., entity data, relationship data, relationship aging data, etc.)

by applying one or more insight rules/rulesets against the repository data in order to generate insight data to be published to insights feed 1218. In some embodiments, insight processor instances 1502a-1502c may be general-purpose insight processors or may be specialized insight processors. In some embodiments, different ones of insight processor instances 1502a-1502c may be configured to process different kinds of insights repository data by calling different insight rules/rulesets.

In the embodiment shown, insight processor instances 1502a-1502c process repository data using insight rules/rulesets retrieved from insight rules corpus 1506, which may be any data store or computer memory provided as part of (or otherwise accessible by) relationship analyzer system 1216 and configured to store one or more insight rules 1506a-1506c. Insight rules 1506a-1506c may comprise code/instructions/algorithms for processing data from insights repository system 1210 in order to generate data to be published to insights feed 1218, and may further comprise metadata indicating the kinds of insights repository data to which the insight rules should be applied and/or the situations or contexts in which the insight rules should be applied. Insight rules 1506a-1506c may be defined (e.g., defined by users) in accordance with business rules and/or use cases.

Once insight data is generated by relationship analyzer system 1216, that data may be transmitted (e.g., via wired or wireless network communication) from relationship analyzer system 1216 to insights feed 1218, which may be provided by event stream service 1204 as explained above with reference to FIG. 12.

As shown in FIG. 15, system 1200 includes consumer system(s) 1212, which is shown in this embodiment as a collective group of three different consumer systems 1212a-c (as explained above with reference to FIG. 13). In the embodiment shown, each of the consumers 1212a-1212c are subscribed to one or more topics of insights feed 1218, such that information regarding one or more insights published to insights feed 1218 on the basis of insight data from relationship analyzer system 1216 may be automatically transmitted to one or more of consumers 1212a-1212c in accordance with their subscription.

In some embodiments, insights feed 1218 is a stream responsible for processing published insights (e.g., input topics) and allowing consumers to subscribe to insights (e.g., output topics). In some embodiments, relationship analyzer system 1216 publishes topics to insights feed 1218, and insights feed 1218 may transform an input insight topic into an output insight topic for subscribing consumers, as calls to external services, or as updates to databases, etc. In some embodiment, this may provide a highly scalable solution, by enabling an insight to be published once to many different endpoints (e.g., many different consumers).

In some embodiments, a consumer may subscribe to all insights of insights feed 1218; in some embodiments, a consumer may subscribe to only certain insights (e.g., only certain topics) of insights feed 1218, and insights may be selectively transmitted accordingly.

In some embodiments, insights feed 1218 may manage real-time and near-real-time pre-processed insight calculations from relationship analyzer system 1216. In some embodiments, insights feed 1218 may manage a very high throughput of inputs/outputs (e.g., higher throughputs than using direct SQL updates for a database). Insights feed 1218 may process input data as it arrives, format the data properly for consumers, and maintains proper security access to the data. In some embodiments, insights feed 1218 is not a persistent store for insight data.

In one example of applying an insight rule, a system (such as system 1200) may apply an insight rule called "Client/Tech Event Check." In accordance with this insight rule, the system may check every day at 2:00 p.m. for users that are local to or traveling to a city that is having an event on the same days the user is present in that city, where the event is associated with a client or technology on which the user is working. If any matches are found, the user may be notified with a custom notification.

In some embodiments, to apply the rule, an insight scheduler may cause the system to apply the rule at 2:00 p.m. every day, and an insight processor instance may be invoked to apply the rule and process information from an insights repository. The invoked insight processor may query the insights repository based on criteria in the insight rule retrieved from an insight rules corpus. The insights repository may then be checked for users traveling or local to a city that has an event where the user is associated with a client or technology from an engagement/utterance and/or skill set alignment related to the event. If there are results for the query, then the results may be published to insights feed as in a custom notification category/topic, and the relevant user may receive a notification.

Exemplary Insights Methods

Figure 16:
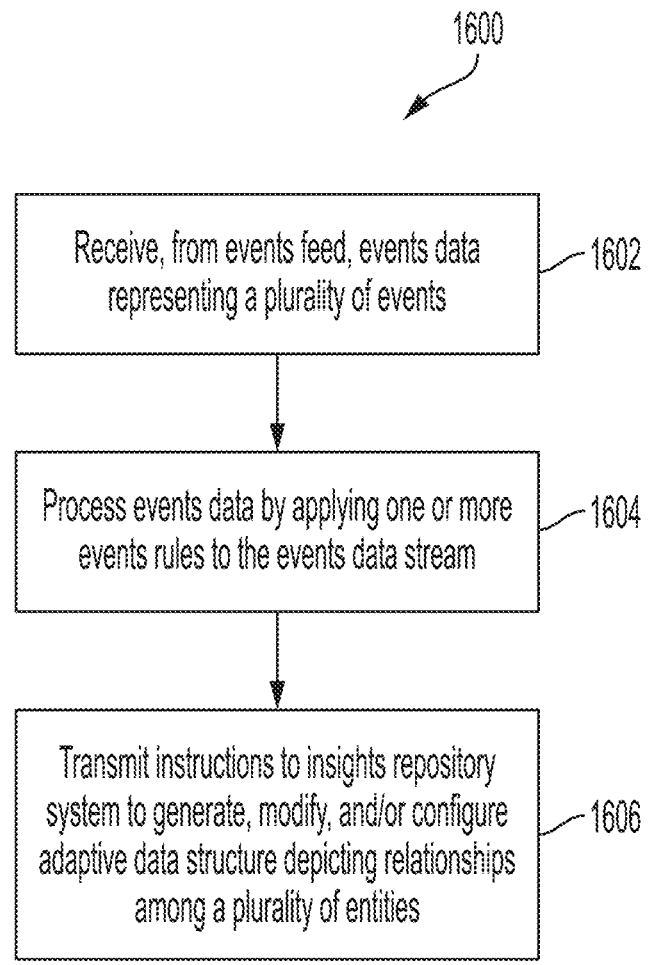
FIG. 16 depicts a flow chart showing an exemplary method 1600 for generating, modifying, and/or configuring an adaptive data structure depicting relationships among a plurality of entities, in accordance with some embodiments.

FIG. 16 depicts a flow chart showing an exemplary method 1600 for generating, modifying, and/or configuring an adaptive data structure depicting relationships among a plurality of entities, in accordance with some embodiments. In some embodiments, method 1600 may be performed by a system for generating and utilizing an adaptive data structure depicting relationships among a plurality of entities, such as system 1200 described above with reference to FIG. 12. In particular, the method steps of method 1600 may be performed by an event processor system of a system for generating and utilizing an adaptive data structure depicting relationships among a plurality of entities, such as event processor system 1208 of system 1200. In some embodiments, method 1600 may share any one or more characteristics in common with the techniques/methods described above with reference to the exemplary data flow and functionalities depicted in FIG. 13. Exemplary steps of method 1600 are described below.

At block 1602, in some embodiments, event processor system 1208 may receive events data representing a plurality of events. In some embodiments, the events data may be received from an events stream such as events stream 1206. Events data may be transmitted from events feed 1206 to event processor system 1208 via wired or wireless network communication. In some embodiments, different portions of the received events data may be received by and/or routed to one or more different components or portions of event processor system 1208, such as event processor instances (e.g., event processors 1208a-c).

In some embodiments, events data may be received at scheduled intervals and/or in real-time or near real-time (e.g., as available) from events stream 1206.

At block 1604, in some embodiments, event processor system 1208 may process the event data by applying one or more events rules to the events data received, in order to thereby generate data to be transmitted to an insights repository. In some embodiments, events data processing may be carried out by one or more different components or portions of event processor system 1208, such as event processor instances (e.g., event processors 1208a-c). In some embodiments, an event processor system and/or event processor instance may retrieve one or more event rules (and/or rulesets) from an event rule corpus such as event rules corpus 1209 in order to apply the rule/ruleset to the events data received. In some embodiments, the specific rule selected may be dictated by content (e.g., event type) of the events data received.

By applying one or more event rules/rulesets to the events data received, event processor system 1208 may generate data (e.g., instructions) to be transmitted to an insights repository system, wherein the data (e.g., instructions) may be used to by the insights repository to generate, modify, and/or configure an insights repository.

At block 1606, in some embodiments, event processor system 1208 may transmit the instructions to an insights repository system, the instructions configured to cause the insights repository system, such as insights repository system 1210, to generate, modify, and/or configure an adaptive data structure (e.g., an insights repository) depicting relationships among a plurality of entities. The transmitted instructions may be based on the data generated by the application of the one or more rules/rulesets to the event data by event processor system 1208. In this way, information about entities may be extracted from events data in the events feed, and that information may be used to populate/configure an insights repository with the information about the entities that was gleaned from the events data. In some embodiments, the instructions transmitted to insights repository system 1210 may include instructions to store a representation of an entity or other information object, modify a stored representation of an entity or other object, store a representation of a relationship between two or more entities and/or other information objects, and/or modify a stored representation of a relationship between two or more entities and/or other information objects.

As discussed above, once information is stored in an insights repository representing relationships between entities and/or other information objects, then that insights repository may be queried by one or more consumers (e.g., as discussed below with reference to FIG. 17) and/or may be queried to generate insights to be published to an insights feed to which one or more consumers may be subscribed (e.g., as discussed below with reference to FIG. 18).

Figure 17:
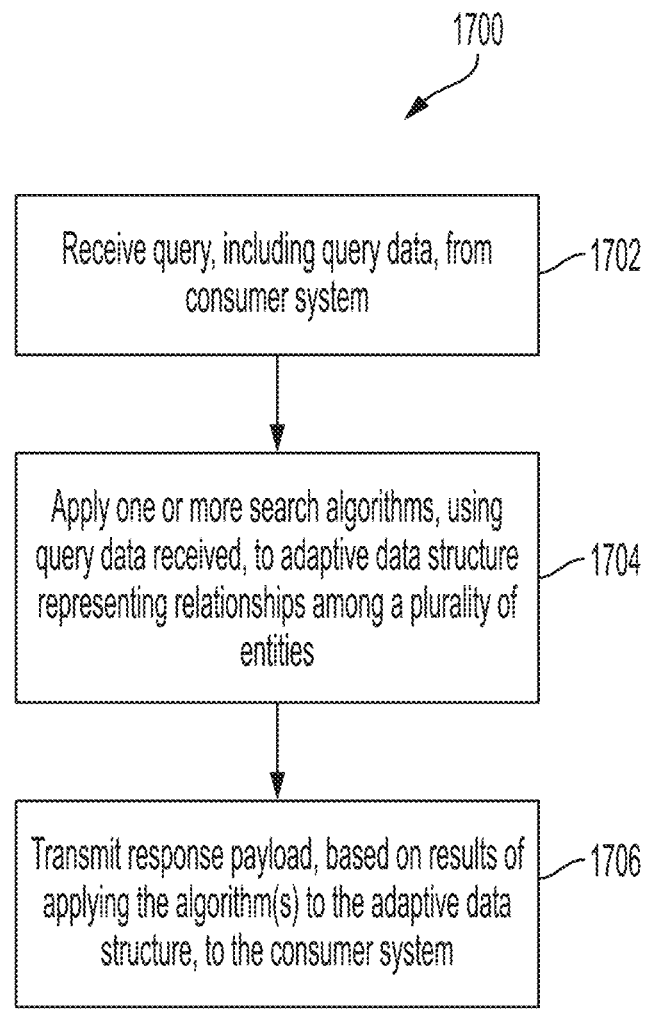
FIG. 17 depicts a flow chart showing an exemplary method 1700 for fulfilling and responding to a query using an adaptive data structure depicting relationships among a plurality of entities, in accordance with some embodiments.

FIG. 17 depicts a flow chart showing an exemplary method 1700 for fulfilling and responding to a query using an adaptive data structure depicting relationships among a plurality of entities, in accordance with some embodiments. In some embodiments, method 1700 may be performed by a system for generating and utilizing an adaptive data structure depicting relationships among a plurality of entities, such as system 1200 described above with reference to FIG. 12. In particular, the method steps of method 1700 may be performed by an insights repository system of a system for generating and utilizing an adaptive data structure depicting relationships among a plurality of entities, such as insights repository system 1210 of system 1200. In some embodiments, method 1700 may share any one or more characteristics in common with the techniques/methods described above with reference to the exemplary data flow and functionalities depicted in FIG. 13. Exemplary steps of method 1700 are described below.

At block 1702, in some embodiments, insights repository system 1210 may receive a query, including query data, from a consumer system. In some embodiments, the consumer system may be consumer systems(s) 1212 as discussed above with respect to FIGS. 12 and 13, and the query may be any query received via wired or wireless network transmission. In some embodiments, the query may be received via query API 1308 and/or IQL engine 1306. In some embodiments, the query may be query 1414 discussed above with respect to FIG. 14A.

In some embodiments, the query may be received by a data structure controller, such as data structure controller 1302 or data structure controller 1402, of the insights repository system. In some embodiments, the query may be received by and/or routed to a specific component of a data structure controller, such as a specific controller, in accordance with the content of the query itself (e.g., an explicit or implicit indication in the query as to which kind of controller should be used and/or which one of a plurality of data structures should be interrogated in accordance with the query).

At block 1704, in some embodiments, insights repository system 1210 may apply one or more search algorithms, using query data received, to an adaptive data structure representing relationships among a plurality of entities (e.g., an insights repository). In some embodiments, insights repository system 1210 may apply one or more search algorithms, using the query data received from consumer system(s) 1202, to one or more of data structures 1304*a-b* and/or data structures 1404*a-c*. In some embodiments, the one or more search algorithms applied by insights repository system 1210 may be the EIP algorithm at block 604 of FIG. 6, or may share any one or more characteristics in common therewith.

In some embodiments, one or more processors of insights repository system 1210, such as one or more processors of a data structure controller, may apply the one or more algorithms.

By applying the one or more search algorithms against the data structure using the content of the query received, insights repository system 1210 may generate one or more results (e.g., resulting entities, intents, utterances, or other information objects) that satisfy the query.

As discussed above with respect to FIG. 6, application of the one or more algorithms may in some embodiments yield a plurality of results, such as a ranked list of results each associated with a confidence score as discussed above with respect to the payload described with reference to blocks 610 and 612 of FIG. 6.

At block 1706, in some embodiments, insights repository system 1210 may transmit a response payload, based on the results of applying the algorithm(s) to the adaptive data structure, to the consumer system. In some embodiments, the response payload may comprise one or more entities (or other information objects) represented in the adaptive data structure that are responsive to the query, as determined based on the application of the search algorithm(s). In some embodiments, the response payload may comprise a plurality of responsive results. In some embodiments, the response payload may comprise a ranked list of responsive results. In some embodiments, insights repository 1210 may transmit a response payload, such as the response payload described with reference to blocks 610 and 612 of FIG. 6, to the consumer system(s) 1202 that sent the query to which the payload is responsive.

In some embodiments, the response payload may be prepared/generated and/or transmitted, in whole or in part, by a results aggregator of insights repository system 1210, such as search results aggregator 1406 as shown in FIG. 14A.

The response payload may be transmitted to the consumer system that transmitted the original query; the payload may be transmitted by wired or wireless network communication.

Figure 18:
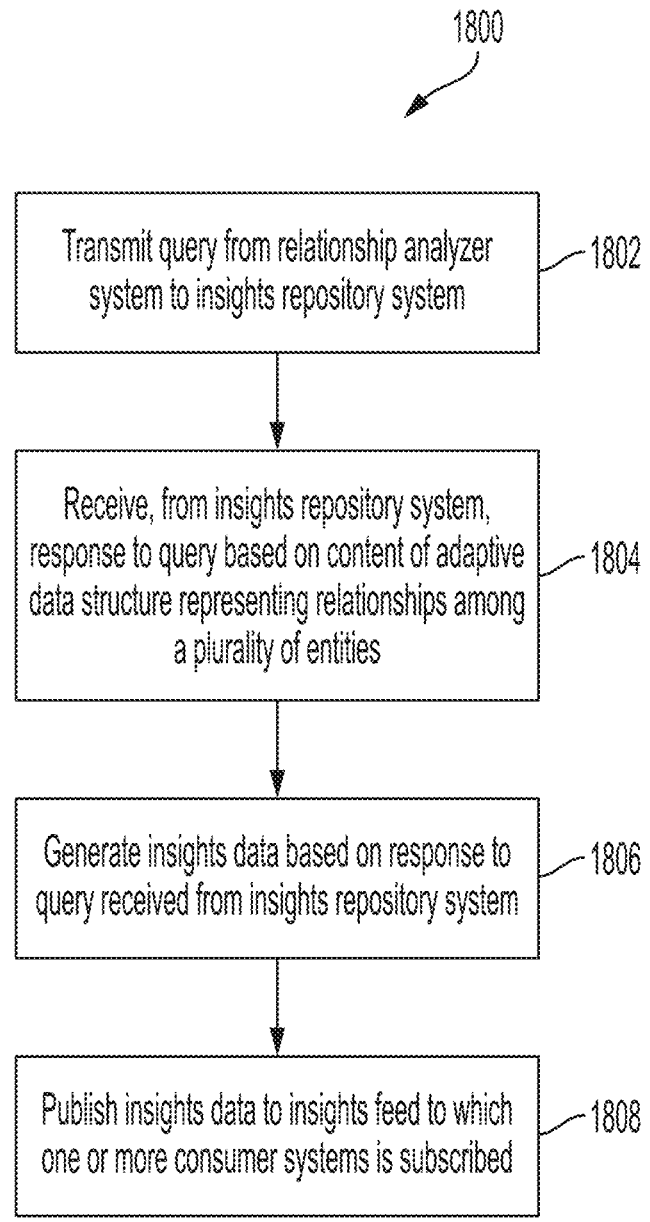
FIG. 18 depicts a flow chart showing an exemplary method 1800 for fulfilling generating an insights feed, in accordance with some embodiments.

FIG. 18 depicts a flow chart showing an exemplary method 1800 for fulfilling generating an insights feed, in accordance with some embodiments. In some embodiments, method 1800 may be performed by a system for generating and utilizing an adaptive data structure depicting relationships among a plurality of entities, such as system 1200 described above with reference to FIG. 12. In particular, the method steps of method 1800 may be performed by a relationship analyzer system of a system for generating and utilizing an adaptive data structure depicting relationships among a plurality of entities, such as relationship analyzer system 1216 of system 1200. In some embodiments, method 1800 may share any one or more characteristics in common with the techniques/methods described above with reference to the exemplary data flow and functionalities depicted in FIG. 15. Exemplary steps of method 1800 are described below.

At block 1802, in some embodiments, relationship analyzer system 1216 may transmit a query from relationship analyzer system to an insights repository system, such as insights repository system 1210. In some embodiments, the transmitted query may be a query configured to retrieve results responsive to one or more insight rules, wherein an insight rule may be configured to generate one or more insights, based on the information content of the repository, to be published to an insights feed. In some embodiments, an insight rule defining the scope or content of an insight query may be defined by a user or may be automatically defined by a system in accordance with one or more business needs and/or use cases.

In some embodiments, the query may be transmitted via wired or wireless network communication. In some embodiments, the query may be transmitted via a query API such as query API 1508 and/or via an insights query engine such as insights query engine 1506.

In some embodiments, the query may be sent in accordance with one or more predetermined or dynamically determined schedules, one or more predetermined or dynamically determined cadences, and/or one or more predetermined or dynamically determined trigger events, for example as discussed above with respect to FIG. 15.

At block 1804, in some embodiments, relationship analyzer system 1216 may receive, from insights repository system 1210, a response to the query, the response based on the information content of the adaptive data structure representing relationships among a plurality of entities. In some embodiments, the response to the query may be generated by the application of one or more search algorithms, based on the query, to the data structure. In some embodiments, generating the response to the query may share any one or more characteristics in common with generating a response to a query as discussed above with respect to the information flow in FIG. 15 and/or as discussed above with respect to generating a response to a query in FIG. 17.

At block 1806, in some embodiments, relationship analyzer system 1216 may generate insights data based on the query response received from insights repository system 1210. In some embodiments, insights data may be generated by applying one or more insight rules, such as insight rules 1506a-c to, the information received from insights repository 1210 in response to the query sent at block 1802. In some embodiments, different insight processors (e.g., different ones of insight processor instances 1502a-1502c) may be configured to process different kinds of insights repository data by calling different insight rules/rulesets.

Relationship analyzer system 1216 may thus process the information received regarding entities, relationships, relationship scores, and the like, in order to generate insights data in accordance with the instructions of one or more insights rules. As stated above, the one or more insights rules may be user-determined or system-determined in accordance with one or more business needs and/or use cases.

At block 1808, in some embodiments, relationship analyzer system 1216 may publish the generated insights data to an insights feed to which one or more consumer systems is subscribed. In some embodiments, the insights feed may be insights feed 1218 of system 1200, and the subscribed consumer systems may be consumer system(s) 1212 of system 1200.

As explained above with respect to FIG. 15, an insights feed may be a stream responsible for processing published insights (e.g., input topics) and allowing consumers to subscribe to insights (e.g., output topics). In some embodiments, relationship analyzer system 1216 publishes topics to insights feed 1218, and insights feed 1218 transforms an input insight topic into an output insight topic for subscribing consumers, as calls to external services, or as updates to databases, etc.

Exemplary Insights Graphical User Interfaces

FIGS. 19-22 show exemplary user interfaces for interacting with a system for generating and utilizing an adaptive data structure depicting relationships among a plurality of entities, such as the systems described herein. In some embodiments, the graphical user interfaces shown in FIGS. 19-22 may be implemented by a user device configured to send and receive messages via network communication to a system such as system 1200. In some embodiments, the graphical user interfaces shown in FIGS. 19-22 may be implemented by a device that constitutes a consumer system for a system such as system 1200, such as consumer system(s) 1212.

Figure 19C:
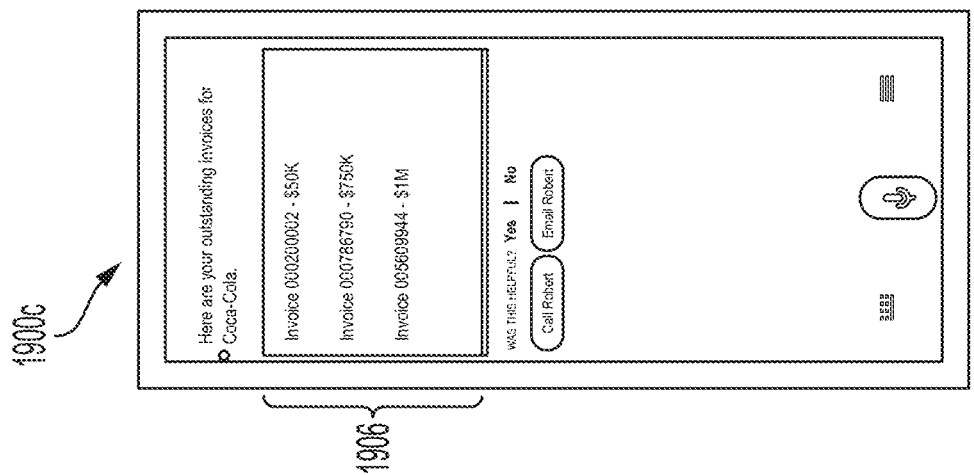
FIGS. 19A-C depict exemplary graphical user interfaces for leveraging an insight repository system, in accordance with some embodiments.
Figure 19B:
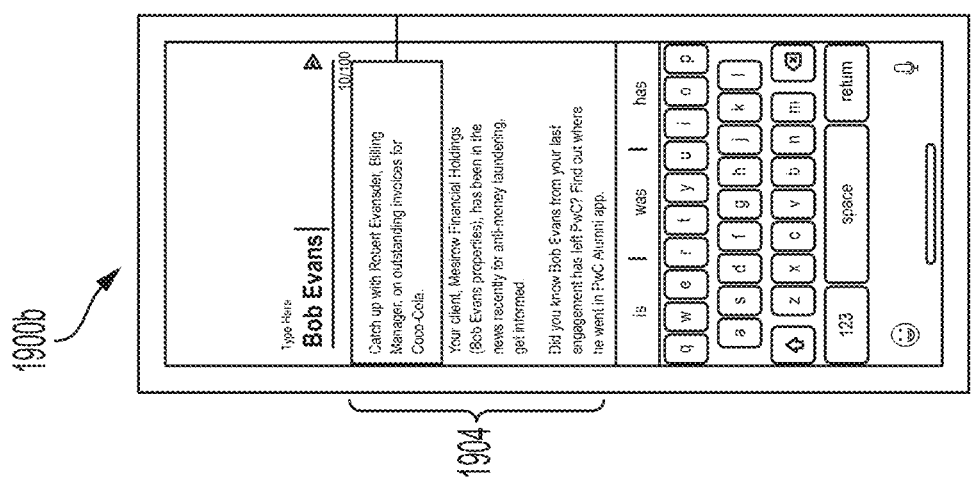
Figure 19A:
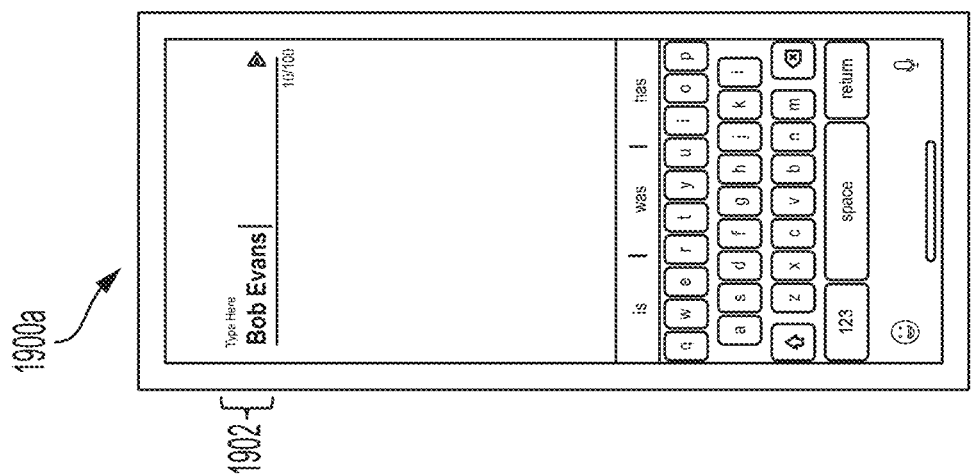

FIGS. 19A-19C depict graphical user interface 1900, which includes screens 1900a-c, in accordance with some embodiments. FIGS. 19A-19C show an example of a user querying an insights repository via a typed text query to gather insights in real time as the user types. The returned and displayed to the user are based upon the relationships represented in the insights repository and the strength of the relevancy of various results to the user's typed utterance. In some embodiments, suggested insights displayed to the user may continue to get narrower as a user continues to type, as narrower queries are sent to the insights repository with each keystroke.

At FIG. 19A, the user types a query into field 1902. In the embodiment shown, the query typed is the text string "Bob Evans."

At FIG. 19B, a plurality of suggested results 1904 are displayed to the user based on the system having queried the insights repository. In the example shown, the user taps to select the first of the three results 1904, which reads: "Catch up with Robert Evansder, Billing Manager, on outstanding invoices for Coca-Cola."

At FIG. 19C, responsive to the user selecting the suggested option regarding reviewing invoices with Robert Evansder, the system displays invoices 1906 for Coca-Cola. In some embodiments, the system is able to display the relevant invoices for Coca-Cola because the system is aware, based on the insights repository, of the relationship between Robert Evansder (one entity reflected in the insights repository) and Coca-Cola (another entity reflected in the insights repository).

Figure 20:
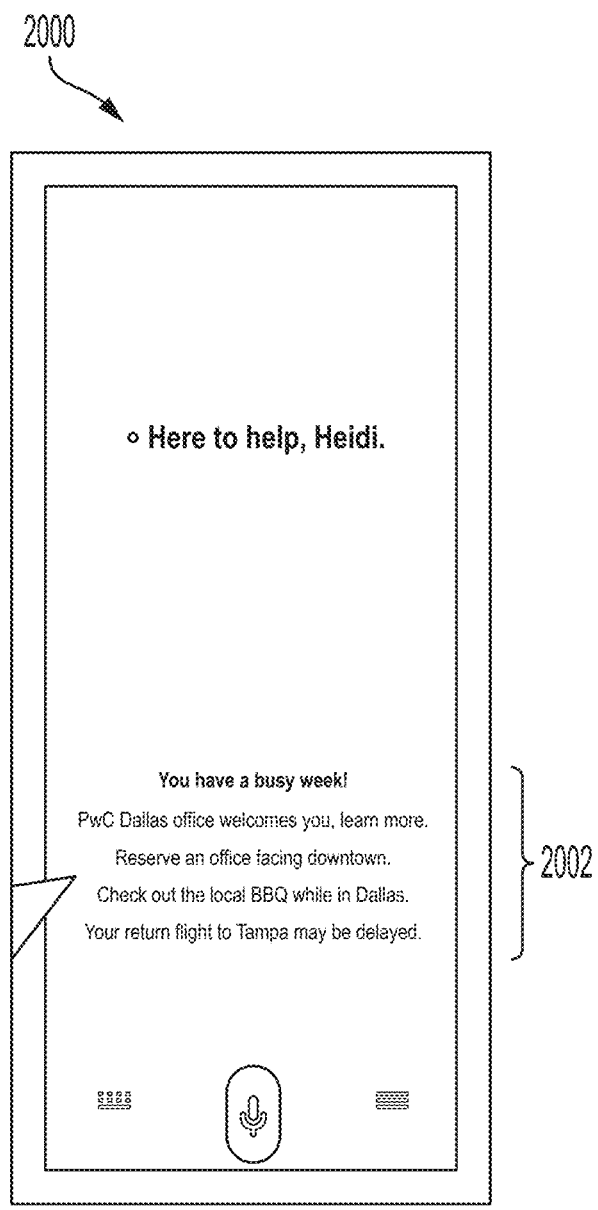
FIG. 20 depicts exemplary graphical user interfaces for leveraging an insight repository system, in accordance with some embodiments.

FIG. 20 depicts graphical user interface 2000, which includes screen 2000a, in accordance with some embodiments. FIG. 20 shows an example of a user and/or user device querying an insights repository to gain insights for a particular office location. In this example, the query sent to the insights repository includes geographic information (e.g., from a GPS sensor of the user device) and/or an indication of a specific location (e.g., an office that the user is visiting, as indicated in a calendar application). In response to the query, the user receives various suggested results that are displayed to the user.

As shown in FIG. 20, options 2002 are displayed to the user based on the location-based query that was sent to the insights repository. As shown, the options include an option for reserving office space, an option regarding local restaurants, and a notification about an upcoming return flight for the user. In some embodiments, other options displayed to the user may include local lodging options, review of local options by other users, current events involving the location, upcoming events in the location, etc.

In some embodiments, options displayed to the user may be based on the user's current location, information about one or more entities and/or events in the vicinity of the user, and/or the user's previous behavior and relevancy.

Figure 21B:
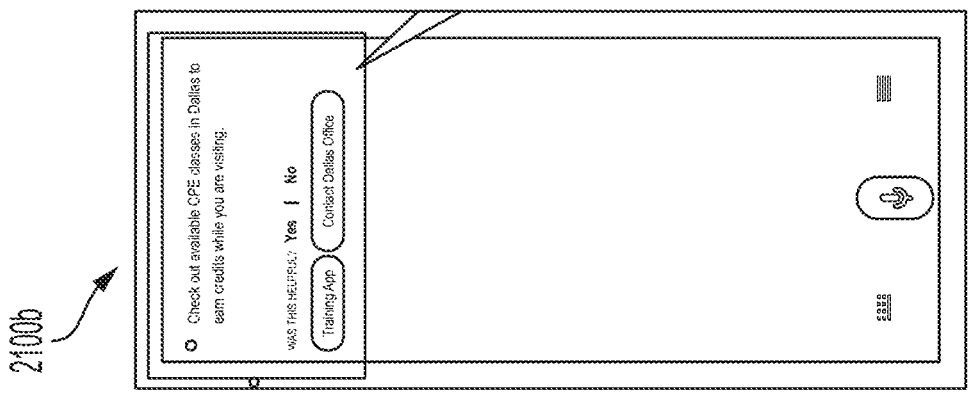
FIGS. 21A and 21B depict exemplary graphical user interfaces for leveraging an insight repository system, in accordance with some embodiments.
Figure 21A:
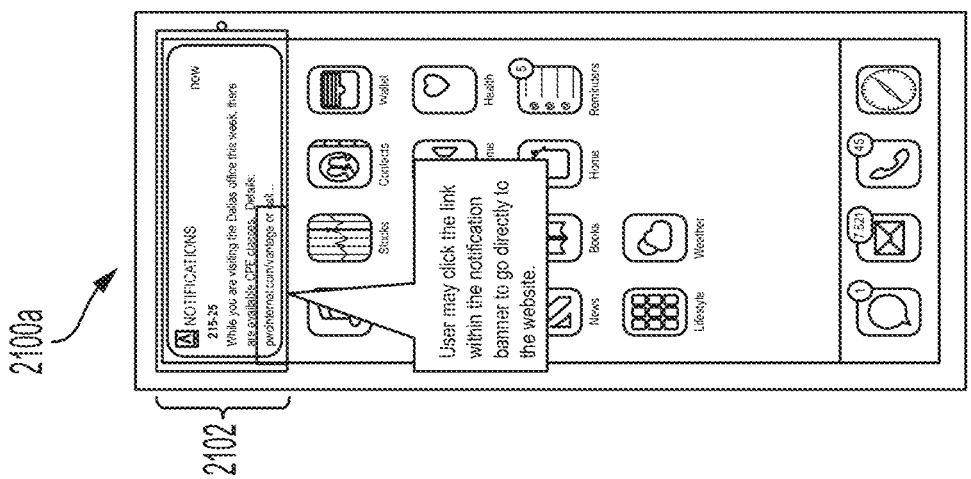

FIGS. 21A-21B depict graphical user interface 2100, which includes screens 2100a-b, in accordance with some embodiments. FIGS. 21A-21B show an example of notifications being provided to a user based in part on an insights repository. Notifications may be generated, in some embodiments, by automatic (e.g., scheduled, periodic) queries to an insights repository based on one or more aspects of information about a user, including the user's current schedule, location, workload, client base, contacts, business activities, etc. Notifications may provide a proactive approach to informing the user of actions to take to improve their daily events.

At FIG. 21A, notification 2102 is displayed to the user indicating that CPE classes are available in Dallas during the user's visit to that city. This notification may be generated in response to a query sent to an insights repository, wherein the query includes information regarding the user's location (e.g., based on a GPS sensor in the user device and/or based on the user's calendar or travel reservations)

As shown in FIG. 21B, the user may be directed to a relevant website for the indicated CPE classes if the user selects the link displayed in notification 2102 in FIG. 21A.

Figures 22A, 22B:
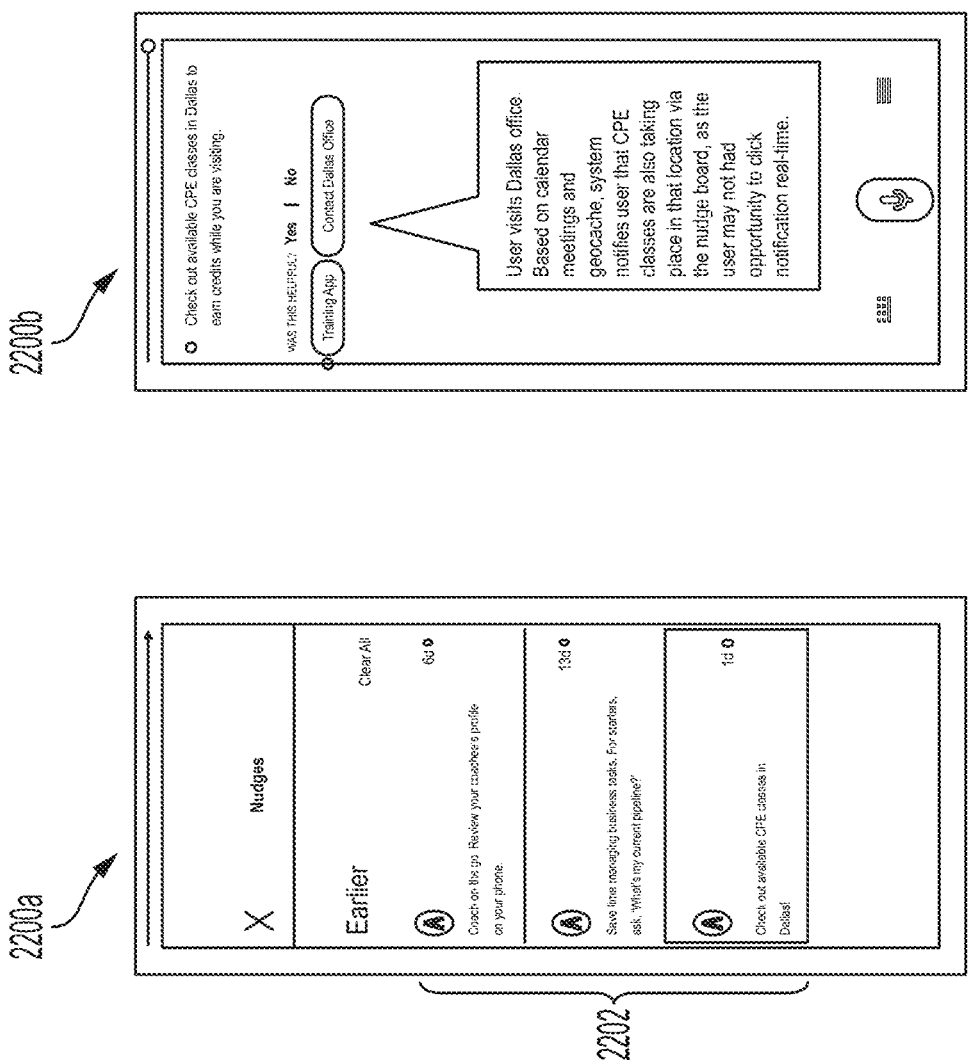
FIGS. 22A and 22B depict exemplary graphical user interfaces for leveraging an insight repository system, in accordance with some embodiments.

FIGS. 22A-22B depict graphical user interface 2220, which includes screens 1220a-b, in accordance with some embodiments. FIGS. 22A-22B show an example of a notification board (which may alternatively be referred to as a nudge board) displaying one or more insightful notifications to the user. A notification board may in some embodiments display any one or more of the same notifications to the user that may be displayed as pop-up or real-time notifications as discussed above with respect to FIGS. 21A-21B. Notifications for a notification board may be generated in a same or similar manner, based on an insights repository, as the notifications discussed above with respect to FIGS. 21A-21B.

In some embodiments, a notification board may function in a similar manner to an inbox. In some embodiments, notifications displayed in a notification board may expire at a predetermined time, after a predetermined amount of time, and/or in response to a predetermined or dynamically determined trigger condition. In some embodiments, a notification may be removed from a notification board upon a determination made by the system, based on a subsequent query of the insights repository, that the notification is no longer accurate and/or no longer relevant. In some embodiments, a user and/or administrator may be able to select one or more settings to customize the notifications and/or kinds of notifications that are displayed on a notification board.

FIG. 22A shows an example of a notification board displaying three notifications 2202. In the example shown, the third notification of the notifications 2202 is the same notification regarding CPE classes that was displayed at notification 2102 in FIG. 21A above.

As shown in FIG. 22B, the user may be directed to a relevant website for the indicated CPE classes if the user selects the third notification of the notifications 2202 in FIG. 22A.

Exemplary Computer

Figure 23:
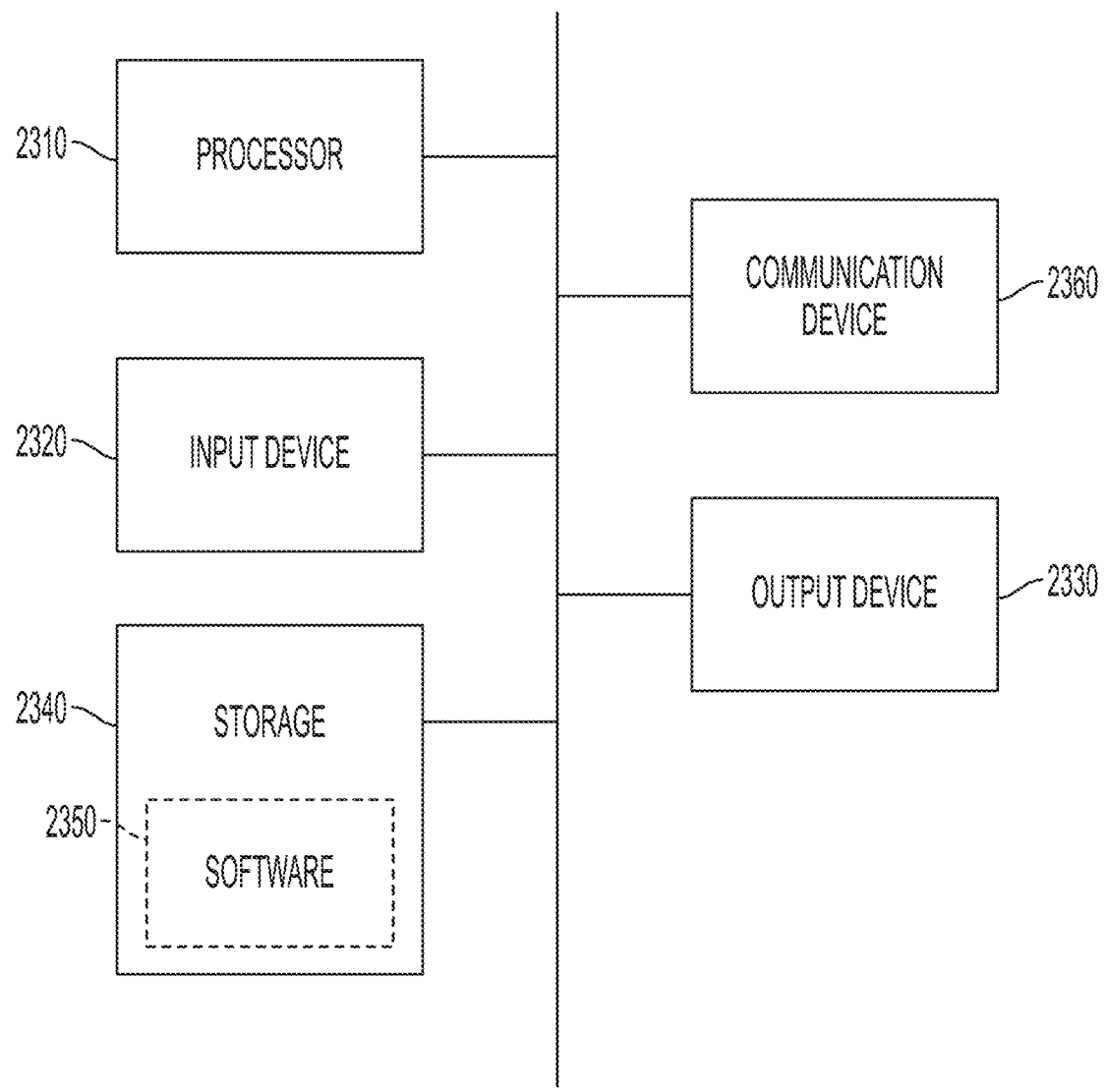
FIG. 23 depicts a computing system, in accordance with some embodiments.

FIG. 23 illustrates a computer, in accordance with some embodiments. Computer 2300 can be a component of a system for optimizing cooperative actions among heterogeneous autonomous connected machines, such as system 100 and/or any of its subcomponents described above with respect to FIG. 1. In some embodiments, computer 2300 may be configured to execute a method for natural language understanding, such as all or part of method 800 described above with respect to FIG. 8 and/or all or part of the methods described with respect to the microservices described in FIGS. 2-7.

Computer 2300 can be a host computer connected to a network. Computer 2300 can be a client computer or a server. As shown in FIG. 23, computer 2300 can be any suitable type of microprocessor-based device, such as a personal computer; workstation; server; or handheld computing device, such as a phone or tablet. The computer can include, for example, one or more of processor 2310, input device 2320, output device 2330, storage 2340, and communication device 2360.

Input device 2320 can be any suitable device that provides input, such as a touch screen or monitor, keyboard, mouse, or voice-recognition device. Output device 2330 can be any suitable device that provides output, such as a touch screen, monitor, printer, disk drive, or speaker.

Storage 2340 can be any suitable device that provides storage, such as an electrical, magnetic, or optical memory, including a RAM, cache, hard drive, CD-ROM drive, tape drive, or removable storage disk. Communication device 2360 can include any suitable device capable of transmitting and receiving signals over a network, such as a network interface chip or card. The components of the computer can be connected in any suitable manner, such as via a physical bus or wirelessly. Storage 2340 can be a non-transitory computer-readable storage medium comprising one or more programs, which, when executed by one or more processors, such as processor 2310, cause the one or more processors to execute methods described herein, such as method 800 described above with respect to FIG. 8 and/or all or part of the methods described with respect to the microservices described in FIGS. 2-7.

Software 2350, which can be stored in storage 2340 and executed by processor 2310, can include, for example, the programming that embodies the functionality of the present disclosure (e.g., as embodied in the systems, computers, servers, and/or devices as described above). In some embodiments, software 2350 can be implemented and executed on a combination of servers such as application servers and database servers.

Software 2350 can also be stored and/or transported within any computer-readable storage medium for use by or in connection with an instruction execution system, apparatus, or device, such as those described above, that can fetch and execute instructions associated with the software from the instruction execution system, apparatus, or device.

In the context of this disclosure, a computer-readable storage medium can be any medium, such as storage 2340, that can contain or store programming for use by or in connection with an instruction execution system, apparatus, or device.

Software 2350 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 2300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 2300 can implement any operating system suitable for operating on the network. Software 2350 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for creating an adaptive data structure representing relationships among entities, the system comprising one or more processors and memory storing instructions configured to be executed by the one or more processors to cause the system to:
   receive, via an event feed, a data stream comprising data regarding a plurality of events; and
   generate, by an event processor system, the adaptive data structure depicting relationships among entities, wherein generating the adaptive data structure comprises:
   applying one or more rules to configure, based on the data stream, a relationship score between a pair of entities;
   wherein the event processor system comprises:
   an event rule corpus storing a plurality of event rules; and
   a plurality of event-type specific event processor instances, wherein each of the plurality of event-type specific event processor instances are configured to be instantiated in accordance with processing needs, to select one or more of the event rules and apply the one or more selected rules to the data stream to generate the relationship score between the pair of entities, and to process events of a predetermined respective event type.

2. The system of claim 1, wherein configuring the relationship score between the pair of entities comprises generating and storing the score.

3. The system of claim 1, wherein configuring the relationship score comprises modifying the score by an amount determined by applying the one or more rules.

4. The system of claim 1, wherein configuring the relationship score comprises configuring the score such that it is a number that is not less than 0 and is not greater than 1.

5. The system of claim 1, wherein generating the adaptive data structure comprises generating and storing a representation in the adaptive data structure, based on the data stream, representing a new entity.

6. The system of claim 1, wherein generating the adaptive data structure comprises updating, based on the data stream, a characteristic of a representation in the adaptive data structure.

7. The system of claim 1, wherein generating the adaptive data structure comprises updating the adaptive data structure, following its initial creation, based on the data stream.

8. The system of claim 1, wherein one or more of the event processor instances is configured to select one or more of the event rules from the event rule corpus based on a respective event type of one of the plurality of events.

9. The system of claim 1, wherein the adaptive data structure is stored in an insights repository system comprising:
   one or more non-transitory computer-readable storage mediums storing the adaptive data structure; and
   a data structure controller configured to execute a search algorithm against content of the adaptive data structure.

10. The system of claim 9, wherein the data structure controller comprises a plurality of connectors, each of the plurality of connectors configured to interface with a predetermined respective type of adaptive data structure.

11. The system of claim 10, wherein the data structure controller comprises a query builder configured to communicate, based on incoming query data from one or more consumer systems, with one or more of the plurality of connectors to cause the one or more of the plurality of connectors to cause execution of a search algorithm against the adaptive data structure.

12. The system of claim 11, wherein the incoming query data is received by the data structure controller via a query API.

13. The system of claim 1, wherein generating the adaptive data structure comprises storing an indication as to whether the pair of entities are linked by an aging relationship or a non-aging relationship.

14. The system of claim 13, wherein storing the indication as to whether the pair of entities are linked by an aging relationship or a non-aging relationship comprises storing an aging rate for the relationship.

15. The system of claim 14, wherein generating the adaptive data structure comprises, after storing the indication that the pair of entities are linked by an aging relationship, decreasing the relationship score in accordance with an aging process of the aging relationship.

16. The system of claim 1, wherein the data stream comprising the plurality of events is received from one or more data sources including one or more of a conversation history source, an internal trend source, an external trend source, an enterprise system, and an enterprise collaboration system.

17. The system of claim 1, wherein the adaptive data structure depicts relationships among:
   pairs of entities including two user entities;
   pairs of entities including two non-user entities; and
   pairs of entities including one user entity and one non-user entity.

18. The system of claim 1, wherein the adaptive data structure is a data structure type selected from: a database data structure, a graph data structure, and an index data structure.

19. A method for creating an adaptive data structure representing relationships among entities, the method performed by a system comprising one or more processors, the method comprising:
   receiving, via an event feed, a data stream comprising data regarding a plurality of events; and
   generating, by an event processor system, the adaptive data structure depicting relationships among entities, wherein generating the adaptive data structure comprises:
      applying one or more rules to configure, based on the data stream, a relationship score between a pair of entities;
   wherein the event processor system comprises:
      an event rule corpus storing a plurality of event rules; and
      a plurality of event-type specific event processor instances, wherein each of the plurality of event-type specific event processor instances is configured to be instantiated in accordance with processing needs, to select one or more of the event rules and apply the one or more selected rules to the data stream to generate the relationship score between the pair of entities, and to process events of a predetermined respective event type.

20. A non-transitory computer-readable storage medium for creating an adaptive data structure representing relationships among entities, the storage medium storing instructions configured to be executed by a system comprising one or more processors to cause the system to:
   receive, via an event feed, a data stream comprising data regarding a plurality of events; and
   generate, by an event processor system, the adaptive data structure depicting relationships among entities, wherein generating the adaptive data structure comprises:
      applying one or more rules to configure, based on the data stream, a relationship score between a pair of entities;
   wherein the event processor system comprises:
      an event rule corpus storing a plurality of event rules; and
      a plurality of event-type specific event processor instances, wherein each of the plurality of event processor instances is configured to be instantiated in accordance with processing needs, to select one or more of the event rules and apply the one or more selected rules to the data stream to generate the relationship score between the pair of entities, and to process events of a predetermined respective event type.

21. A system for generating responses to incoming queries regarding one or more entities, the system comprising:
   one or more non-transitory computer-readable storage mediums storing an adaptive data structure representing relationships among a plurality of entities, wherein the adaptive data structure is stored in an insights repository system comprising a data structure controller configured to execute a search algorithm against the content of the adaptive data structure, wherein the data structure controller comprises a plurality of connectors, each of the plurality of connectors configured to interface with a predetermined respective type of adaptive data structure, and wherein the data structure controller comprises a query builder configured to communicate, based on incoming query data from one or more consumer systems, with one or more of the plurality of connectors to cause the one or more of the plurality of connectors to cause execution of a search algorithm against the adaptive data structure; and
   one or more processors; and
   memory storing instructions configured to be executed by the one or more processors to cause the system to:
      receive a query from a consumer system, the query including query data;
      in response to receiving the query data, apply one or more search algorithms, using the query data, to the adaptive data structure to generate a set of results data;
      aggregate the sets of the results data to generate aggregated search results; and
      generate a response payload, based on the application of the one or more search algorithms to the adaptive data structure and based on the aggregation, for transmission to the consumer system, wherein the response payload comprises a ranked list of selected entries along with associated respective confidence scores for each entry on the ranked list, wherein the ranked list comprises a number of entries determined based on whether respective confidence scores for respective entries are above a confidence score threshold.

22. The system of claim 21, wherein the query is received from the consumer system via a query API.

23. The system of claim 21, wherein receiving the instructions are further configured to cause the system to:
   in response to retrieving the query, convert the query into an intermediate data structure;
   convert the intermediate data structure to a native query data structure configured to be processed to apply the one or more search algorithms.

24. A method for generating responses to incoming queries regarding one or more entities, the method performed by a system comprising one or more processors and a non-transitory computer-readable storage mediums storing an adaptive data structure representing relationships among a plurality of entities, the method comprising:
   receiving a query from a consumer system, the query including query data;
   in response to receiving the query data, applying one or more search algorithms, using the query data, to the adaptive data structure to generate a set of results data, wherein the adaptive data structure is stored in an insights repository system comprising a data structure controller configured to execute a search algorithm against the content of the adaptive data structure, wherein the data structure controller comprises a plurality of connectors, each of the plurality of connectors configured to interface with a predetermined respective type of adaptive data structure, and wherein the data structure controller comprises a query builder configured to communicate, based on incoming query data from one or more consumer systems, with one or more of the plurality of connectors to cause the one or more of the plurality of connectors to cause execution of a search algorithm against the adaptive data structure;

aggregating the sets of the results data to generate aggregated search results; and generating a response payload, based on the application of the one or more search algorithms to the adaptive data structure and based on the aggregation, for transmission to the consumer system, wherein the response payload comprises a ranked list of selected entries along with associated respective confidence scores for each entry on the ranked list, wherein the ranked list comprises a number of entries determined based on whether respective confidence scores for respective entries are above a confidence score threshold.

25. A non-transitory computer-readable storage medium for generating responses to incoming queries regarding one or more entities, the non-transitory computer-readable storage medium configured to be executed by a system comprising one or more processors to cause the system to:

receive a query from a consumer system, the query including query data;

in response to receiving the query data, apply one or more search algorithms, using the query data, to an adaptive data structure representing relationships among a plurality of entities to generate a set of results data, wherein the adaptive data structure is stored in an insights repository system comprising a data structure controller configured to execute a search algorithm against the content of the adaptive data structure, wherein the data structure controller comprises a plurality of connectors, each of the plurality of connectors configured to interface with a predetermined respective type of adaptive data structure, and wherein the data structure controller comprises a query builder configured to communicate, based on incoming query data from one or more consumer systems, with one or more of the plurality of connectors to cause the one or more of the plurality of connectors to cause execution of a search algorithm against the adaptive data structure;

aggregate the sets of the results data to generate aggregated search results; and generate a response payload, based on the application of the one or more search algorithms to the adaptive data structure and based on the aggregation, for transmission to the consumer system, wherein the response payload comprises a ranked list of selected entries along with associated respective confidence scores for each entry on the ranked list, wherein the ranked list comprises a number of entries determined based on whether respective confidence scores for respective entries are above a confidence score threshold.

26. A system for generating an insights feed, the system comprising:

one or more non-transitory computer-readable storage mediums storing an adaptive data structure storing an adaptive data structure representing relationships among a plurality of entities, wherein the adaptive data structure is stored in an insights repository system comprising a data structure controller configured to execute a search algorithm against the content of the adaptive data structure, wherein the data structure controller comprises a plurality of connectors, each of the plurality of connectors configured to interface with a predetermined respective type of adaptive data structure, and wherein the data structure controller comprises a query builder configured to communicate, based on incoming query data from one or more consumer systems, with one or more of the plurality of connectors to cause the one or more of the plurality of connectors to cause execution of a search algorithm against the adaptive data structure; and one or more processors; and memory storing instructions configured to be executed by the one or more processors to cause the system to:

transmit a query from a relationship analyzer system to the insights repository system, the insights repository system comprising the adaptive data structure and the query comprising query data to be applied against the adaptive data structure;

receive, from the insights repository system, a response to the query;

generate, based on the response to the query, insights data;

transmit the insights data to an insights feed to which one or more consumers systems is subscribed; and transform, by the insights feed, the received insights data into output insight data for the one or more subscribing customers;

wherein the relationship analyzer system comprises:

an insight rule corpus storing a plurality of insight rules; and a plurality of insight processor instances, each of the plurality of insight processor instances configured to apply a respective set of one or more of the plurality of respective insight rules to the response to the query data in order to generate the insights data.

27. The system of claim 26, wherein:

the relationship analyzer system comprises an insight scheduler, and transmitting the query to the insights repository system is performed in accordance with instructions stored in an insight scheduler.

28. The system of claim 27, wherein the insight scheduler is configured to query cause the system to transmit the query in accordance with one or more of a predefined schedule, a predefined cadence, or detection by the system of a predefined trigger condition.

29. The system of claim 26, wherein the query is transmitted from the relationship analyzer system to an insights repository system via a query API.

30. The system of claim 29, wherein the response to the query is transmitted from the insights repository system to the relationship analyzer system via the query API.

31. A method for generating an insights feed, the method performed by a system comprises one or more non-transitory computer-readable storage mediums storing an adaptive data structure representing relationships among a plurality of entities and one or more processors, the method comprising:

transmitting a query from a relationship analyzer system to an insights repository system, the insights repository system comprises the adaptive data structure and the query comprising query data to be applied against the adaptive data structure, wherein the insights repository system comprising a data structure controller configured to execute a search algorithm against the content of the adaptive data structure, wherein the data structure controller comprises a plurality of connectors, each of the plurality of connectors configured to interface with a predetermined respective type of adaptive data structure, and wherein the data structure controller comprises a query builder configured to communicate, based on incoming query data from one or more consumer systems, with one or more of the plurality of connectors to cause the one or more of the plurality of connectors to cause execution of a search algorithm against the adaptive data structure;

receiving, from the insights repository system, a response to the query;

generating, based on the response to the query, insights data;

transmitting the insights data to an insights feed to which one or more consumers systems is subscribed; and transform, by the insights feed, the received insights data into output insight data for the one or more subscribing customers;

wherein the relationship analyzer system comprises:
an insight rule corpus storing a plurality of insight rules; and
a plurality of insight processor instances, each of the plurality of insight processor instances configured to apply a respective set of one or more of the plurality of respective insight rules to the response to the query data in order to generate the insights data.

32. A non-transitory computer-readable storage medium for generating an insights feed, the non-transitory computer-readable storage medium configured to be executed by a system comprising one or more processors to cause the system to:

transmit a query from a relationship analyzer system to an insights repository system, the insights repository system comprises an adaptive data structure representing relationships among a plurality of entities and the query comprising query data to be applied against the adaptive data structure, wherein the insights repository system comprising a data structure controller configured to execute a search algorithm against the content of the adaptive data structure, wherein the data structure controller comprises a plurality of connectors, each of the plurality of connectors configured to interface with a predetermined respective type of adaptive data structure, and wherein the data structure controller comprises a query builder configured to communicate, based on incoming query data from one or more consumer systems, with one or more of the plurality of connectors to cause the one or more of the plurality of connectors to cause execution of a search algorithm against the adaptive data structure;

receive, from the insights repository system, a response to the query;

generate, based on the response to the query, insights data;

transmit the insights data to an insights feed to which one or more consumers systems is subscribed; and transform, by the insights feed, the received insights data into output insight data for the one or more subscribing customers;

wherein the relationship analyzer system comprises:
an insight rule corpus storing a plurality of insight rules; and
a plurality of insight processor instances, each of the plurality of insight processor instances configured to apply a respective set of one or more of the plurality of respective insight rules to the response to the query data in order to generate the insights data.

* * * * *